(12) United States Patent
Lyu et al.

(10) Patent No.: US 12,052,533 B2
(45) Date of Patent: Jul. 30, 2024

(54) SYSTEMS AND METHODS FOR LONG-DISTANCE REMOTE SENSING WITH SUB-WAVELENGTH RESOLUTION USING A WIRELESSLY-POWERED SENSOR TAG ARRAY

(71) Applicant: The Regents of the University of California, Oakland, CA (US)

(72) Inventors: Hongming Lyu, Shanghai (CN); Aydin Babakhani, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 77 days.

(21) Appl. No.: 17/597,461

(22) PCT Filed: Jul. 7, 2020

(86) PCT No.: PCT/US2020/041007
§ 371 (c)(1),
(2) Date: Jan. 6, 2022

(87) PCT Pub. No.: WO2021/007210
PCT Pub. Date: Jan. 14, 2021

(65) Prior Publication Data
US 2022/0264196 A1    Aug. 18, 2022

Related U.S. Application Data

(60) Provisional application No. 62/990,790, filed on Mar. 17, 2020, provisional application No. 62/871,461, filed on Jul. 8, 2019.

(51) Int. Cl.
*H04Q 9/00*    (2006.01)
(52) U.S. Cl.
CPC ........... *H04Q 9/00* (2013.01); *H04Q 2209/47* (2013.01); *H04Q 2209/88* (2013.01)

(58) Field of Classification Search
CPC .. H04Q 9/00; H04Q 2209/47; H04Q 2209/88; G06K 7/0008; G06K 19/0707;
(Continued)

(56) References Cited

U.S. PATENT DOCUMENTS

| 4,388,927 A | 6/1983 | Schober |
| 4,612,940 A | 9/1986 | Kasevich et al. |

(Continued)

FOREIGN PATENT DOCUMENTS

| CN | 104767291 A | 7/2015 |
| CN | 113228464 A | 8/2021 |

(Continued)

OTHER PUBLICATIONS

Balanis, Constantine A., "Antenna Theory: Analysis and Design", John Wiley & Sons, 2016, 1095 pgs. (presented in nine parts).
(Continued)

*Primary Examiner* — James J Yang
*Assistant Examiner* — Anthony D Afrifa-Kyei
(74) *Attorney, Agent, or Firm* — KPPB LLP

(57) ABSTRACT

Systems and methods for remote sensing are described. In an embodiment, an apparatus, includes: a radio frequency identification (RFID) tag; an electromagnetic transmitter configured to emit electromagnetic waves; an ultra-wideband (UWB) receiver; a computer system; where: the RFID tag is configured to be operated without a battery, and to be powered by the electromagnetic waves emitted by the electromagnetic transmitter; where the RFID tag is configured to send out UWB impulses based on an amount of electromagnetic power received from the electromagnetic transmitter, such that a repetition rate of the UWB impulses varies with the amount of electromagnetic power received from the electromagnetic transmitter.

14 Claims, 36 Drawing Sheets
(22 of 36 Drawing Sheet(s) Filed in Color)

(58) Field of Classification Search
CPC ...... G06K 19/00; G06K 19/06; G06K 19/067; G06K 19/07; G06K 19/0701; G06K 19/0708; G06K 19/0711; G06K 7/10306; G06K 7/00; H04B 1/59; H04B 5/00; H04B 1/7163

See application file for complete search history.

(56) References Cited

U.S. PATENT DOCUMENTS

| | | | |
|---|---|---|---|
| 4,719,919 A | 1/1988 | Marchosky et al. | |
| 5,157,340 A | 10/1992 | Walton et al. | |
| 5,464,429 A | 11/1995 | Hedberg et al. | |
| 5,497,099 A | 3/1996 | Walton | |
| 5,522,865 A | 6/1996 | Schulman et al. | |
| 5,630,426 A | 5/1997 | Eggers et al. | |
| 5,749,909 A | 5/1998 | Schroeppel et al. | |
| 6,402,689 B1 | 6/2002 | Scarantino et al. | |
| 6,423,056 B1 | 7/2002 | Ishikawa et al. | |
| 6,735,472 B2 | 5/2004 | Helland | |
| 6,813,518 B2 | 11/2004 | Kuepper | |
| 6,870,503 B2 | 3/2005 | Mohamadi | |
| 6,882,315 B2 | 4/2005 | Richley et al. | |
| 7,010,340 B2 | 3/2006 | Scarantino et al. | |
| 7,043,301 B1 | 5/2006 | Kroll et al. | |
| 7,132,173 B2 | 11/2006 | Daulton | |
| 7,177,341 B2 | 2/2007 | Mccorkle | |
| 7,180,421 B2 * | 2/2007 | Pahlaven | G06K 7/0008 340/572.1 |
| 7,228,228 B2 | 6/2007 | Bartlett et al. | |
| 7,339,883 B2 | 3/2008 | Santhoff et al. | |
| 7,610,092 B2 | 10/2009 | Cowan et al. | |
| 7,751,881 B2 | 7/2010 | Cowan et al. | |
| 8,032,227 B2 | 10/2011 | Parramon et al. | |
| 8,126,418 B2 | 2/2012 | Nowak et al. | |
| 8,188,841 B2 | 5/2012 | Dowla et al. | |
| 8,290,600 B2 | 10/2012 | Hastings et al. | |
| 8,547,248 B2 | 10/2013 | Zdeblick et al. | |
| 8,552,597 B2 | 10/2013 | Song et al. | |
| 8,634,919 B1 | 1/2014 | Hou et al. | |
| 8,644,933 B2 | 2/2014 | Ozawa et al. | |
| 8,670,824 B2 | 3/2014 | Anderson et al. | |
| 8,939,928 B2 | 1/2015 | Savoie et al. | |
| 9,026,212 B2 | 5/2015 | Imran | |
| 9,031,658 B2 | 5/2015 | Chiao et al. | |
| 9,037,223 B2 | 5/2015 | Oral et al. | |
| 9,153,642 B2 | 10/2015 | Li et al. | |
| 9,161,693 B2 | 10/2015 | Rizwan | |
| 9,168,380 B1 | 10/2015 | Greenhut et al. | |
| 9,168,383 B2 | 10/2015 | Jacobson et al. | |
| 9,205,258 B2 | 12/2015 | Simon et al. | |
| 9,270,137 B2 | 2/2016 | Greene | |
| 9,277,874 B2 | 3/2016 | Joshi et al. | |
| 9,421,369 B2 | 8/2016 | Liu et al. | |
| 9,423,438 B2 | 8/2016 | Lin et al. | |
| 9,425,863 B2 | 8/2016 | Kim et al. | |
| 9,486,621 B2 | 11/2016 | Howard et al. | |
| 9,522,270 B2 | 12/2016 | Perryman et al. | |
| 9,544,068 B2 | 1/2017 | Arbabian et al. | |
| 9,669,223 B2 | 6/2017 | Auricchio et al. | |
| 9,669,230 B2 | 6/2017 | Koop | |
| 9,685,793 B2 | 6/2017 | Zargham et al. | |
| 9,700,712 B2 | 7/2017 | Towe | |
| 9,711,978 B2 | 7/2017 | Manova-elssibony et al. | |
| 9,825,361 B2 | 11/2017 | Pachler et al. | |
| 9,953,195 B2 | 4/2018 | Turner et al. | |
| 10,014,730 B2 | 7/2018 | Nayak | |
| 10,238,872 B2 | 3/2019 | Pivonka et al. | |
| 10,312,743 B2 | 6/2019 | Ouda et al. | |
| 10,369,369 B2 | 8/2019 | Perryman et al. | |
| 10,493,288 B2 | 12/2019 | Hastings et al. | |
| 10,530,421 B2 | 1/2020 | Muthali et al. | |
| 10,537,403 B2 | 1/2020 | Vora et al. | |
| 10,742,222 B2 | 8/2020 | Emira et al. | |
| 10,742,261 B2 * | 8/2020 | Nabki | H04B 1/719 |
| 10,978,917 B2 | 4/2021 | Freitas et al. | |
| 11,016,051 B1 | 5/2021 | Sinko et al. | |
| 11,048,893 B2 | 6/2021 | Babakhani et al. | |
| 11,050,263 B2 | 6/2021 | Bae et al. | |
| 11,071,857 B2 | 7/2021 | Sun et al. | |
| 11,515,733 B2 | 11/2022 | Babakhani et al. | |
| 11,712,559 B2 | 8/2023 | Sun et al. | |
| 2002/0064245 A1 | 5/2002 | McCorkle | |
| 2002/0103507 A1 | 8/2002 | Helland | |
| 2002/0137991 A1 | 9/2002 | Scarantino et al. | |
| 2003/0032986 A1 | 2/2003 | Kupper | |
| 2004/0054471 A1 | 3/2004 | Bartlett et al. | |
| 2004/0058186 A1 | 3/2004 | Daulton | |
| 2004/0095287 A1 | 5/2004 | Mohamadi | |
| 2004/0108954 A1 | 6/2004 | Richley et al. | |
| 2005/0058121 A1 * | 3/2005 | Santhoff | H04B 1/71632 370/468 |
| 2005/0256549 A1 | 11/2005 | Holzer | |
| 2006/0136004 A1 | 6/2006 | Cowan et al. | |
| 2007/0118187 A1 | 5/2007 | Denker et al. | |
| 2007/0120677 A1 | 5/2007 | Park et al. | |
| 2007/0211786 A1 | 9/2007 | Shattil | |
| 2007/0225781 A1 | 9/2007 | Saadat et al. | |
| 2007/0293895 A1 | 12/2007 | Cowan et al. | |
| 2008/0021505 A1 | 1/2008 | Hastings et al. | |
| 2008/0039904 A1 | 2/2008 | Beutler et al. | |
| 2008/0252422 A1 | 10/2008 | Dowla et al. | |
| 2008/0262580 A1 | 10/2008 | Gerber et al. | |
| 2008/0300660 A1 | 12/2008 | John | |
| 2008/0306359 A1 | 12/2008 | Zdeblick et al. | |
| 2009/0157141 A1 * | 6/2009 | Chiao | A61N 1/37229 607/46 |
| 2009/0219139 A1 | 9/2009 | Slesinski | |
| 2009/0292341 A1 | 11/2009 | Parramon et al. | |
| 2010/0076517 A1 | 3/2010 | Imran | |
| 2010/0114243 A1 | 5/2010 | Nowak et al. | |
| 2010/0308974 A1 | 12/2010 | Rowland et al. | |
| 2011/0022025 A1 | 1/2011 | Savoie et al. | |
| 2011/0169607 A1 * | 7/2011 | Paulson | G01S 13/825 340/10.1 |
| 2011/0288615 A1 | 11/2011 | Armstrong et al. | |
| 2012/0008714 A1 | 1/2012 | Rizwan | |
| 2012/0095531 A1 | 4/2012 | Derbas et al. | |
| 2012/0109236 A1 | 5/2012 | Jacobson et al. | |
| 2012/0161787 A1 | 6/2012 | Potyrailo et al. | |
| 2012/0166095 A1 | 6/2012 | Potyrailo et al. | |
| 2012/0183097 A1 | 7/2012 | Ishizaki | |
| 2012/0239118 A1 | 9/2012 | Ozawa et al. | |
| 2012/0256492 A1 | 10/2012 | Song et al. | |
| 2013/0066400 A1 | 3/2013 | Perryman et al. | |
| 2013/0109987 A1 | 5/2013 | Kunis et al. | |
| 2013/0123882 A1 | 5/2013 | Towe | |
| 2013/0197380 A1 | 8/2013 | Oral et al. | |
| 2014/0011286 A1 | 1/2014 | Potyrailo et al. | |
| 2014/0046389 A1 | 2/2014 | Anderson et al. | |
| 2014/0058239 A1 | 2/2014 | Joshi et al. | |
| 2014/0140364 A1 | 5/2014 | Charles et al. | |
| 2014/0198062 A1 | 7/2014 | Kreutzer et al. | |
| 2014/0243848 A1 | 8/2014 | Auricchio et al. | |
| 2014/0252543 A1 | 9/2014 | Li et al. | |
| 2014/0309947 A1 | 10/2014 | Gryska et al. | |
| 2014/0336474 A1 * | 11/2014 | Arbabian | A61B 5/686 600/300 |
| 2014/0375261 A1 | 12/2014 | Manova-Elssibony et al. | |
| 2015/0042358 A1 | 2/2015 | Lin et al. | |
| 2015/0076920 A1 | 3/2015 | Zargham et al. | |
| 2015/0127068 A1 * | 5/2015 | Simon | A61N 1/36175 607/60 |
| 2015/0217123 A1 | 8/2015 | Deterre et al. | |
| 2015/0229139 A1 | 8/2015 | Greene | |
| 2015/0297900 A1 | 10/2015 | Perryman et al. | |
| 2015/0343205 A1 | 12/2015 | Howard et al. | |
| 2015/0356332 A1 * | 12/2015 | Turner | G01S 5/14 340/10.5 |
| 2016/0008602 A1 | 1/2016 | Perryman et al. | |
| 2016/0038739 A1 | 2/2016 | Liu et al. | |
| 2016/0048710 A1 * | 2/2016 | Nekoogar | H04B 1/7163 340/10.34 |
| 2016/0149441 A1 | 5/2016 | Nayak | |
| 2016/0204765 A1 | 7/2016 | Ferriss et al. | |

(56) References Cited

U.S. PATENT DOCUMENTS

| | | |
|---|---|---|
| 2016/0228718 A1 | 8/2016 | Koop |
| 2016/0267769 A1 | 9/2016 | Rokhsaz et al. |
| 2016/0317060 A1 | 11/2016 | Connor |
| 2016/0338798 A1 | 11/2016 | Vora et al. |
| 2016/0380754 A1 | 12/2016 | Chen et al. |
| 2017/0001003 A1 | 1/2017 | Pivonka et al. |
| 2017/0066334 A1 | 3/2017 | Sindia et al. |
| 2017/0164878 A1 | 6/2017 | Connor |
| 2017/0303505 A1* | 10/2017 | Karsijns ............... B25J 9/1697 |
| 2018/0069486 A1 | 3/2018 | Ouda et al. |
| 2018/0071539 A1 | 3/2018 | Hastings et al. |
| 2018/0123639 A1 | 5/2018 | Muthali et al. |
| 2018/0143061 A1 | 5/2018 | Strong |
| 2018/0177431 A1 | 6/2018 | Rottenberg |
| 2018/0235692 A1 | 8/2018 | Efimov et al. |
| 2018/0256030 A1 | 9/2018 | Lee et al. |
| 2019/0097323 A1 | 3/2019 | Rokhsaz et al. |
| 2019/0097430 A1 | 3/2019 | Bae et al. |
| 2019/0180065 A1 | 6/2019 | Babakhani et al. |
| 2019/0224476 A1 | 7/2019 | Sun et al. |
| 2019/0247050 A1 | 8/2019 | Goldsmith |
| 2019/0247664 A1 | 8/2019 | Irazoqui et al. |
| 2019/0262605 A1 | 8/2019 | Babakhani et al. |
| 2019/0326785 A1 | 10/2019 | Freitas et al. |
| 2020/0022607 A1 | 1/2020 | Pratt et al. |
| 2020/0155828 A1 | 5/2020 | Shepard et al. |
| 2020/0169118 A1 | 5/2020 | Jung et al. |
| 2020/0195256 A1 | 6/2020 | Emira et al. |
| 2021/0143678 A1 | 5/2021 | Georgakopoulos |
| 2021/0339017 A1 | 11/2021 | Sun et al. |
| 2021/0356417 A1 | 11/2021 | Babakhani et al. |
| 2021/0397257 A1 | 12/2021 | Rogers et al. |
| 2022/0008736 A1 | 1/2022 | Babakhani et al. |
| 2022/0158497 A1 | 5/2022 | Babakhani et al. |
| 2022/0252506 A1 | 8/2022 | Babakhani et al. |
| 2022/0273944 A1 | 9/2022 | Werneth et al. |
| 2022/0379124 A1 | 12/2022 | Babakhani et al. |
| 2023/0081364 A1 | 3/2023 | Babakhani et al. |
| 2023/0181910 A1 | 6/2023 | Werneth |
| 2024/0146115 A1 | 5/2024 | Babakhani et al. |

FOREIGN PATENT DOCUMENTS

| | | |
|---|---|---|
| EP | 3884562 A1 | 9/2021 |
| EP | 4032165 A1 | 7/2022 |
| EP | 4110165 A1 | 1/2023 |
| EP | 4262972 A1 | 10/2023 |
| JP | 2002505930 A | 2/2002 |
| JP | 2008516741 A | 5/2008 |
| JP | 2010527267 A | 8/2010 |
| JP | 2022507813 A | 1/2022 |
| JP | 2022549118 A | 11/2022 |
| JP | 2023515580 A | 4/2023 |
| WO | 1996027327 A1 | 9/1996 |
| WO | 2000038783 A1 | 7/2000 |
| WO | 2007028035 A2 | 3/2007 |
| WO | 2007109656 A2 | 9/2007 |
| WO | 2011030804 A1 | 3/2011 |
| WO | 2013058958 A1 | 4/2013 |
| WO | 2016199142 A1 | 12/2016 |
| WO | 2017066121 A1 | 4/2017 |
| WO | 2017070322 A1 | 4/2017 |
| WO | 2017205565 A1 | 11/2017 |
| WO | 2018039162 A2 | 3/2018 |
| WO | 2018053467 A1 | 3/2018 |
| WO | 2020106440 A1 | 5/2020 |
| WO | 2020106862 A1 | 5/2020 |
| WO | 2020125839 A1 | 6/2020 |
| WO | 2020106440 A8 | 7/2020 |
| WO | 2020106440 A8 | 10/2020 |
| WO | 2021005146 A1 | 1/2021 |
| WO | 2021007071 A1 | 1/2021 |
| WO | 2021007210 A1 | 1/2021 |
| WO | 2021046313 A1 | 3/2021 |
| WO | 2021055146 A1 | 3/2021 |
| WO | 2021174215 A1 | 9/2021 |
| WO | 2021183487 A1 | 9/2021 |
| WO | 2021247490 A1 | 12/2021 |
| WO | 2022133501 A1 | 6/2022 |
| WO | 2021174215 A9 | 9/2022 |

OTHER PUBLICATIONS

Bereuter et al., "Hot Topic in Cardiac Devices—Leadless cardiac dual-chamber pacing", Europace Abstracts Supplement, 2018, 1 pg. doi: 10.1093/europace/euy015.

Bereuter et al., "Leadless Dual-Chamber Pacing, A Novel Communication Method for Wireless Pacemaker Synchronization", JACC: Basic to Translational Service, Dec. 2018, vol. 3, No. 6, pp. 813-823, https://doi.org/10.1016/j.jacbts.2018.07.009.

Biederman et al., "A Fully-Integrated, Miniaturized (0.125 mm$^2$) 10.5 µW Wireless Neural Sensor", IEEE Journal of Solid-State Circuits, vol. 48, No. 4, Mar. 22, 2013, pp. 960-970, DOI: 10.1109/JSSC.2013.2238994.

Bigio et al., "Microwave absorption spectroscopy of DNA", Biopolymers, Jan. 1993, vol. 33, Issue 1, pp. 147-150, https://doi.org/10.1002/bip.360330114.

Bourdel et al., "A 9-pJ/Pulse 1.42-Vpp OOK CMOS UWB Pulse Generator for the 3.1--10.6-GHz FCC Band", IEEE Transactions on Microwave Theory and Techniques, vol. 58, No. 1, Jan. 2010, pp. 1-9.

Brown et al., "An Ultra-Low-Power 9.8 GHz Crystal-Less UWB Transceiver with Digital Baseband Integrated in 0.18 µm BiCMOS", IEEE International Solid-State Circuits Conference, 2013, pp. 442-443.

Carlson et al., "A 20 mV Input Boost Converter with Efficient Digital Control for Thermoelectric Energy Harvesting", IEEE Journal of Solid-State Circuits, vol. 45, Issue 4, Apr. 2010, pp. 741-750.

Chae et al., "A 128-Channel 6 mW Wireless Neural Recording IC With Spike Feature Extraction and UWB Transmitter", IEEE Transactions on Neural Systems and Rehabilitation Engineering, vol. 17, No. 4, Aug. 2009, pp. 312-321.

Chang et al., "27.7 A 30.5mm3 fully packaged implantable device with duplex ultrasonic data and power links achieving 95kb/s with <10-4 BER at 8.5cm depth", IEEE International Solid-State Circuits Conference (ISSCC), Feb. 5-9, 2017, pp. 460-461, DOI: 10.1109/ISSCC.2017.7870460.

Charthad et al., "A mm-sized implantable medical device (IMD) with ultrasonic power transfer and a hybrid bi-directional data link", IEEE Journal of Solid-State Circuits, vol. 50, Issue 8, Aug. 2015, pp. 1741-1753, DOI: 10.1109/JSSC.2015.2427336.

Charthad et al., "A mm-Sized Wireless Implantable Device for Electrical Stimulation of Peripheral Nerves", IEEE Transactions on Biomedical Circuits and Systems, vol. 12, No. 2, Apr. 2018, pp. 257-270, doi: 10.1109/TBCAS.2018.2799623.

Charthad et al., "System-Level Analysis of Far-Field Radio Frequency Power Delivery for mm-Sized Sensor Nodes", IEEE Transactions on Circuits and Systems I: Regular Papers, Feb. 3, 2016, vol. 63, No. 2, pp. 300-311, DOI: 10.1109/TCSI.2015.2512720.

Chen et al., "3D Radar Imaging based on a Synthetic Array of 30GHz Impulse Radiators with On-Chip Antennas in 130nm SiGe BiCMOS", IEEE Transactions on Microwave Theory and Techniques, Nov. 2017, vol. 65, No. 22, pp. 4373-4384.

Chen et al., "Multiple leadless pacemakers implanted in the right ventricle of swine", Europace, 2016, vol. 18, 1748-1752, published online Jan. 31, 2016, doi:10.1093/europace/euv418.

Cheng, "Field and wave electromagnetics", Pearson Education India, 1989, 720 pgs., (presented in three parts).

Chinitz et al., "Accelerometer-based atrioventricular synchronous pacing with a ventricular leadless pacemaker: Results from the Micra atrioventricular feasibility studies", Heart Rhythm, 2018, vol. 15, pp. 1363-1371, https://doi.org/10.1016/j.hrthm.2018.05.004.

Cogan, "Neural stimulation and recording electrodes", Annual Review of Biomedical Engineering, 2008, vol. 10, pp. 275-309, first published online Apr. 22, 2008, doi: 10.1146/annurev.bioeng.10.061807.160518.

(56) References Cited

OTHER PUBLICATIONS

Dagan et al., "A low-power low-cost 24 ghz rfid tag with a c-flash based embedded memory", IEEE Journal of Solid-State Circuits, Sep. 2014, vol. 49, No. 9, pp. 1942-1957, DOI: 10.1109/JSSC.2014.2323352.

Dagdeviren et al., "Conformal piezoelectric energy harvesting and storage from motions of the heart, lung, and diaphragm", PNAS, vol. 111, No. 5, Feb. 4, 2014, published online Jan. 21, 2014, pp. 1927-1932, doi: 10.1073/pnas.1317233111.

De Roover et al., "A fully integrated wireless power supply for pinless active RFID-devices in 130nm CMOS", 2007 IEEE Asian Solid-State Circuits Conference, Nov. 12-14, 2007, pp. 123-126, DOI: 10.1109/ASSCC.2007.4425747.

Deer et al., "The Appropriate Use of Neurostimulation: Avoidance and Treatment of Complications of Neurostimulation Therapies for the Treatment of Chronic Pain", Neuromodulation: Technology at the Neural Interface, Aug. 12, 2014. vol. 17, No. 6, pp. 571-598, DOI: 10.1111/ner.12206.

Derksen et al., "Tissue Discontinuities Affect Conduction Velocity Restitution", Circulation, Aug. 19, 2003, vol. 108, Issue 7, pp. 882-888, https://doi.org/10.1161/01.CIR.0000081766.16185.28.

Dickson, "On-chip high-voltage generation in MNOS integrated circuits using an improved voltage multiplier technique", IEEE Journal of Solid-State Circuits, 1976, vol. 11, No. 3, pp. 374-378, http://dx.doi.org/10.1109/JSSC.1976.1050739.

Dorta-Quinones et al., "A Wireless FSCV Monitoring IC With Analog Background Subtraction and UWB Telemetry", IEEE Transactions on Biomedical Circuits and Systems, vol. 10, No. 2, Apr. 2016, 36 pgs.

Dosdall et al., "Mechanisms of defibrillation", Annual Review of Biomedical Engineering, vol. 12, Aug. 15, 2010, first published as a Review in Advance May 5, 2010, pp. 233-258, https://doi.org/10.1146/annurev-bioeng-070909-105305.

Eldeeb et al., "A 0.4-V Miniature CMOS Current Mode Instrumentation Amplifier", IEEE Transactions on Circuits and Systems—II Express Briefs, Mar. 2018, Vo. 65, No. 3, pp. 261-265, DOI: 10.1109/TCSII.2017.2685589.

FCC, "First Report and Order 02-48", Federal Communication Commission (FCC), Feb. 2002, 118 pgs., (presented in two parts).

Fenton et al., "Termination of Atrial Fibrillation Using Pulsed Low-Energy Far-Field Stimulation", Circulation, Aug. 11, 2009, vol. 120, Issue 6, 467-476, first published Jul. 27, 2009, https://doi.org/10.1161/CIRCULATIONAHA.108.825091.

Gao et al., "A 71GHZ RF Energy Harvesting Tag with 8% Efficiency for Wireless Temperature Sensors in 65nm CMOS", IEEE Radio Frequency Integrated Circuits Symposium (RFIC), Jun. 2013, pp. 403-406, DOI: 10.1109/RFIC.2013.6569616.

Gilbert, "Impedance matching with lossy components", IEEE Transactions on Circuits and Systems, Feb. 1975, vol. 22, Issue: 2, pp. 96-100, DOI: 10.1109/TCS.1975.1084016.

Grenier et al., "Recent advances in microwave-based dielectric spectroscopy at the cellular level for cancer investigations", IEEE Transactions on Microwave Theory and Techniques, Apr. 11, 2013, vol. 61, No. 5, pp. 2023-2030, doi:10.1109/TMTT.2013.2255885.

Guler et al., "Power Management in Wireless Power-Sipping Devices: A Survey", IEEE Circuits and Systems Magazine, Nov. 20, 2017, pp. 64-82, DOI: 10.1109/MCAS .2017.2757090.

Gunturi et al., "A 250-Mb/s Data Rate IR-UWB Transmitter Using Current-Reused Technique", IEEE Transactions on Microwave Theory and Techniques, vol. 65, No. 11, Nov. 2017, pp. 4255-4265, DOI:10.1109/TMTT.2017.2695189.

Hannan et al., "Energy harvesting for the implantable biomedical devices: issues and challenges", BioMedical Engineering Online, 2014, vol. 13, No. 79, 23 pgs., https://doi.org/10.1186/1475-925X-13-79.

Hehn et al., "A Fully Autonomous Integrated Interface Circuit for Piezoelectric Harvesters", IEEE Journal of Solid-State Circuits, Sep. 2012, vol. 47, Issue 9, pp. 2185-2198, DOI: 10.1109/JSSC.2012.2200530.

Higgins et al., "Advances in Pacing Therapy: Examining the Potential Impact of Leadless Pacing Therapy", Journal of Innovations in Cardiac Rhythm Management, Nov. 2014, vol. 5, pp. 1825-1833, DOI: 10.19102/icrm.2014.051106.

Ho et al., "Wireless power transfer to deep-tissue microimplants", PNAS, vol. 111, No. 22, Jun. 3, 2014, first published May 19, 2014, pp. 7974-7979, https://doi.org/10.1073/pnas.1403002111.

Huang et al., "A simple subthreshold cmos voltage reference circuit with channel-length modulation compensation", IEEE Transactions on Circuits and Systems-II: Express Briefs, Sep. 2006, vol. 53, No. 9, pp. 882-885, DOI: 10.1109/TCSII.2006.881813.

Huang et al., "Materials and designs for wireless epidermal sensors of hydration and strain", Advanced Functional Materials, Jul. 2, 2014, vol. 24, Issue 25, pp. 3846-3854, first published Mar. 2, 2014, doi: 10.1002/adfm.201303886.

Huang et al., "Neurostimulation Strategy for Stress Urinary Incontinence", IEEE Transactions on Neural Systems and Rehabilitation Engineering, Jul. 2017, vol. 25, No. 7, pp. 1068-1078, first published Mar. 7, 2017, doi: 10.1109/TNSRE.2017.2679077.

Jawad et al., "Opportunities and Challenges for Near-Field Wireless Power Transfer: A Review", Energies, vol. 10, No. 1022, Jul. 18, 2017, 28 pgs., doi:10.3390/en10071022.

Jeon et al., "A 143nW Glucose-Monitoring Smart Contact Lens IC with a Dual-Mode Transmitter for Wireless-Powered Backscattering and RF-Radiated Transmission Using a Single Loop Antenna", Symposium on VLSI Circuits, Jun. 9-14, 2019, pp. C294-C295, DOI: 10.23919/VLSIC.2019.8777984.

Jia et al., "A mm-sized free-floating wirelessly powered implantable optical stimulating system-on-a-chip", 2018 IEEE International Solid—State Circuits Conference—(ISSCC), Feb. 11-15, 2018, San Francisco, CA, pp. 468-470, DOI: 10.1109/ISSCC.2018.8310387.

Jiang et al., "A Sub-1 µW Multiparameter Injectable BioMote for Continuous Alcohol Monitoring", IEEE Custom Integrated Circuits Conference (CICC), 2018, pp. 1-4.

Johnson et al., "StimDust: A 6.5 mm3, wireless ultrasonic peripheral nerve stimulator with 82% peak chip efficiency", UC Berkeley, Retrieved from https://escholarship.org/uc/item/8px811qc, published May 5, 2019, 5 pgs., http://dx.doi.org/10.1109/CICC.2018.8357047.

Kang et al., "A 1.7×4.1×2 mm3 Fully Integrated pH Sensor for Implantable Applications Using Differential Sensing and Drift-Compensation", 2019 Symposium on VLSI Circuits Digest of Technical Papers, C25-1, pp. C310-C311.

Kang et al., "Design and Optimization of Area-Constrained Wirelessly Powered CMOS UWB SoC for localization applications", IEEE Transactions on Microwave Theory and Techniques, Apr. 2016, vol. 64, No. 4, pp. 1042-1054, DOI: 10.1109/TMTT.2016.2536663.

Karthaus et al., "Fully Integrated Passive UHF RFID Transponder IC with 16.7-µW Minimum RF Input Power", IEEE Journal of Solid State Circuits, Oct. 2003, vol. 38, No. 10, pp. 1602-1608, DOI: 10.1109/JSSC.2003.817249.

Kelly et al., "A power-efficient neural tissue stimulator with energy recovery", IEEE Transactions on Biomedical Circuits and Systems, Feb. 2011, vol. 5, Issue 1, pp. 20-29, first published Jan. 24, 2011, DOI: 10.1109/TBCAS.2010.2076384.

Kennedy et al., "High intensity focused ultrasound: surgery of the future?", British Journal of Radiology, Sep. 2003, vol. 76, No. 909, pp. 590-599, doi: 10.1259/bjr/17150274.

Kim et al., "A 144-MHz Fully Integrated Resonant Regulating Rectifier With Hybrid Pulse Modulation for mm-Sized Implants", IEEE Journal of Solid-State Circuits, Nov. 2017, vol. 52, Issue 11, pp. 3043-3055, DOI: 10.1109/JSSC.2017.2734901.

Kim et al., "Design of miniaturized wireless power receivers for mm-sized implants", 2017 IEEE Custom Integrated Circuits Conference (CICC), Apr. 30-May 30, 2017, 8 pgs., DOI: 10.1109/CICC.2017.7993703.

Kim et al., "Wireless power transfer to a cardiac implant", Applied Physics Letters, vol. 101, 2012, pp. 073701-1-073701-4; doi: 10.1063/1.4745600.

Kocer et al., "A new transponder architecture with on-chip ADC for long-range telemetry applications", IEEE Journal of Solid-State Circuits, vol. 41, No. 5, Apr. 24, 2006, pp. 1142-1148 [online],

(56) References Cited

OTHER PUBLICATIONS

[retrieved on Aug. 14, 2020]. Retrieved from the Internet <URL: https://www.mpflynngroup.com/uploads/7/3/4/9/73490609/01624404.pdf>, entire document, especially: fig. 1, p. 1, col. 2, para 3; p. 2, col. 2, para 2.

Kotani et al., "High-Efficiency Differential-Drive CMOS Rectifier for UHF RFIDs", IEEE Journal of Solid-State Circuits, Nov. 2009, vol. 44, Issue 11, pp. 3011-3018, DOI: 10.1109/JSSC.2009.2028955.

Kulkarni et al., "A 750 Mb/s, 12 pJ/b, 6-to-10 GHz CMOS IR-UWB Transmitter with Embedded On-Chip Antenna", IEEE Journal of Solid-State Circuits, vol. 44, No. 2, Feb. 2009, pp. 394-403, DOI: 10.1109/JSSC.2008.2011034.

Kuo et al., "Near-field power transfer and backscattering communication to miniature RFID tag in 65 nm CMOS technology", 2016 IEEE MTT-S International Microwave Symposium (IMS), May 22-27, 2016, 4 pgs., DOI: 10.1109/MWSYM.2016.7540221.

Kurs et al., "Wireless Power Transfer via Strongly Coupled Magnetic Resonances", Science, vol. 317, No. 5834, Jul. 6, 2007, published online Jun. 7, 2007, pp. 83-86, DOI: 10.1126/science.1143254.

Le et al., "Efficient Far-Field Radio Frequency Energy Harvesting for Passively Powered Sensor Networks", IEEE Journal of Solid-State Circuits, May 2008, vol. 43, No. 5, pp. 1287-1302, DOI: 10.1109/JSSC.2008.920318.

Lepock, "Cellular effects of hyperthermia: relevance to the minimum dose for thermal damage", International Journal of Hyperthermia, vol. 19, No. 3, May-Jun. 2003, pp. 252-266, DOI: 10.1080/0265673031000065042.

Li et al., "A 13.56 MHz Wireless Power Transfer System with Reconfigurable Resonant Regulating Rectifier and Wireless Power Control for Implantable Medical Devices", IEEE Journal of Solid-State Circuits, vol. 50, No. 4, Apr. 1, 2015, pp. 978-989.

Liu et al., "A 650-pJ/bit MedRadio transmitter with an FIR-embedded phase modulator for medical micro-power networks (MMNs)", IEEE Transactions on Circuits and Systems I: Regular Papers, 2013, vol. 60, No. 12, pp. 3279-3288, DOI: 10.1109/TCSI.2013.2265970.

Lo et al., "A fully integrated wireless SoC for motor function recovery after spinal cord injury", IEEE Transactions on Biomedical Circuits and Systems, Jun. 2017, vol. 11, Issue 3, pp. 497-509, first published May 23, 2017, DOI: 10.1109/TBCAS.2017.2679441.

Lo et al., "Bio-Impedance Characterization Technique with Implantable Neural Stimulator Using Biphasic Current Stimulus", Conference Proceedings of the IEEE Engineering in Medicine and Biology Society, 2014, pp. 474-477, doi: 10.1109/EMBC.2014.6943631.

Lonappan et al., "Nondestructive Measurement of Human Blood at Microwave Frequencies", Journal of Electromagnetic Waves and Applications, 2007, vol. 21, Issue 8, 1131-1139, DOI: 10.1163/156939307781749740.

Lopez-Lapena et al., "A closed-loop maximum power point tracker for subwatt photovoltaic panels", IEEE Transactions on Industrial Electronics, Mar. 2012, vol. 59, No. 3, pp. 1588-1596, DOI: 10.1109/TIE.2011.2161254.

Lu et al., "Flexible Neural Electrode Array Based-on Porous Graphene for Cortical Microstimulation and Sensing", Scientific Reports, Sep. 19, 2016, vol. 6, No. 33526, 9 pgs., DOI: 10.1038/srep33526.

Lu et al., "Ultra-flexible Piezoelectric Devices Integrated with Heart to Harvest the Biomechanical Energy", Scientific Reports, vol. 5, No. 16065, Nov. 5, 2015, 9 pgs., https://doi.org/10.1038/srep16065.

Lyu et al., "A 430-Mhz Wirelessly Powered Implantable Pulse Generator with Intensity/Rate Control and Sub-1 μA Quiescent Current Consumption", IEEE Transactions on Biomedical Circuits and Systems, vol. 13, No. 1, Feb. 2019, pp. 180-190, DOI: 10.1109/TBCAS.2018.2879357.

Lyu et al., "A 915-MHz Far-Field Energy Harvester with -22-dBm Sensitivity and 3-V Output Voltage Based on Antenna-and-Rectified Codesign", IEEE Microwave and Wireless Components Letters, Aug. 2019, vol. 29, No. 8, pp. 557-559, DOI: 10.1109/LMWC.2019.2923685.

Lyu et al., "A Multi-site Heart Pacing Study Using Wirelessly Powered Leadless Pacemakers", IEEE Xplore, Year: 2018, Date: Oct. 29, 2018 (retrieved on Jan. 15, 2020), 6 pgs.

Lyu et al., "An Energy-Efficient Wirelessly Powered Millimeter-Scale Neurostimulator Implant Based on Systematic Codesign of an Inductive Loop Antenna and a Custom Rectifier", IEEE Transactions on Biomedical Circuits and Systems, vol. 12, No. 5, Oct. 2018, pp. 1131-1143, DOI: 10.1109/TBCAS.2018.2852680.

Lyu et al., "Synchronized Biventricular Heart Pacing in a Closed-chest Porcine Model based on Wirelessly Powered Leadless Pacemakers", Scientific Reports, 10, Article No. 2067, 2020, 13 pgs.

Lyu et al., "Towards the Implementation of a Wirelessly Powered Dielectric Sensor with Digitized Output for Implantable Applications", IEEE Sensors Letters, Mar. 2019, vol. 3, No. 3, pp. 1-4, first published Jan. 30, 2019.

Mandal et al., "Low-power CMOS rectifier design for RFID applications", IEEE Transactions on Circuits and Systems I: Regular Papers, Jul. 2007, vol. 54, No. 6, pp. 1177-1188, DOI: 10.1109/TCSI.2007.895229.

Meyer et al., "First in a series on the leadless pacing: Percutaneous implantable transcatheter pacemaker—background, technical aspects, and possible pitfalls", d-Journal of Cardiology Practice, Aug. 23, 2016, vol. 14, No. 20, 18 pgs.

Mirbozorgi et al., "A Single-Chip Full-Duplex High Speed Transceiver for Multi-Site Stimulating and Recording Neural Implants", IEEE Transactions on Biomedical Circuits and Systems, vol. 10, No. 3, Jun. 2016, pp. 643-653, DOI: 10.1109/TBCAS.2015.2466592.

Mirzavand et al., "High-Resolution Dielectric Sensor Based on Injection-Locked Oscillators", IEEE Sensors Journal, Jan. 1, 2018, vol. 18, Issue 1, pp. 141-148, published online published Nov. 13, 2017, DOI: 10.1109/JSEN.2017.2772923.

Montgomery et al., "Wirelessly powered, fully internal optogenetics for brain, spinal and peripheral circuits in mice", Nature Methods, 2015, vol. 12, No. 10, pp. 969-974, published online Aug. 17, 2015, DOI: 1031038/NMETH.3536.

Niemann et al., "Longevity of Implantable Pulse Generators in Bilateral Deep Brain Stimulation for Movement Disorders", Neuromodulation, vol. 21, No. 6, Aug. 2018, published online Dec. 19, 2017, pp. 597-603, doi: 10.1111/ner.12743.

Pandey et al., "A Sub-100 μW MICS/ISM Band Transmitter Based on Injection-Locking and Frequency Multiplication", IEEE Journal of Solid-State Circuits, May 2011, vol. 46, Issue 5, pp. 1049-1058, first published Apr. 5, 2011, DOI: 10.1109/JSSC.2011.2118030.

International Preliminary Report on Patentability for International Application PCT/US2019/059657, Report issued May 25, 2021, Mailed on Jun. 3, 2021, 8 Pgs.

International Preliminary Report on Patentability for International Application PCT/US2019/062443, Report issued May 25, 2021, Mailed Jun. 3, 2021, 7 Pgs.

International Preliminary Report on Patentability for International Application PCT/US2020/040283, Report issued Jan. 11, 2022, Mailed on Jan. 20, 2022, 07 Pgs.

International Preliminary Report on Patentability for International Application PCT/US2020/041007, Report issued Jan. 11, 2022, Mailed on Jan. 20, 2022, 06 Pgs.

International Preliminary Report on Patentability for International Application PCT/US2020/048001, Report issued Mar. 15, 2022, Mailed on Mar. 31, 2022, 6 Pgs.

International Search Report and Written Opinion for Application PCT/US2021/35132, completed Aug. 2, 2021, mailed Oct. 4, 2021, 10 pgs.

International Search Report and Written Opinion for International Application No. PCT/US2019/059657, Search completed Dec. 31, 2019, Mailed Jan. 21, 2020, 12 Pgs.

International Search Report and Written Opinion for International Application No. PCT/US2019/062443, Search completed Jan. 15, 2020, Mailed Jan. 29, 2020, 16 Pgs.

International Search Report and Written Opinion for International Application No. PCT/US2020/040283, Search completed Aug. 17, 2020, Mailed Sep. 28, 2020, 17 Pgs.

(56) References Cited

OTHER PUBLICATIONS

International Search Report and Written Opinion for International Application No. PCT/US2020/048001, Search completed Oct. 17, 2020, Mailed Nov. 20, 2020, 12 Pgs.
International Search Report and Written Opinion for International Application No. PCT/US2021/020343, Search completed Jun. 2, 2021, Mailed Jun. 22, 2021, 13 Pgs.
International Search Report and Written Opinion for International Application No. PCT/US2021/073036, Search completed Apr. 14, 2022, Mailed May 3, 2022, 18 Pgs.
International Search Report and Written Opinion for International Application PCT/US2017/0047901, filed Aug. 22. 2017, 13 pgs.
International Search Report and Written Opinion for International Application PCT/US2017/052163, filed Sep. 19, 2017, 13 pgs.
International Search Report and Written Opinion for International Application PCT/US2020/049349, mailed Nov. 24, 2020, 7 pgs.
International Search Report and Written Opinion for International Application PCT/US2021/21467, Mailed Jun. 3, 2021, 8 pgs.
International Search Report for International Application No. PCT/US2020/041007; Search completed Aug. 29, 2020, Mailed Oct. 2, 2020,13 pgs.
Abiri et al., "Inductively powered wireless pacing via a miniature pacemaker and remote stimulation control system", Science Reports, vol. 7, No. 6180, Jul. 21, 2017. pp. 1-10, doi: 10.1038/s41598-017-06493-5.
Agarwal et al., "A 4µW, ADPLL-Based Implantable Amperometric Biosensor in 65nm CMOS", 2017 Symposium on VLSI Circuits, Kyoto, Japan, 2017, pp. C108-C109. doi: 10.23919/VLSIC.2017.8008566.
Ahn et al., "Optimal Design of Wireless Power Transmission Links for Millimeter-Sized Biomedical Implants", IEEE Transactions on Biomedical Circuits and Systems, Jan. 20, 2015, vol. 10, Issue 1, pp. 125-137, DOI: 10.1109/TBCAS.2014.2370794.
Arfin et al., "An energy-efficient, adiabatic electrode stimulator with inductive energy recycling and feedback current regulation", IEEE Transactions on Biomedical Circuits and Systems, Feb. 2012, vol. 6, Issue 1, pp. 1-14, first published Oct. 6, 2011, DOI: 10.1109/TBCAS.2011.2166072.
Atzori et al., "The Internet of Things: A survey", Computer Networks, Oct. 2010, vol. 54, Issue 15, pp. 2787-2805, https://doi.org/10.1016/j.comnet.2010.05.010.
Bahrami et al., "Flexible, polarization-diverse UWB antennas for implantable neural recording systems", IEEE Transactions on Biomedical Circuits and Systems, vol. 10, No. 1, Feb. 2016, pp. 38-48.
Extended European Search Report dated Jul. 19, 2022, issued in related European Application No. 19887763.1, 7 pgs.
International Preliminary Report on Patentability dated Sep. 22, 2022 issued in related International Application PCT/US2021/021467, 6 pgs.
International Preliminary Report on Patentability for International Application PCT/US2021/020343, Report issued Aug. 30, 2022, Mailed on Sep. 2022, 7 Pgs.
International Search Report and Written Opinion for International Application No. PCT/US2022/036926, Search completed Sep. 8, 2022, Mailed Oct. 17, 2022, 07 pgs.
Cogan et al., "Potential-biased, asymmetric waveforms for charge-injection with activated iridium oxide (AIROF) neural stimulation electrodes", IEEE Transactions on Biomedical Engineering, vol. 53, No. 2, Feb. 2006, first published Jan. 23, 2006, pp. 327-332, doi: 10.1109/TBME.2005.862572.
Daubert et al., "2012 EHRA/HRS expert consensus statement on cardiac resynchronization therapy in heart failure: implant and follow-up recommendations and management", Heart Rhythm, vol. 9, No. 9, Sep. 1, 2012, pp. 1524-1576, doi: 10.1016/j.hrthm.2012.07.025.
Li et al., "Parylene-based integrated wireless single-channel neurostimulator", Sensors and Actuators A: Physical, vol. 166, Issue 2, Apr. 2011, pp. 193-200, https://doi.org/10.1016/j.sna.2010.03.003.
Sun et al., "A two-hop wireless power transfer system with an efficiency-enhanced power receiver for motion-free capsule endoscopy inspection", IEEE Transactions on Biomedical Engineering, vol. 59, No. 11, Nov. 2012, published online Jun. 29, 2012, pp. 3247-3254, doi: 10.1109/TBME.2012.2206809.
Sun et al., "Wirelessly powered implantable pacemaker with on-chip antenna", 2017 IEEE MTT-S International Microwave Symposium (IMS), Jun. 4-9, 2017, pp. 1242-1244, DOI: 10.1109/MWSYM.2017.8058831.
Zargham et al., "Fully Integrated on-Chip Coil in 0.13 µm CMOS for Wireless Power Transfer Through Biological Media", IEEE Transactions on Biomedical Circuits and Systems, Aug. 2014, vol. 9, No. 2, 13 pgs., DOI:10.1109/TBCAS.2014.2328318.
Extended European Search Report for European Application No. 20860681.4, Search completed Jul. 26, 2023, Mailed Aug. 2, 2023, 7 pgs.
Extended European Search Report for European Application No. 20866392.2, Search completed Aug. 31, 2023, Mailed Sep. 11, 2023, 5 pgs.
International Preliminary Report on Patentability for International Application PCT/US2021/073036, Report issued Jun. 13, 2023, Mailed on Jun. 29, 2023, 10 pgs.
Andersen et al., "A 118-mw pulse-based radar soc in 55-nm CMOS for non-contact human vital signs detection", IEEE Journal of Solid-State Circuits, vol. 52, No. 12, 2017, pp. 3421-3433.
Bahrami et al., "System Level Design of a Full-Duplex Wireless Transceiver for Brain-Machine Interfaces", IEEE Transactions on Microwave Theory and Techniques, vol. 64, No. 10, Oct. 2016, 10 pgs.
Besnoff et al., "Battery-free multichannel digital ECG biotelemetry using UHF RFID techniques", 2013 IEEE International Conference on RFID, 2013, pp. 16-22.
Bourdel et al., "A 9-pJ/pulse 1.42-Vpp OOK CMOS UWB pulse generator for the 3.1-10.6-GHz FCC band", IEEE Transactions on Microwave Theory and Techniques, vol. 58, No. 1, 2009, pp. 65-73.
Choi et al., "A Wirelessly Powered Microspectrometer for Neural Probe-Pin Device.", Micro+Nano Materials, Devices, and Systems, 2015, SPIE, vol. 9668, 8 pgs.
Cruz et al., "Hybrid UHF/UWB antenna for passive indoor identification and localization systems", IEEE Transactions on Antennas and Propagation, vol. 61, No. 1, 2013, pp. 354-361.
Hagen et al., "Multimodal Modeling of Neural Network Activity: Computing LFP, ECOG, EEG, and MEG Signals With LFPy 2.0", Frontiers in Neuroinformatics, vol. 12, No. 92, 2018, 59 pgs.
Harrison, Reid, "The Design of Integrated Circuits to Observe Brain Activity", Proceedings of the IEEE, vol. 96, No. 7, Jul. 2008, pp. 1203-1216.
Huang et al., "A 1-µW 10-bit 200-kS/s SAR ADC With a Bypass Window for Biomedical Applications", IEEE Journal of Solid-State Circuits, vol. 47, No. 11, Nov. 2012, pp. 2783-2795.
Koski et al., "Fundamental Characteristics of Electro-Textiles in Wearable UHF RFID Patch Antennas for Body-Centric Sensing Systems", IEEE Transactions on Antennas and Propagation, vol. 62, No. 12, Dec. 2014, Date of Publication: Oct. 20, 2014, pp. 6454-6462.
Liu et al., "A 10-bit 50-MS/s SAR ADC With a Monotonic Capacitor Switching Procedure", IEEE Journal of Solid-State Circuits, vol. 45, No. 4, Apr. 2010, pp. 731-740.
Lu et al., "Performance evaluation of a long-range RFID tag powered by a vibration energy harvester", IEEE Antennas and Wireless Propagation Letters, vol. 16, 2017, pp. 1832-1835.
Lyu et al., "A 100-M/s 2.6-pJ/pulse compact UWB impulse transmitter based on antenna-and-pulse-generator codesign", IEICE Electronics Express, vol. 16, No. 24, 20190672-20190672, 2019, 4 pgs.
Lyu et al., "A 915-MHz Far-Field Energy Harvester With—22-dBm Sensitivity and 3-V Output Voltage Based on Antenna-and-Rectifier Codesign", IEEE Microwave and Wireless Components Letters, vol. 29, No. 8, 2019, pp. 557-559.
Marrocco et al., "The art of UHF RFID antenna design: Impedance-matching and size-reduction techniques", IEEE Antennas and Propagation Magazine, vol. 50, No. 1, 2008, pp. 66-79.

(56) References Cited

OTHER PUBLICATIONS

Nikitin et al., "Power reflection coefficient analysis for complex impedances in RFID tag design", IEEE Transactions on Microwave Theory and Techniques, vol. 53, No. 9, 2005, pp. 2721-2725.
Occhiuzzi et al., "Modeling, design and experimentation of wearable RFID sensor tag", IEEE Transactions on Antennas and Propagation, vol. 58, No. 8, 2010, pp. 2490-2498.
Rahmani et al., "An Integrated Battery-Less Wirelessly Powered RFID Tag with Clock Recovery and Data Transmitter for UWB Localization", Microwave, MTT-S International Symposium, Aug. 4-6, 2020, Los Angeles, CA, USA, pp. 460-463, DOI: 10.1109/IMS30576.2020.9223821.
Rajavi et al., "An energy harvested ultra-low power transceiver for Internet of Medical Things", European Conference on Solid-State Circuits (ESSCIRC): 42nd Solid-State Circuits Conference, Lausanne, Switzerland, Sep. 12-15, 2016, pp. 133-136.
Riaz et al., "A novel design of UHF RFID passive tag antenna targeting smart cards limited area", 2018 IEEE International Conference on Consumer Electronics (ICCE), 2018, pp. 4 pgs.
Schleircher et al., "IR-UWB radar demonstrator for ultra-fine movement detection and vital-sign monitoring", IEEE transactions on microwave theory and techniques, vol. 61, No. 5, 2013, pp. 2076-2085.
Tan et al., "A 1.2-V 8.3-nJ CMOS humidity sensor for RFID applications", IEEE Journal of Solid-State Circuits, vol. 48, No. 10, 2013, pp. 2469-2477.
Vaz et al., "Full passive UHF tag with a temperature sensor suitable for human body temperature monitoring", IEEE Transactions on Circuits and Systems II: Express Briefs, vol. 57, No. 2, 2010, pp. 95-99.
Wang et al., "Single-antenna Doppler radars using self and mutual injection locking for vital sign detection with random body movement cancellation", IEEE Transactions on Microwave Theory and Techniques, vol. 59, No. 12, 2011, pp. 3577-3587.
Yakovlev et al., "An 11 µW Sub-pJ/bit Reconfigurable Transceiver for mm-Sized Wireless Implants", IEEE Transactions on Biomedical Circuits and Systems, Sep. 2013, vol. 10, No. 1, 4 pgs., DOI:10.1109/CICC.2013.6658501.
Yang et al., "Wearable RFID-enabled sensor nodes for biomedical applications", 58th Electronic Components and Technology Conference, 2008, pp. 2156-2159.
Yeager et al., "A 9 µA, Addressable Gen2 Sensor Tag for Biosignal Acquisition", IEEE Journal of Solid-State Circuits, vol. 45, No. 10, 2010, pp. 2198-2209.
Papotto et al., "A 90nm CMOS 5mb/s crystal-less rf transceiver for rf-powered WSN nodes", 2012 IEEE International Solid-State Circuits Conference, Feb. 19-23, 2012, pp. 451-453, DOI: 10.1109/ISSCC.2012.6177087.
Paul, "Inductance: loop and partial", John Wiley & Sons, 2011, 395 pgs. (presented in two parts).
Pellerano et al., "A mm-Wave Power-Harvesting RFID Tag in 90 nm CMOS", IEEE Journal of Solid-State Circuits, Aug. 2010, vol. 45, Issue 8, pp. 1627-1637, DOI: 10.1109/JSSC.2010.2049916.
Pozar, David M., "Microwave Engineering", John Wiley & Sons, Inc., Third Edition, 2005, Chapter 13 (Oscillators and Mixers): pp. 604-657, Chapter 14 (Introduction to Microwave Systems): pp. 658-708, 105 pgs.
Radiom et al., "Far-Field On-Chip Antennas Monolithically Integrated in a Wireless-Powered 5.8-GHz Downlink/UWB Uplink RFID Tag in 0.18-µm Standard CMOS", IEEE Journal of Solid-State Circuits, Sep. 2010, vol. 45, Issue 9, pp. 1746-1758, DOI: 10.1109/JSSC.2010.2055630.
Rahmani et al., "A 1.6mm3 Wirelessly Powered Reconfigurable FDD Radio with On-Chip Antennas Achieving 4.7 pJ/b TX and 1 pJ/b RX Energy Efficiencies for Medical Implants", Conference: 2020 IEEE Custom Integrated Circuits Conference (CICC), Apr. 2020, 4 pgs., DOI: 10.1109/CICC48029.2020.9075935.
Rahmani et al., "A Dual-Mode RF Power Harvesting System With an On-Chip Coil in 180-nm SOI CMOS for Millimeter-Sized Biomedical Implants", IEEE Transactions on Microwave Theory and Techniques, Oct. 2018, vol. 67, No. 1, pp. 414-428, DOI: 10.1109/TMTT.2018.2876239.
Rahmani et al., "A Wireless Power Receiver with an On-chip Antenna for Millimeter-size Biomedical Implants in 180 nm SOI CMOS", in 2017 IEEE MTT-S International Microwave symposium (IMS), Jun. 2017, pp. 300-303.
Rahmat-Samii et al., "Implanted antennas in medical wireless communications", Synthesis Lectures on Antennas, 2005, 1.1, pp. 1-82.
Rajavi et al., "An RF-powered FDD radio for neural microimplants", IEEE Journal of Solid-State Circuits, May 2017, vol. 52, Issue 5, pp. 1221-1229, DOI: 10.1109/JSSC.2016.2645601.
Ramrakhyani et al., "Design and Optimization of Resonance-Based Efficient Wireless Power Delivery Systems for Biomedical Implants", IEEE Transactions on Biomedical Circuits and Systems, vol. 5, No. 1, Feb. 2011, pp. 48-63.
Randles, "Kinetics of rapid electrode reactions", Discussions of the Faraday Society, 1947, vol. 1, pp. 11-19.
Rategh et al., "Superharmonic Injection-Locked Frequency Dividers", IEEE Journal of Solid-State Circuits, Jun. 1999, vol. 34, No. 6, pp. 813-821.
Razavi, "Design of analog CMOS Integrated Circuits", McGraw-Hill Series in Electrical and Computer Engineering, 2001, 706 pgs., (presented in eight parts).
Razavi, Behzad, "Rf Microelectronics", New Jersey: Prentice Hall, 1998, vol. 1, 98 pgs., Chapter 8: pp. 497-594.
Rodriguez et al, "Long-term results of electrical stimulation of the lower esophageal sphincter for the treatment of gastroesophageal reflux disease", Endoscopy, Aug. 2013, vol. 45, No. 8, pp. 595-604, DOI: 10.1055/s-0033-1344213.
Sample et al., "Analysis, Experimental Results, and Range Adaptation of Magnetically Coupled Resonators for Wireless Power Transfer", IEEE Transactions on Industrial Electronics, vol. 58, No. 2, Feb. 2011, pp. 544-554, DOI: 10.1109/TIE.2010.2046002.
Sankaragomathi et al., "A 27w subcutaneous wireless biosensing platform with optical power and data transfer", Proceedings of the IEEE 2014 Custom Integrated Circuits Conference, Sep. 15, 2014, pp. 1-4.
Sayenko et al., "Spinal segment-specific transcutaneous stimulation differentially shapes activation pattern among motor pools in humans", Journal of Applied Physiology, 2015, vol. 118, pp. 1364-1374, first published Mar. 26, 2015; doi:10.1152/japplphysiol.01128.2014.
Shi et al., "A 10 mm3 Inductive Coupling Radio for Syringe-Implantable Smart Sensor Nodes", IEEE Journal of Solid-State Circuits, Nov. 2016, vol. 51, No. 11, pp. 2570-2583, DOI: 10.1109/JSSC.2016.2606162.
Shi et al., "A 10mm3 syringe-implantable near-field radio system on glass substrate", IEEE Int. Solid-State Circuits Conf. (ISSCC) Dig. Tech. Papers, pp. 448-449, Feb. 2016.
Silvetti et al., "Cardiac pacing in paediatric patients with congenital heart defects: transvenous or epicardial?", Europace, vol. 15, No. 9, Sep. 2013, published online Feb. 24, 2013, pp. 1280-1286, doi: 10.1093/europace/eut029.
Soontornpipit, "Design of an Implantable Antenna Feasibility Study for Continuous Glucose Monitoring", ECTI Transactions on Electrical Engineering, Electronics, and Communications, Feb. 2014, vol. 12, No. 1, pp. 44-52.
Stoopman et al., "Co-Design of a CMOS Rectifier and Small Loop Antenna for Highly Sensitive RF Energy Harvesters", IEEE Journal of Solid-State Circuits, Mar. 2014, vol. 49, Issue 3, pp. 622-634, DOI: 10.1109/JSSC.2014.2302793.
Sun et al., "A wirelessly powered injection-locked oscillator with on-chip antennas in 180nm SOI CMOS", 2016 IEEE MTT-S International Microwave Symposium (IMS), Aug. 11, 2016, pp. 1-3 [online], [retrieved on Aug. 14, 2020]. Retrieved from the Internet <URL: https://ieeexplore.ieee.org/abstract/document/7540249>, entire document.
Sun et al., "A Wirelessly Powered Injection-Locked Oscillator With On-Chip Antennas in 180-nm SOI CMOS for Spectroscopy Application", IEEE Sensors Letters, vol. 3, No. 7, Jul. 3, 2019, pp. 1-4 [online], [retrieved on Aug. 14, 2020]. Retrieved from the Internet <URL: https://ieeexplore.ieee.org/abstract/document/8754750>.

(56) References Cited

OTHER PUBLICATIONS

Tabesh et al., "A Power-Harvesting Pad-Less Millimeter-Sized Radio", IEEE Journal of Solid-State Circuits, Apr. 2015, vol. 50, Issue 4, pp. 962-977, DOI: 10.1109/JSSC.2014.2384034.

Teh et al., "Design and analysis of UHF micropower CMOS DTMOST rectifiers", IEEE Transactions on Circuits and Systems-II: Express Briefs, Feb. 2009, vol. 56, No. 2, pp. 122-126, doi: 10.1109/TCSII.2008.2010190.

Theilmann et al., "A µW Complementary Bridge Rectifier with Near Zero Turn-on Voltage in SOS CMOS for Wireless Power Supplies", IEEE Transactions on Circuits and Systems I: Regular Papers, 2012, vol. 59, No. 9, pp. 2111-2124, DOI: 10.1109/TCSI.2012.2185293.

Tjong et al., "Permanent Leadless Cardiac Pacemaker Therapy A Comprehensive Review", Circulation, Apr. 11, 2017, vol. 135, pp. 1458-1470, DOI: 10.1161/CIRCULATIONAHA.116.025037.

Tolosa et al., "Electrochemically deposited iridium oxide reference electrode integrated with an electroenzymatic glutamate sensor on a multi-electrode array microprobe", Biosensors and Bioelectronics, 2013, vol. 42, pp. available online Nov. 6, 2012, pp. 256-260, http://dx.doi.org/10.1016/jbios.2012.10.061.

Van Dongen et al., "Does a coupling capacitor enhance the charge balance during neural stimulation? An empirical study", Medical & Biological Engineering and Computing, 2016, vol. 54, pp. 93-101, published online May 29, 2015, DOI 10.1007/s11517-015-1312-9.

Van Rees et al., "Implantation-related complications of implantable cardioverter-defibrillators and cardiac resynchronization therapy devices: a systematic review of randomized clinical trials", Journal of the American College of Cardiology, Aug. 30, 2011, vol. 58, Issue 10, pp. 995-1000, https://doi.org/10.1016/j.jacc.2011.06.007.

Wan et al., "Analysis and design of a thermoelectric energy harvesting system with reconfigurable array of thermoelectric generators for IoT applications", IEEE Transactions on Circuits and Systems I: Regular Papers, Sep. 2017, vol. 64, No. 9, pp. 2346-2358, DOI: 10.1109/TCSI.2017.2708763.

Weber et al., "A Miniaturized Single-Transducer Implantable Pressure Sensor With Time-Multiplexed Ultrasonic Data and Power Links", IEEE Journal of Solid-State Circuits, Apr. 2018, vol. 53, No. 4, pp. 1089-1101, DOI: 10.1109/JSSC.2017.2782086.

Weber et al., "Functional electrical stimulation using microstimulators to correct foot drop: a case study1", Canadian Journal of Physiology and Pharmacology, 2004, vol. 82, No. 8-9, first published Oct. 19, 2004, pp. 784-792, doi: 10.1139/Y04-078.

Xie et al., "Wireless power transfer and applications to sensor networks", IEEE Wireless Communications, Aug. 2013, vol. 20, Issue 4, pp. 140-145, DOI: 10.1109/MWC.2013.6590061.

Xu et al., "A fully implantable stimulator with wireless power and data transmission for experimental investigation of epidural spinal cord stimulation", IEEE Transactions on Neural Systems and Rehabilitation Engineering, 2015, vol. 23, No. 4, pp. 683-692, DOI: 10.1109/TNSRE.2015.2396574.

Yadav et al., "Low Voltage Low Power Sub-threshold Operational Amplifier in 180nm CMOS", 2017 IEEE Third International Conference on Sensing signal Processing and Security (ICSSS), 2017, 4 pgs.

Yi et al., "Analysis and design strategy of UHF micro-power CMOS rectifiers for micro-sensor and RFID applications", IEEE Transactions on Circuits and Systems I: Regular Papers, Jan. 15, 2007, vol. 54, Issue 1, pp. 153-166, DOI: 10.1109/TCSI.2006.887974.

Yu et al., "Cardiac resynchronization therapy: state of the art 2013", European Heart Journal, vol. 34, Issue 19, May 14, 2013, online published Jan. 25, 2013, pp. 1396-1403, https://doi.org/10.1093/eurheartj/ehs454.

Yvanoff et al., "A Feasibility Study of Tissue Characterization Using Implanted LC Sensors", IEEE Transactions on Antennas and Propagation, Apr. 2009, vol. 57, Issue 4, pp. 885-893, DOI: 10.1109/TAP.2009.2016073.

Zargham et al., "Fully Integrated On-Chip Coil in 0.13 µm CMOS for Wireless Power Transfer Through Biological Media", IEEE Transactions on Biomedical Circuits and Systems, Apr. 2015, vol. 9, Issue 2, pp. 259-271, DOI: 10.1109/TBCAS.2014.2328318.

Zhang et al., "A 23 µA RF-powered transmitter for biomedical applications", 2011 IEEE Radio Frequency Integrated Circuits Symposium, 4 pgs., DOI: 10.1109/RFIC.2011.5940711.

Zhang et al., "A Miniature Mode Reconfigurable Inductorless IR-UWB Transmitter—Receiver for Wireless Short-Range Communication and Vital-Sign Sensing", IEEE Journal of Emerging and Selected Topics in Circuits and Systems, vol. 8, No. 2, Jun. 2018, pp. 294-305.

Extended European Search Report for European Application No. 21759630.3, Search completed Apr. 2, 2024, Mailed Apr. 12, 2024, 8 Pgs.

Akin et al., "A Telemetrically Powered and Controlled Implantable Neural Recording System with CMOS Interface Circuitry", Proceedings of the Mediterranean Electrotechnical Conference . Antalya, Turkey, New York, IEEE, US, vol. 2, No. ISBN: 978-0-7803-1772-6, Apr. 12 1994, pp. 545-548, XP000506184.

* cited by examiner

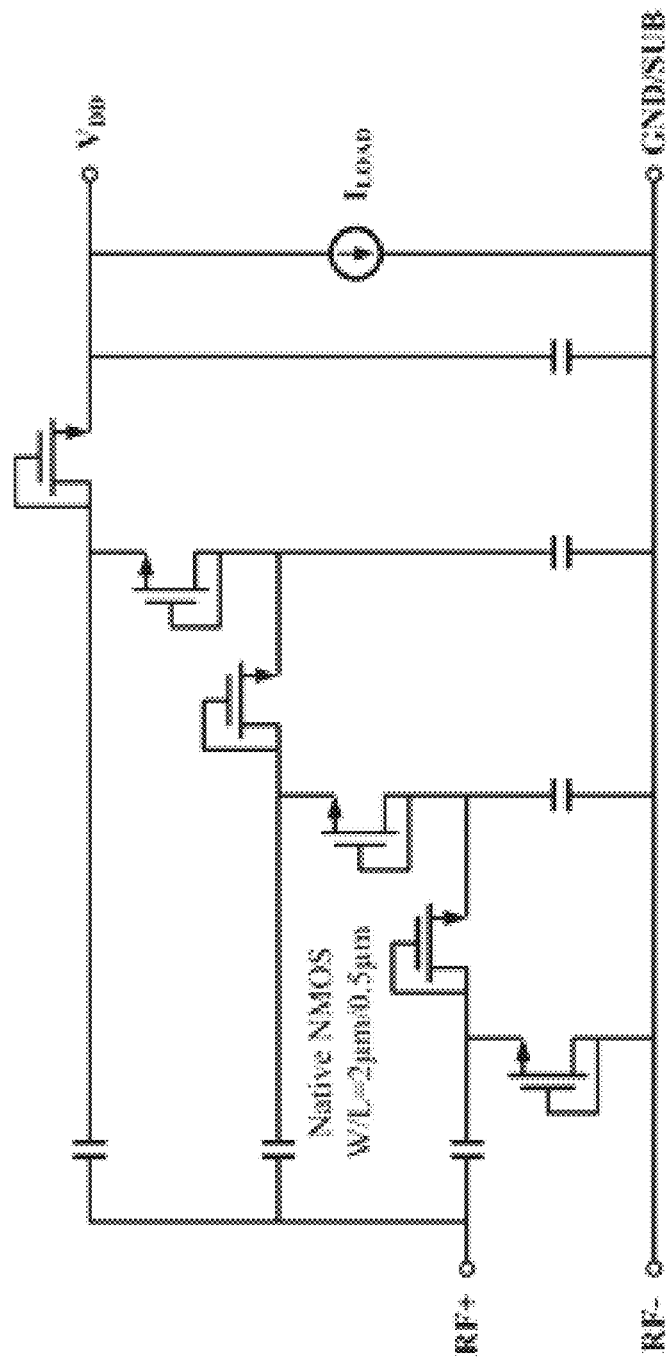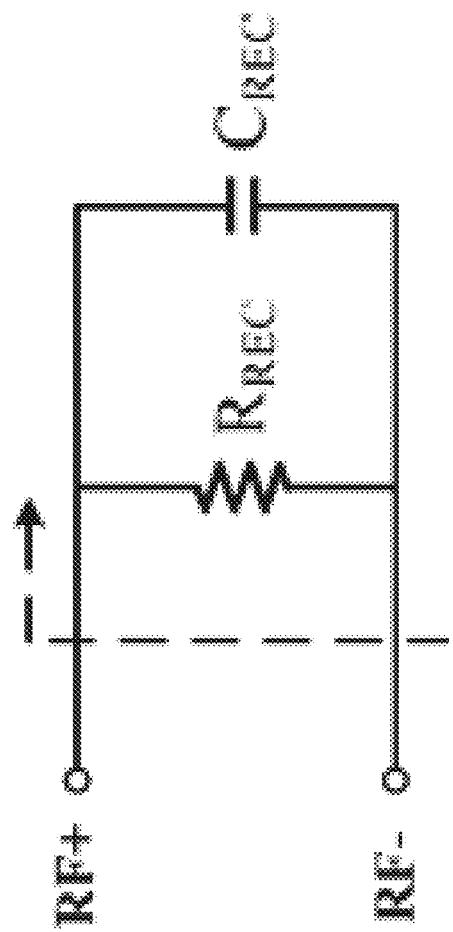
FIG. 12A
FIG. 12B

FIG. 23A
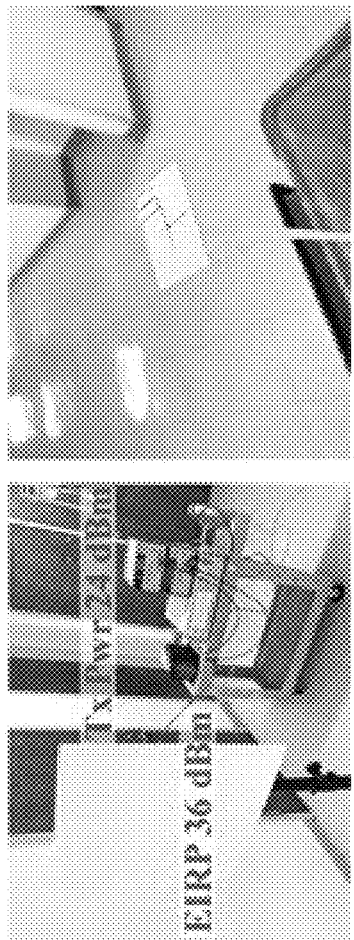
FIG. 23B
FIG. 23C

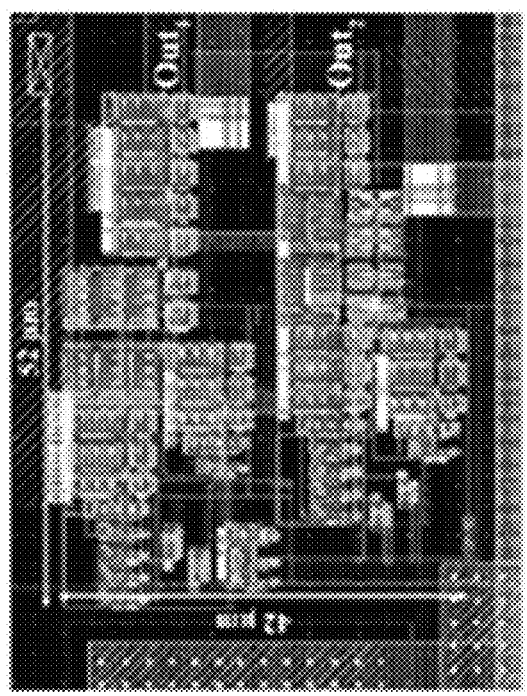
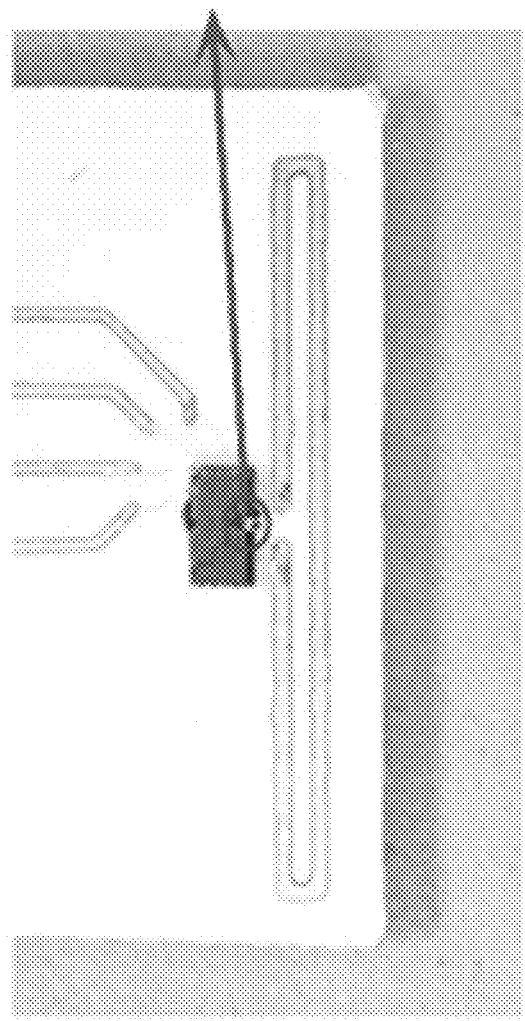
FIG. 33A  
FIG. 33B

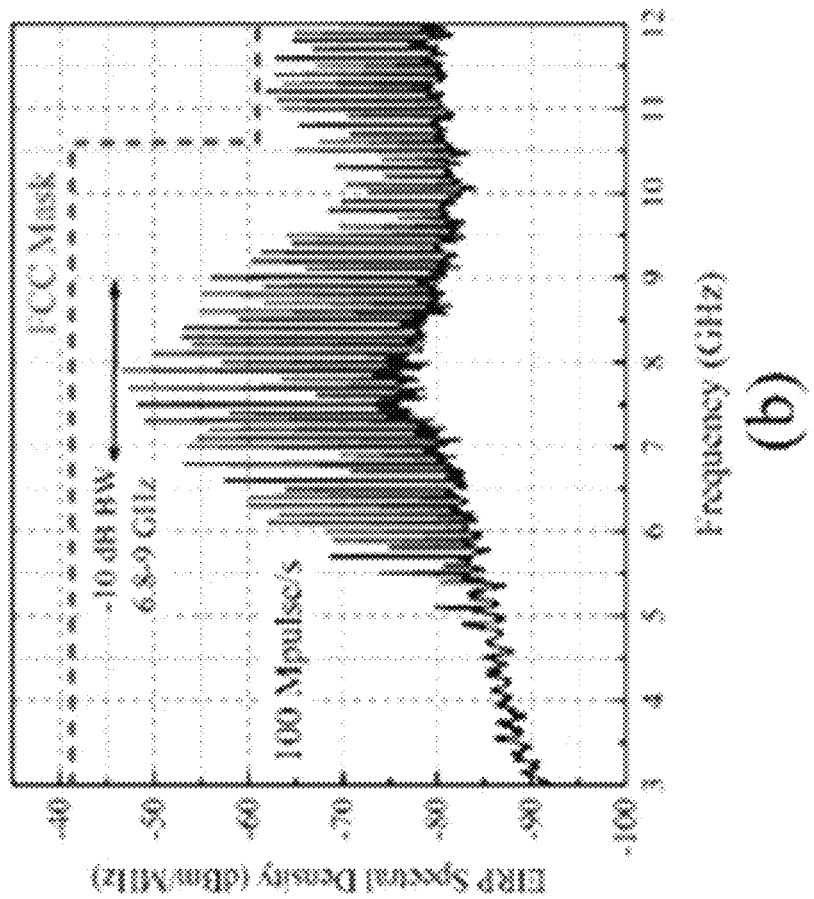
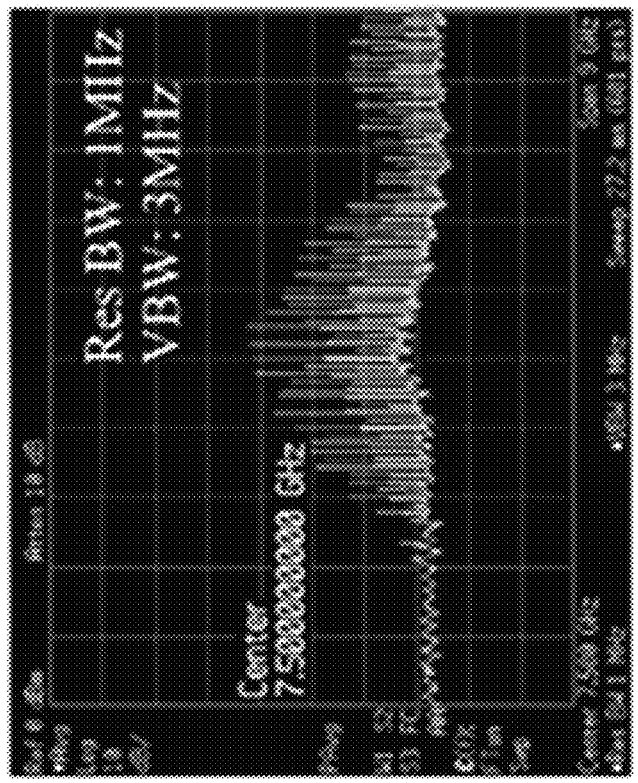
FIG. 35A
FIG. 35B

Table – Performance comparison of edge-combining based IR-UWB transmitters.

| | [8] | [6] | [7] | [9] | This work |
|---|---|---|---|---|---|
| Tech | 65 nm | 180 nm | 180 nm | 130 nm | 180 nm |
| Method | Pulse-combining | Pulse-combining | Filtered Edge-combining | Filtered Edge-combining | Antenna Co-design |
| BW | 3.1-8 GHz | 6-10 GHz | 3.5-6.5 GHz | 6.8 GHz | 6.8-9 GHz |
| Data Rate | 10 Mb/s | 750 Mb/s | 250 Mb/s | 100 Mb/s | 100 Mb/s |
| VDD | 1.2 V | 1.8-2.2 V | 1.8 V | 1.2 V | 1.5 V |
| Energy/Pulse | 21.6 pJ | 12 pJ | 86 pJ | 38.4 pJ | 2.6 pJ |
| IC Area | 0.03 mm$^2$ | 0.045 mm$^2$ | 0.22 mm$^2$ | 0.54 mm$^2$ | 0.002 mm$^2$ |

FIG. 36

SYSTEMS AND METHODS FOR LONG-DISTANCE REMOTE SENSING WITH SUB-WAVELENGTH RESOLUTION USING A WIRELESSLY-POWERED SENSOR TAG ARRAY

CROSS REFERENCE TO RELATED APPLICATIONS

The current application is a national stage of PCT Patent Application No. PCT/US2020/041007 entitled "Systems and Methods for Long-Distance Remote Sensing With Sub-Wavelength Resolution Using a Wirelessly-Powered Sensor Tag Array" filed Jul. 7, 2020, which claims the benefit of U.S. Provisional Patent Application No. 62/990,790 entitled "Systems and Methods for Long-Distance Remote Sensing with Sub-Wavelength Resolution Using a Wirelessly-Powered Sensor Tag Array" filed Mar. 17, 2020 and U.S. Provisional Patent Application No. 62/871,461 entitled "Antenna-Co-Designed UWB Impulse Transmitter for Size-Constraint Applications" filed Jul. 8, 2019, the disclosures of which are incorporated herein by reference in their entirety.

FIELD OF THE INVENTION

The present invention generally relates to remote sensing and more specifically, to remote sensing using radio frequency identification (RFID) tags.

BACKGROUND

Non-contact continuous monitoring of human vital signs can be important in healthcare applications as it can eliminate the need for long wires and physical contacts of bulky devices, which can result in discomforts and infections. Such wireless health-monitoring systems can enable home surveillance and deliver real-time vital-sign information to a remote caregiver. Wireless monitoring can also be used for patients who need constant monitoring such as those in intensive care units (ICUs) and newborn babies in incubators. Part of the latest research has been focusing on radars systems and noncontact impedance sensing. However, these technologies are generally prone to interferences caused by other human subjects, or are limited in operational range.

Ultra-high frequency (UHF, e.g. 860-960 MHz) radio-frequency identification (RFID) systems can be utilized for object identification. Conventional remote sensing with radar techniques suffer from spatial resolution limited by (i) the wavelength of the electromagnetic waves and (ii) the size of the aperture (antenna).

Furthermore, in recent years, a large number of studies have been exploring the use of the unlicensed 3.1-10.6 GHz ultra-wideband impulse (IR-UWB) radio, which has a series of advantages such as compact size, low power consumption, and circuitry simplicity among others. Because of these merits, IR-UWB is especially popular for wearable and implantable devices.

BRIEF SUMMARY OF THE INVENTION

Systems and methods for long-distance remote sensing with sub-wavelength resolution using a wirelessly-powered sensor tag array in accordance with various embodiments of the invention are illustrated. In an embodiment, a remote sensing apparatus includes: a radio frequency identification (RFID) tag; an electromagnetic transmitter configured to emit electromagnetic waves; an ultra-wideband (UWB) receiver; a computer system, where: the RFID tag is configured to be operated without a battery, and to be powered by the electromagnetic waves emitted by the electromagnetic transmitter; where the RFID tag is configured to send out UWB impulses based on an amount of electromagnetic power received from the electromagnetic transmitter, such that a repetition rate of the UWB impulses varies with the amount of electromagnetic power received from the electromagnetic transmitter.

In a further embodiment, the computer system is configured to receive and process signals from the UWB receiver and to track movements of the RFID tag and/or to track changes in a communication channel between the electromagnetic transmitter and the RFID tag.

In still a further embodiment, the RFID tag is further configured to monitor a transmit channel between the electromagnetic transmitter and the RFID tag.

In still a further embodiment again, the electromagnetic transmitter is configured to use at least one of continuous wave and pulse electromagnetic signals to provide power to the RFID tag.

In yet a further embodiment, the RFID tag is further configured to use at least one of continuous wave and pulse electromagnetic signals to communicate with the UWB receiver.

In yet a further embodiment again still further includes an array of RFID tags, wherein each of the tags in the array of RFID tags is configured to monitor changes in an environment around each of the tags, and to produce an image of the environment around each RFID tag.

In a further embodiment still the remote sensing apparatus further includes an analyzer, where the analyzer is configured to analyze initial signals from the array of RFID tags and to identify a location of each of the tags by utilizing unique signals radiated by each of the tags.

In yet a further embodiment, the RFID tag includes a receiver antenna.

In still a further embodiment, the receiver antenna is at least one of on-chip and off-chip.

In still a further embodiment again, the RFID tag includes a transmitter antenna.

In yet a further embodiment, the RFID tag is further configured to measure vibration of the RFID tag.

In still a further embodiment, the RFID tag is further configured to monitor changes in an environment around the RFID tag.

In still a further embodiment, the RFID tag is further configured to send UWB signals based on movements caused by heart rate and respiration rate to the UWB receiver.

In still a further embodiment, the RFID tag is fabricated in a silicon technology including as CMOS or BiCMOS.

In another embodiment, an ultra-wideband impulse transmitter, includes: an input signal; a positive edge including a first output node; a negative edge including a second output node; an antenna; where each transition of the input signal triggers a Gaussian mono-pulse on at least one of the first output node and the second output node and subsequently drives the antenna, and while at least one of the first output node and the second output node emits a pulse, the other of the first output node and the second output node is tied to GND.

In a further embodiment, the antenna is at least one antenna selected from the group consisting of: a dipole antenna, a folded-dipole antenna, a loop antenna, a bow-tie antenna, a slot-bow-tie antenna, and a balanced antenna.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

FIG. 12A provides a circuit diagram of a rectifier in accordance with an embodiment of the invention. FIG. 12B provides a circuit diagram of an equivalent circuit of the rectifier of FIG. 12A in accordance with an embodiment of the invention.

FIG. 23A provides a photograph of an experimental setup of a far-field energy-harvesting measurement in accordance with an embodiment of the invention. FIG. 23B shows a photograph of an experimental setup of a transmitter and receiver in accordance with an embodiment of the invention. FIG. 23C shows a zoomed in photograph of the RFID tag of FIG. 23A in accordance with an embodiment of the invention.

FIG. 33A illustrates a photo of a transmitter and FIG. 33(B) layout of a pulse generator in accordance with an embodiment of the invention.

FIG. 35A illustrates a spectrum analyzer measurement result for a transmitter operating at 100 Mpulses/s and FIG. 35B illustrates calculated EIRP of the transmitter in accordance with an embodiment of the invention.

FIG. 36 illustrates a performance comparison of edge-combining based IR-UWB transmitters in accordance with an embodiment of the invention.

DETAILED DESCRIPTION OF THE DRAWINGS

Figure 1:
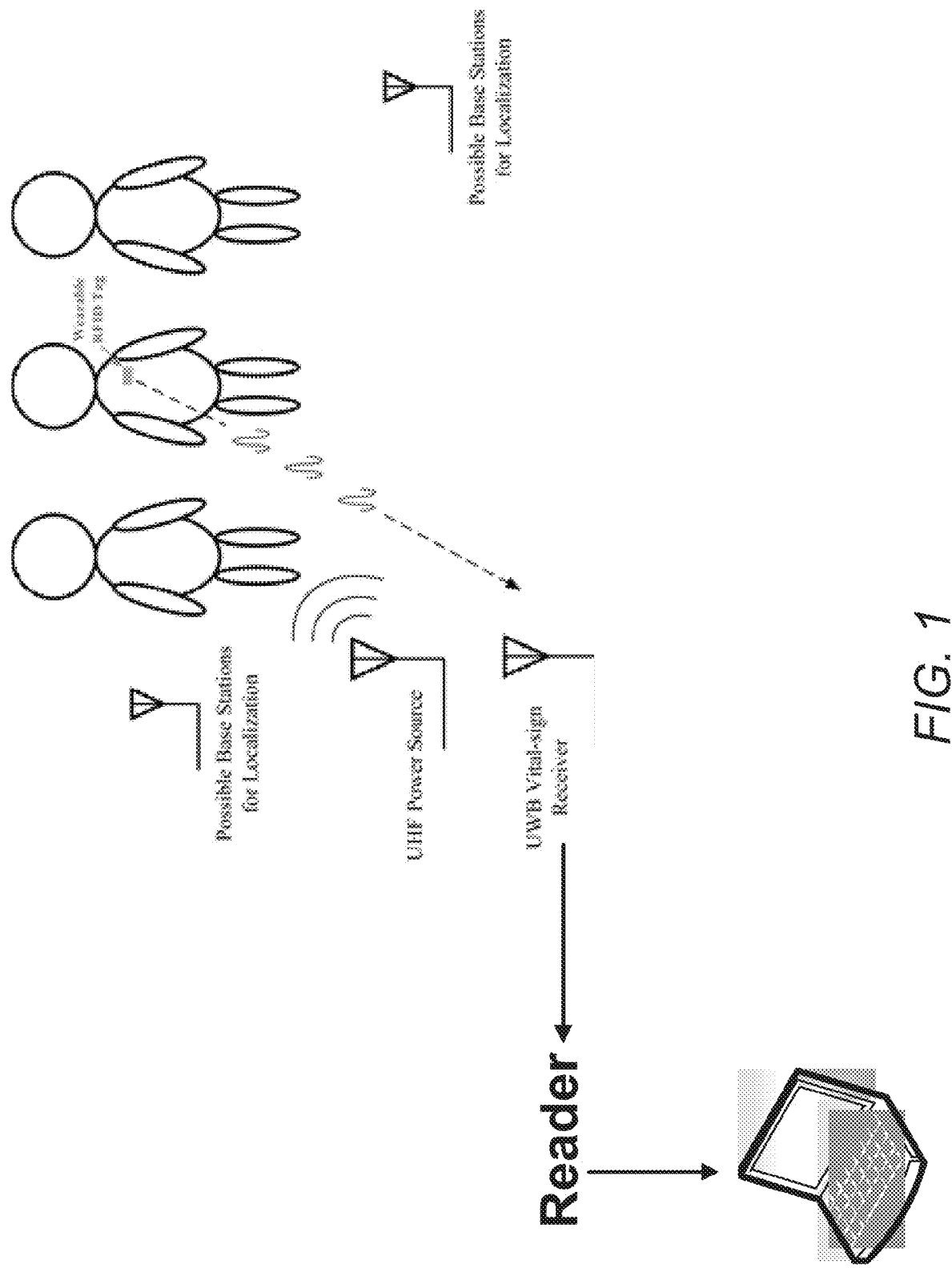
FIG. 1 illustrates a wearable RFID tag for remote vital-sign monitoring in accordance with an embodiment of the invention.

Turning now to the drawings, systems and methods for long-distance remote sensing with sub-wavelength resolution using a wirelessly-powered sensor tag array in accordance with various embodiments of the invention are illustrated. In many embodiments, a wearable RFID tag is realized with increased energy-harvesting sensitivity for remote and object-specific vital-sign monitoring applications. In various embodiments, systems and methods for long-distance remote sensing with sub-wavelength resolution using a wirelessly-powered non-contact sensor tag array provide increased spatial and temporal resolution for sensing at a distance. In many embodiments, the RFID tag is realized to operate without a battery (battery-less) and to be powered by an electromagnetic transmitter, such as a UHF transmitter. In several embodiments, a UHF/ultra-wideband (UWB) hybrid system design can be used since the UWB impulse radio (IR-UWB) transmitter can consume extremely low amount of power and can address potential needs for precise indoor localization. Centimeter-level ranging accuracy can be achieved based on time-difference-of-arrival (TDOA) schemes.

In several embodiments, an RFID tag can be used at a distance to sense and amplify small variations in close proximity of the RFID tag, and to transmit a signal representing these variations to a receiver at a remote distance. In various embodiments, spatial resolution in sensing can be limited by the RFID tag size and not the wavelength of the electromagnetic waves or aperture size of the remote transmitter or receiver. In many embodiments, a remote transmitter can provide wireless power to the tag. In certain embodiments, the tag can harvest electromagnetic energy and can transmit UWB pulses with varied repetition rate back to a remote receiver. In several embodiments, the repetition rate of the UWB pulses can depend on the amount of power received by the tag. In various embodiments, harvested power by the tag can decrease if a distance of the RFID tag to a power source increases, and the repetition rate of the UWB pulses radiated by the tag is reduced. In various embodiments, a computer system can receive and process signals from a UWB receiver in order to track movements of the RFID tag and/or to track changes in a communication channel between the electromagnetic transmitter and the RFID tag. In several embodiments, the RFID tag can send out UWB impulses based on an amount of electromagnetic power received from the electromagnetic transmitter, such that a repetition rate of the UWB impulses increases with the amount of electromagnetic power received from the electromagnetic transmitter.

In many embodiments, the harvested power by the RFID tag can be impacted if the environment around the tag changes, which can result in a change in the repetition rate of the UWB pulses radiated by the tag. In several embodiments, the RFID tag can be placed on a human subject to sense the heart rate and respiration rate by sensing a movement of the tag due to the subject's heart beat and respiration. The heart beat and respiration of the human subject can result in a change of in repetition rate of pulses sent out by the tag. In certain embodiments, by measuring the change in the repetition rate, heart rate and respiration rate can be detected from a remote distance. In many embodiments, systems and methods for long-distance remote sensing with sub-wavelength resolution using a wirelessly-powered sensor tag array can be used to measure (i) any change in the path from a transmitter to a receiver and (ii) any change in an environment surrounding the tag. In several embodiments, this method can be employed for infrastructure monitoring such as monitoring vibration of bridges, vibration of wind turbines, and can be employed in security applications as well.

In many embodiments, a UHF antenna and an integrated circuit (IC) can be codesigned in order to realize a high-quality factor (high-Q) conjugate impedance-matching interface. As a wearable RFID tag, such a high-Q frontend can be particularly sensitive to near-field effects caused by motions due to heartbeat and respiration. The motions due to heartbeat and respiration can be used by the RFID tag to modulate a repetition rate of UWB impulses sent out by the RFID tag. In various embodiments, the RFID tag utilizes UHF-band energy-harvesting and achieves a sensitivity of 50-meter operation in air. In several embodiments, the IC can be fabricated using CMOS process technology and can consume less than 1 µW power. In many embodiments, systems and methods for long-distance remote sensing with sub-wavelength resolution using a wirelessly-powered sensor tag array employs ultrasensitive far-field energy-harvesting system design and low-power implementation of an IR-UWB transmitter. In certain embodiments, remote vital-sign monitoring is validated on a human subject at low UHF power ratings. In various embodiments, the RFID tag is configured to measure vibration of the RFID tag.

Systems and methods for object-specific vital-sign monitoring with sub-wavelength resolution using a wirelessly-powered sensor tag array in accordance with an embodiment of the invention is illustrated in FIG. 1. As shown in FIG. 1, a wearable RFID tag for remote vital-sign monitoring is utilized along with a UHF power source, a base station for localization and an UWB vital-sign receiver in order to monitor the vital signs of patients. The UHF power source can be a transmitter configured to emit electromagnetic waves in frequency range 860-960 MHz. The UWB receiver can receive signals from the RFID tag and send it to a reader. The RFID tag can provide UWB signals based on variation in an environment of the tag, such as movements caused by heart beat and/or by respiration of a human subject. The reader can provide the signals to a computer system, which can process the received signals and can derive heart rate and/or respiration rate of a human subject based upon the received signals.

While specific systems and methods for object-specific vital-sign monitoring with sub-wavelength resolution using a wirelessly-powered sensor tag array are described above, any of a variety of different configurations of systems and methods for object-specific vital-sign monitoring with sub-wavelength resolution using a wirelessly-powered sensor tag array can be utilized including using any number of readers and/or utilizing readers that include multiple antennas and/or phased antenna arrays. Circuit designs are disclosed further below.

Circuit Designs

A. System Overview

Figure 2:
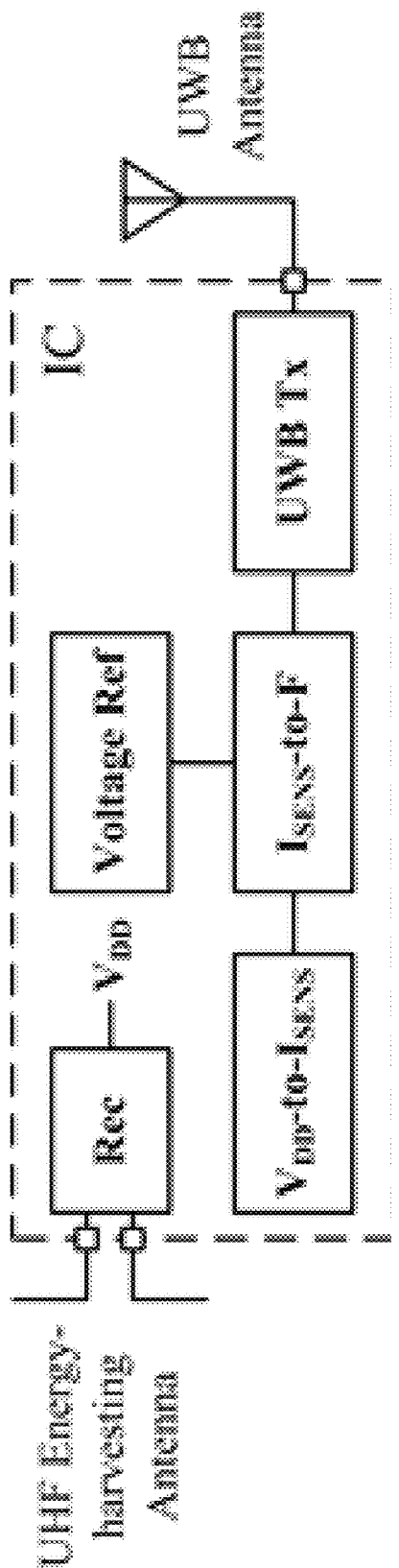
FIG. 2 illustrates a high-level circuit diagram of an ultra-high frequency (UHF)/ultra-wide band (UWB) RFID tag in accordance with an embodiment of the invention.

In many embodiments, a UHF antenna and an on-chip rectifier can be codesigned for conjugate matching. A high-level circuit diagram of an ultra-high frequency (UHF)/ultra-wide band (UWB) RFID tag in accordance with an embodiment of the invention is shown in FIG. 2. As shown in the illustrated embodiment, the system can be a high-Q system, and as such, the frontend is particularly sensitive to near-field medium variations. In a wearable setting, heartbeats and respirations modulate the supply voltage, $V_{DD}$, which can subsequently be converted to a repetition rate of UWB pulses. The system in the illustrated embodiment can be simple, low-power, and can require no discrete passive components.

While specific high-level circuit diagram of an ultra-high frequency/ultra-wide band RFID tag are described above with respect to FIG. 2, any of a variety of high-level circuit diagrams of an ultra-high frequency/ultra-wide band RFID tag can be utilized as appropriate to the requirements of specific applications in accordance with various embodiments of the invention. $V_{DD}$-to-Frequency blocks are disclosed further below.

B. $V_{DD}$-to-Frequency Blocks

Figure 3:
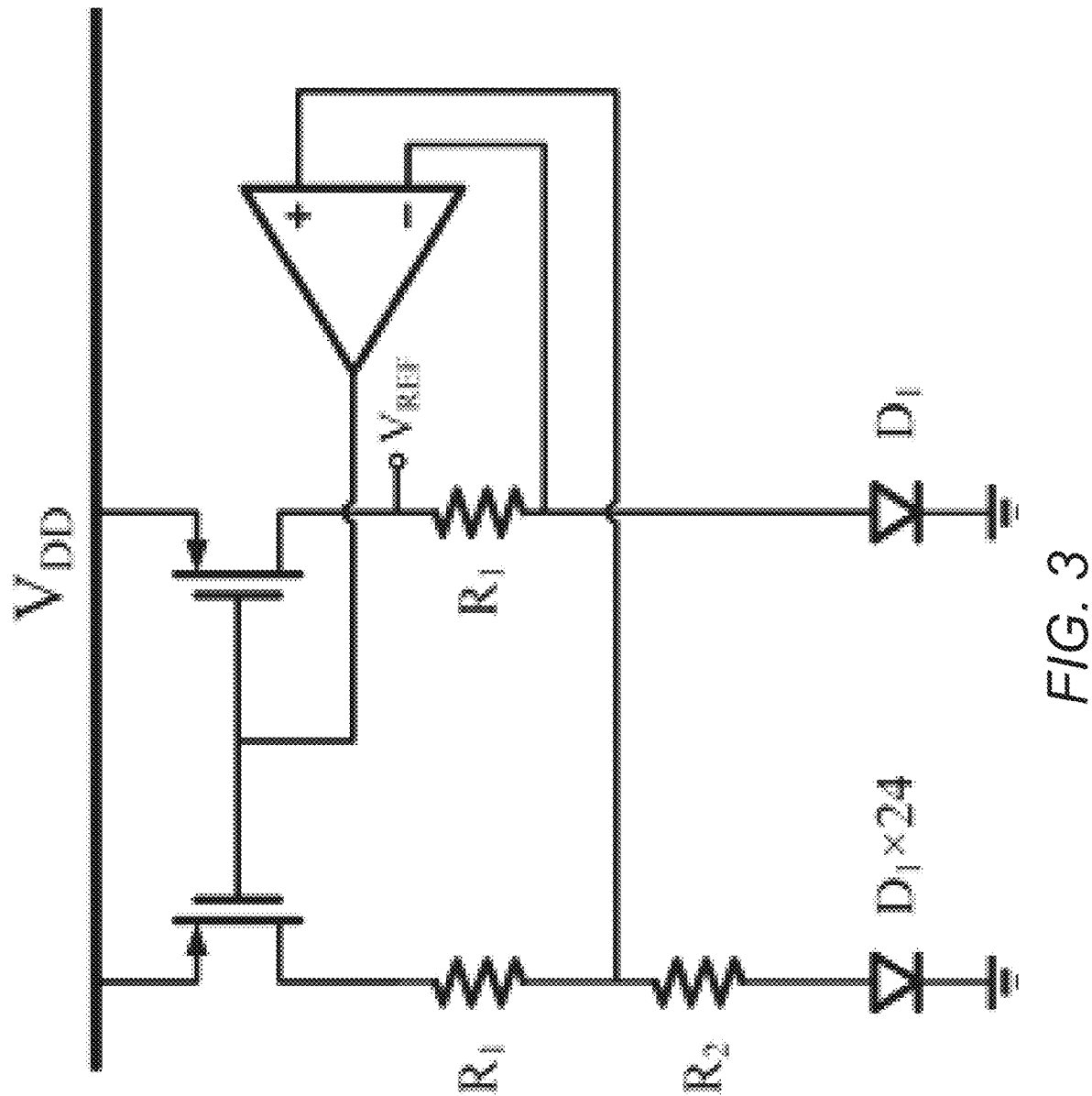
FIG. 3 illustrates a circuit diagram of a bandgap voltage reference in accordance with an embodiment of the invention.
Figure 4:
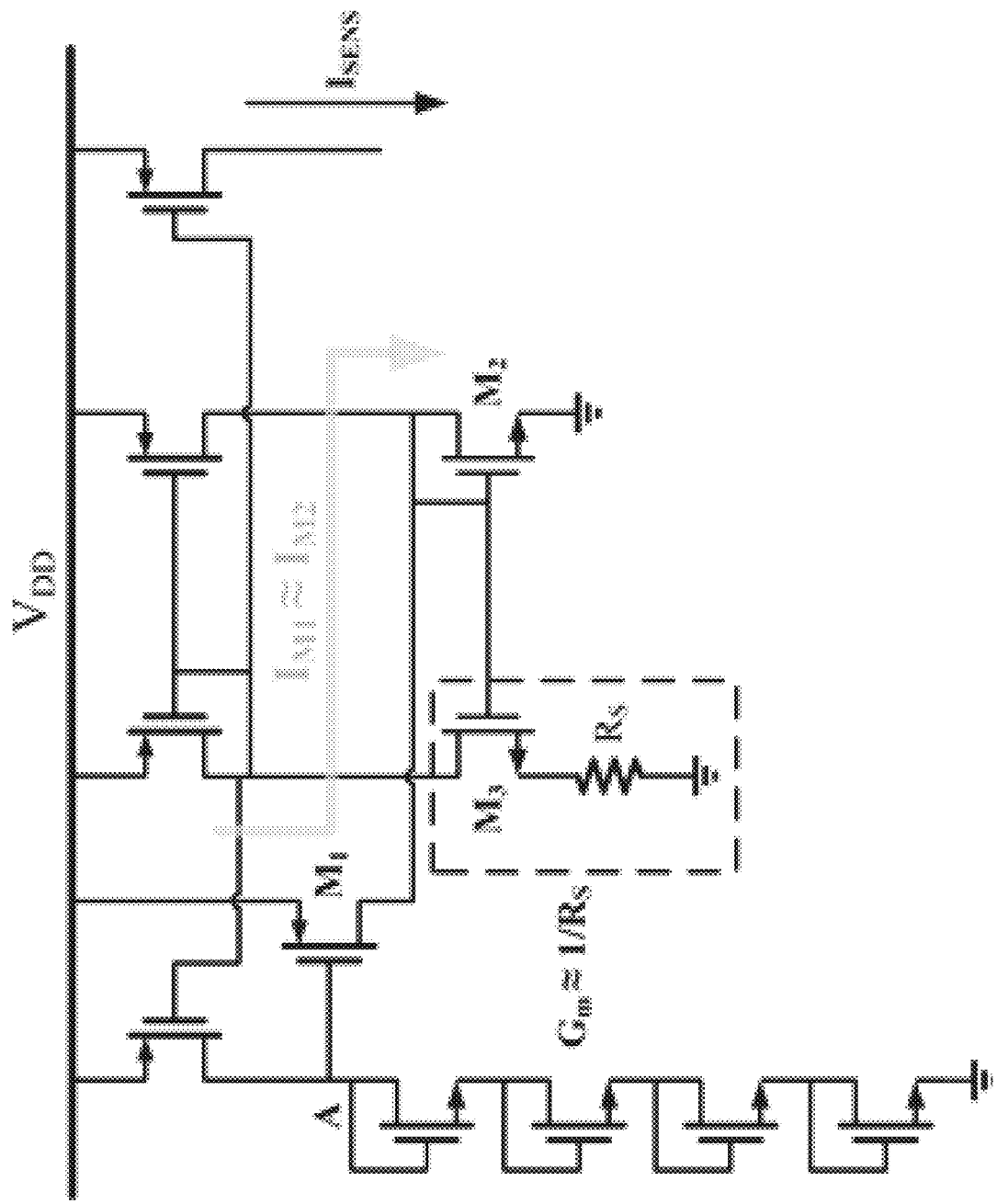
FIG. 4 illustrates a circuit diagram of a $V_{DD}$-to-$I_{SENS}$ block in accordance with an embodiment of the invention.
Figure 5:
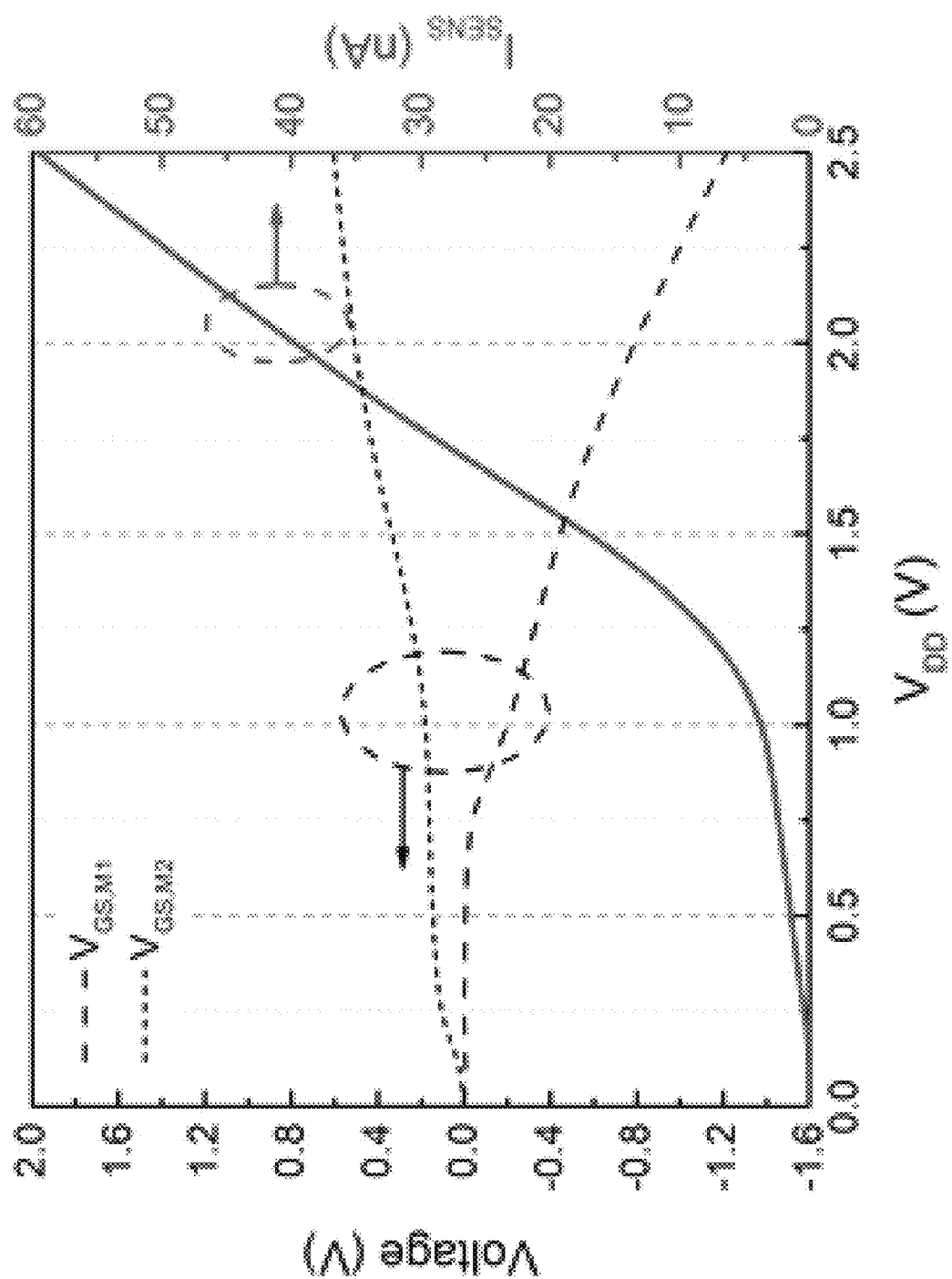
FIG. 5 illustrates simulation results of $V_{GS,M1}$, $V_{GS,M2}$, and $I_{SENS}$ as a function of $V_{DD}$ in accordance with an embodiment of the invention.
Figure 6:
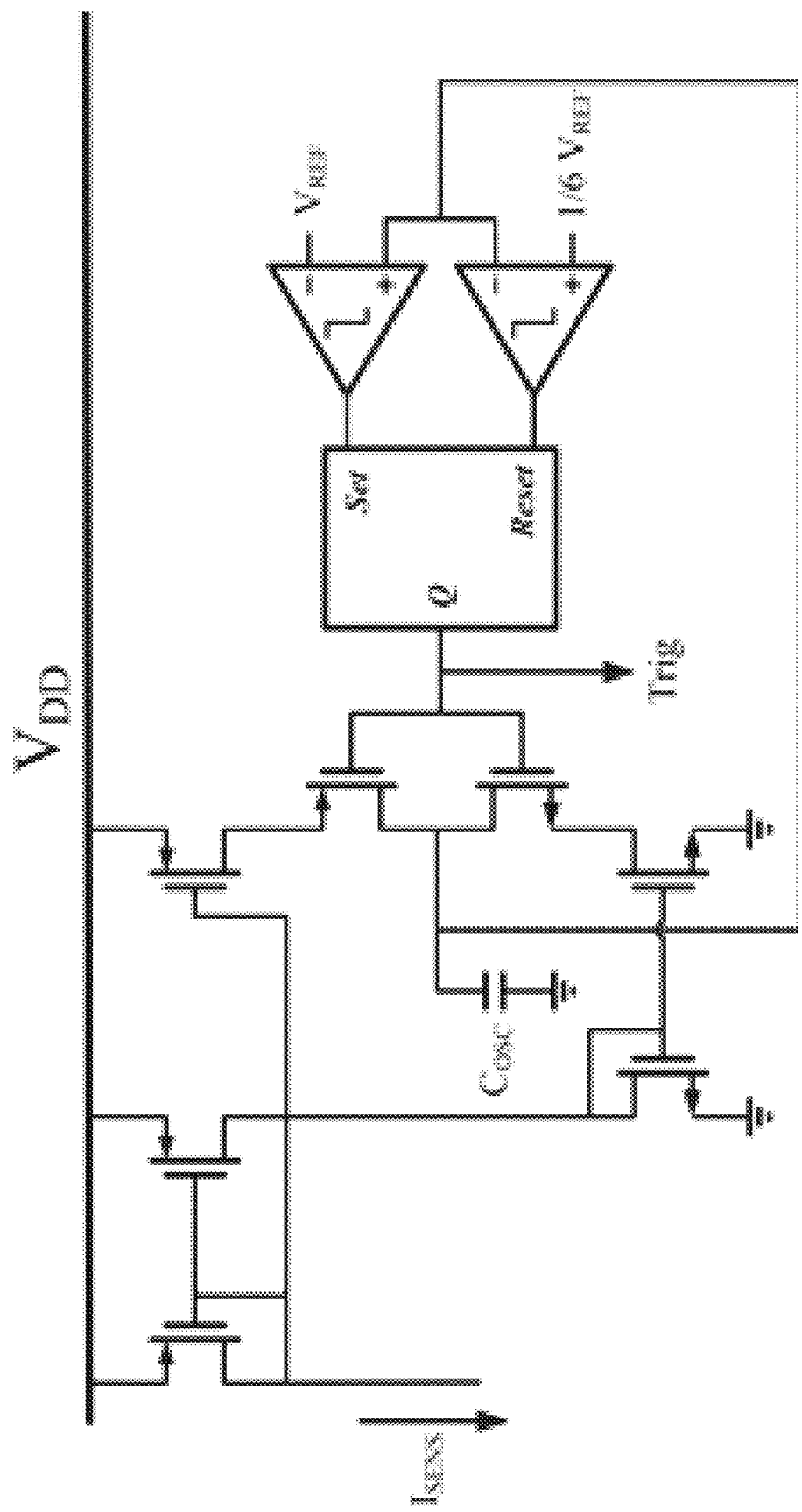
FIG. 6 illustrates a circuit diagram of an $I_{SENS}$-to-F converter in accordance with an embodiment of the invention.

A circuit diagram of a bandgap voltage reference in accordance with an embodiment of the invention is shown in FIG. 3. In the illustrated embodiment, the circuit topology features low $V_{DD}$ headroom. By choosing large values of $R_1$ and $R_2$, the circuit current consumption is reduced to approximately 200 nA. Note that the specific number for the current consumption can vary. Variation of $V_{DD}$ is converted to a current, $I_{SENS}$, by a circuit block shown in FIG. 4 in accordance with an embodiment of the invention. It should be noted that by proper gate sizing, $I_{SENS}$ can be designed to follow $V_{DD}$ linearly. The voltage of node A can be regulated by a series of diodes. Therefore, as $V_{DD}$ varies, the variation is applied to $V_{GS,M1}$. Given that $M_1$ and $M_2$ are comparably sized (both operating in saturation or subthreshold regions), $V_{GS,M2}$ and $V_{GS,M1}$ remain proportional. Source-degenerated $M_3$ converts $V_{GS,M2}$ to current. With $M_3$ transconductance of $1/R_S$, the overall conversion remains linear as a first-order approximation. Simulation results of $V_{GS,M1}$, $V_{GS,M2}$, and $I_{SENS}$ are shown in FIG. 5. $I_{SENS}$ is subsequently converted to an oscillation frequency by an I-to-F converter as shown in FIG. 6. $I_{SENS}$ charges a capacitor, $C_{OSC}$, that oscillates from $\frac{1}{6} V_{REF}$ to $V_{REF}$. $C_{OSC}$ is selected such that the oscillation frequency is at around 150 Hz for $V_{DD}$ of 1.6 V, which is sufficient for vital-sign signals. Note that the specific number for frequency of oscillation and for voltage of $V_{DD}$ can vary.

While specific $V_{DD}$-to-frequency blocks are described above with respect to FIGS. 3-6, any of a variety of $V_{DD}$-to-frequency blocks can be utilized as appropriate to the requirements of specific applications in accordance with various embodiments of the invention. IR-UWB transmitter is disclosed further below.

C. IR-UWB Transmitter

Figure 7A:
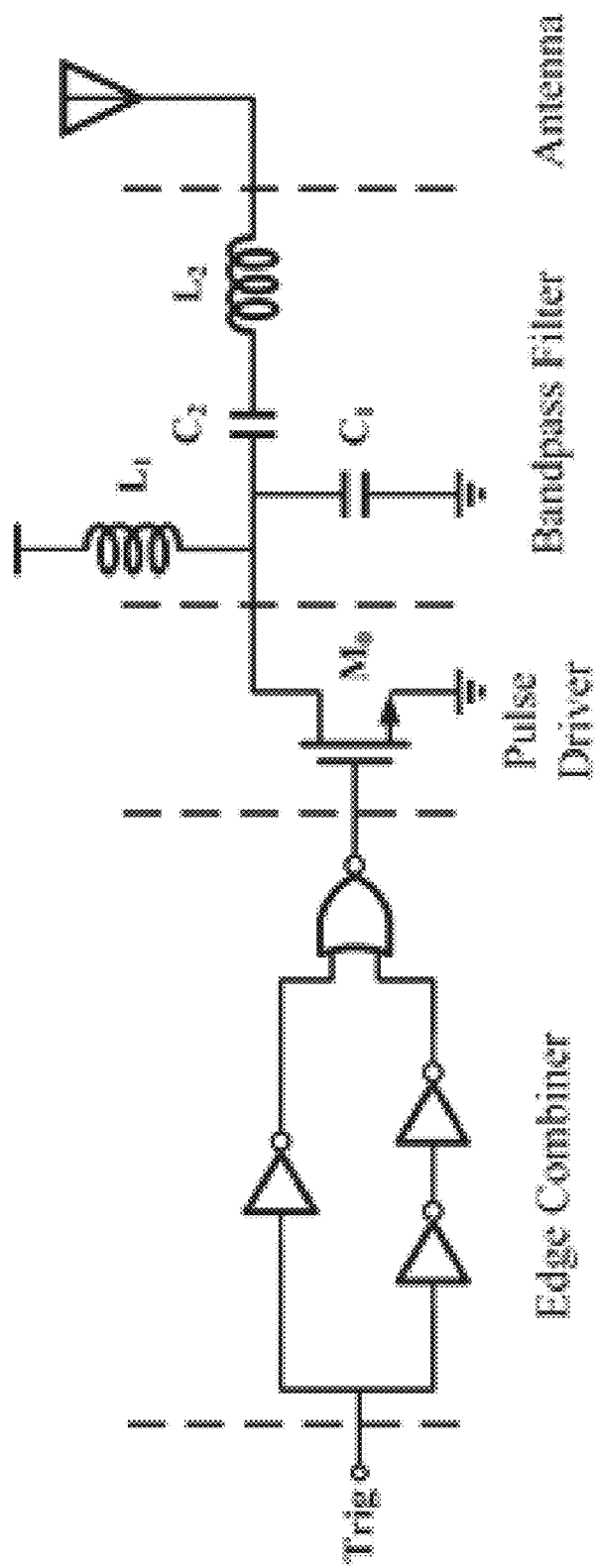
FIG. 7A illustrates a circuit diagram of an impulse radio (IR)-UWB transmitter in accordance with an embodiment of the invention.
Figure 7B:
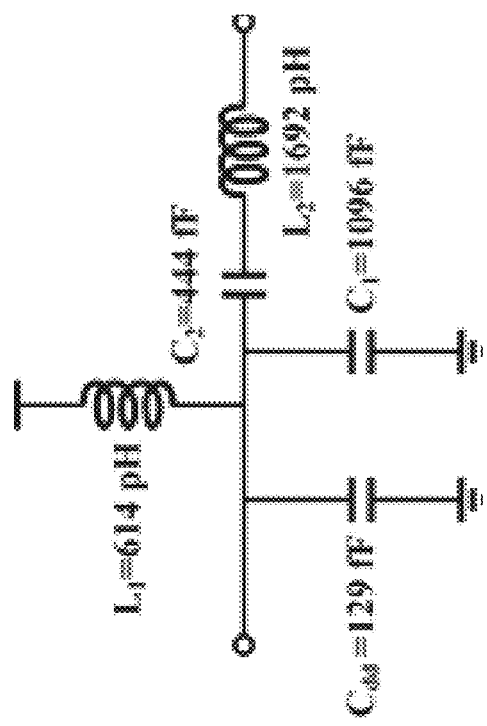
FIG. 7B illustrates inductive and capacitive component values for the circuit diagram in FIG. 7A in accordance with an embodiment of the invention.

A circuit diagram of an IR-UWB transmitter in accordance with an embodiment of the invention is shown in FIG. 7A. The maximum power spectrum density (PSD) of a UWB transmitter is limited to −41.3 dBm/MHz according to regulations on peak power. Theoretical calculations show that such requirements can be completely met by the sub-kHz system in the illustrated embodiment. The edge combiner in the schematic diagram of FIG. 7A detects a difference of two chains of delay cells, which can be adjusted to accommodate a pulse spectrum centered at 4.5 GHz. Note that the specific number for center frequency values can vary. Transistor $M_0$ is biased at GND to operate in class C. Sizing of $M_0$ is selected such that an output resistance approximately equals to 85Ω as a tradeoff between power consumption and impedance matching. Note that the specific number for output resistance can vary. A second-order bandpass filter centered around 5 GHz is implemented to regulate the pulse spectrum. Inductive and capacitive component values for the circuit diagram in FIG. 7A are shown in FIG. 7B in accordance with an embodiment of the invention. The drain capacitance of $M_0$ is absorbed to the bandpass filter and all the component values are detailed in the diagram in FIG. 7B.

Figure 8:
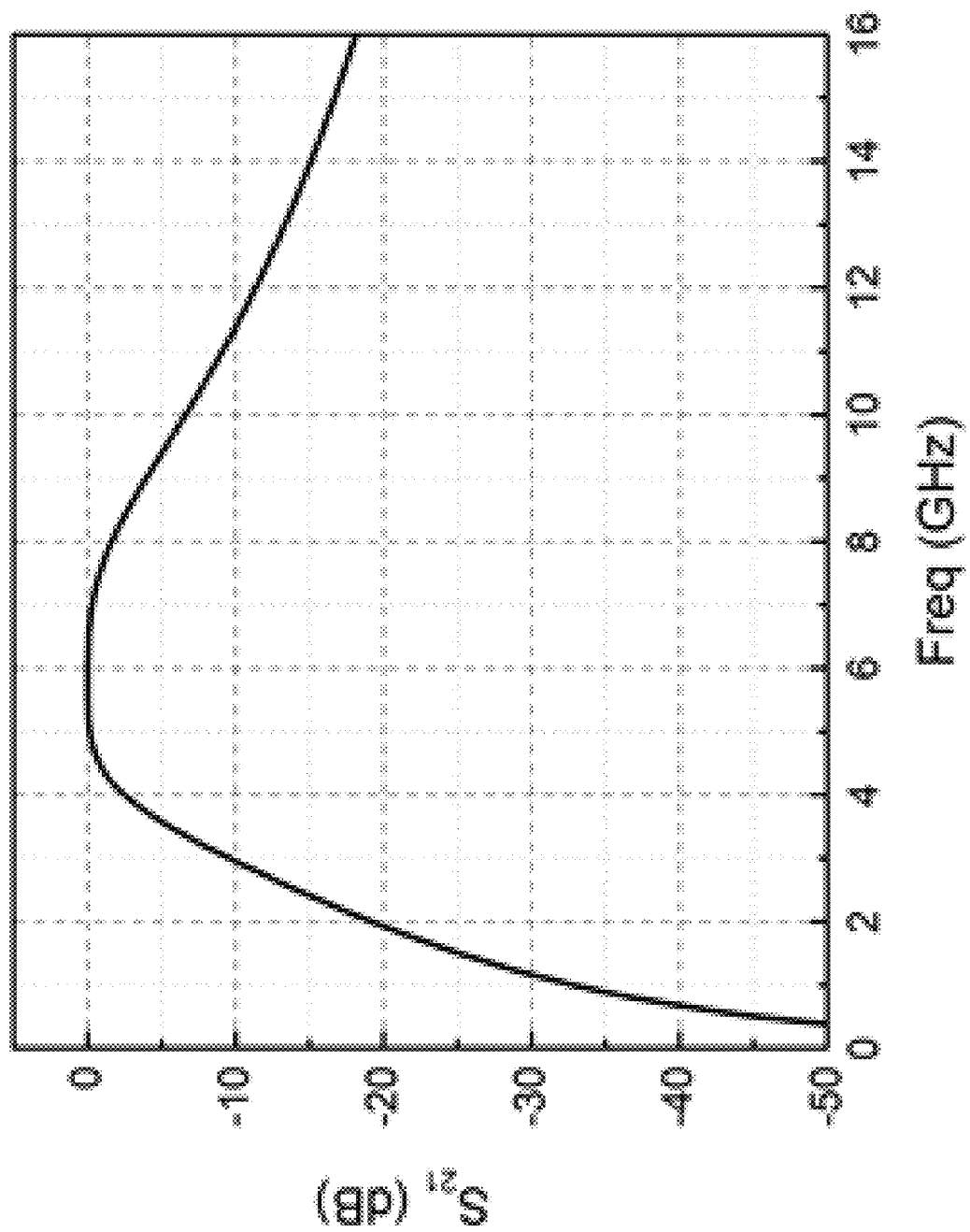
FIG. 8 provides a graph of frequency response of an on-chip second-order bandpass filter in accordance with an embodiment of the invention.
Figure 9:
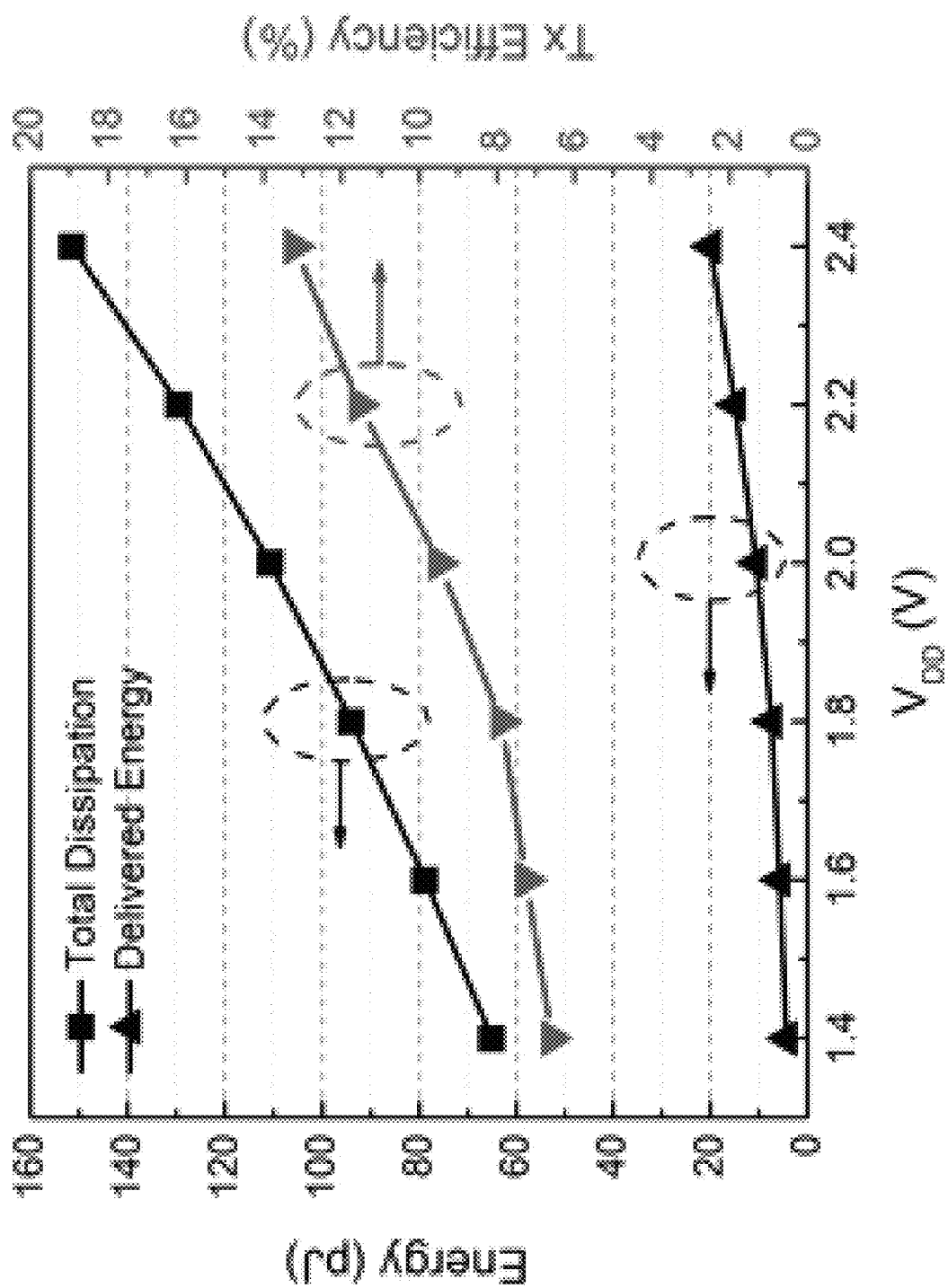
FIG. 9 provides a graph of transmit energy dissipation and efficiency in accordance with an embodiment of the invention.

A graph of frequency response of the on-chip second-order bandpass filter of FIG. 7A is shown in FIG. 8. The frequency response of the implemented filter, i.e., $S_{21}$, suffers from minimal passband attenuation. Energy consumption for each impulse generation and delivered impulse energy of the circuit of FIG. 7A (assuming a 50Ω load) is plotted in FIG. 9. The overall power dissipation is dependent on $V_{DD}$ and around 100 pJ. Transmission efficiency, defined as the ratio between the delivered impulse energy and the overall energy dissipation, is about 10%. Note that the specific numbers for load resistance, power dissipation and energy dissipation can vary.

Figure 10:
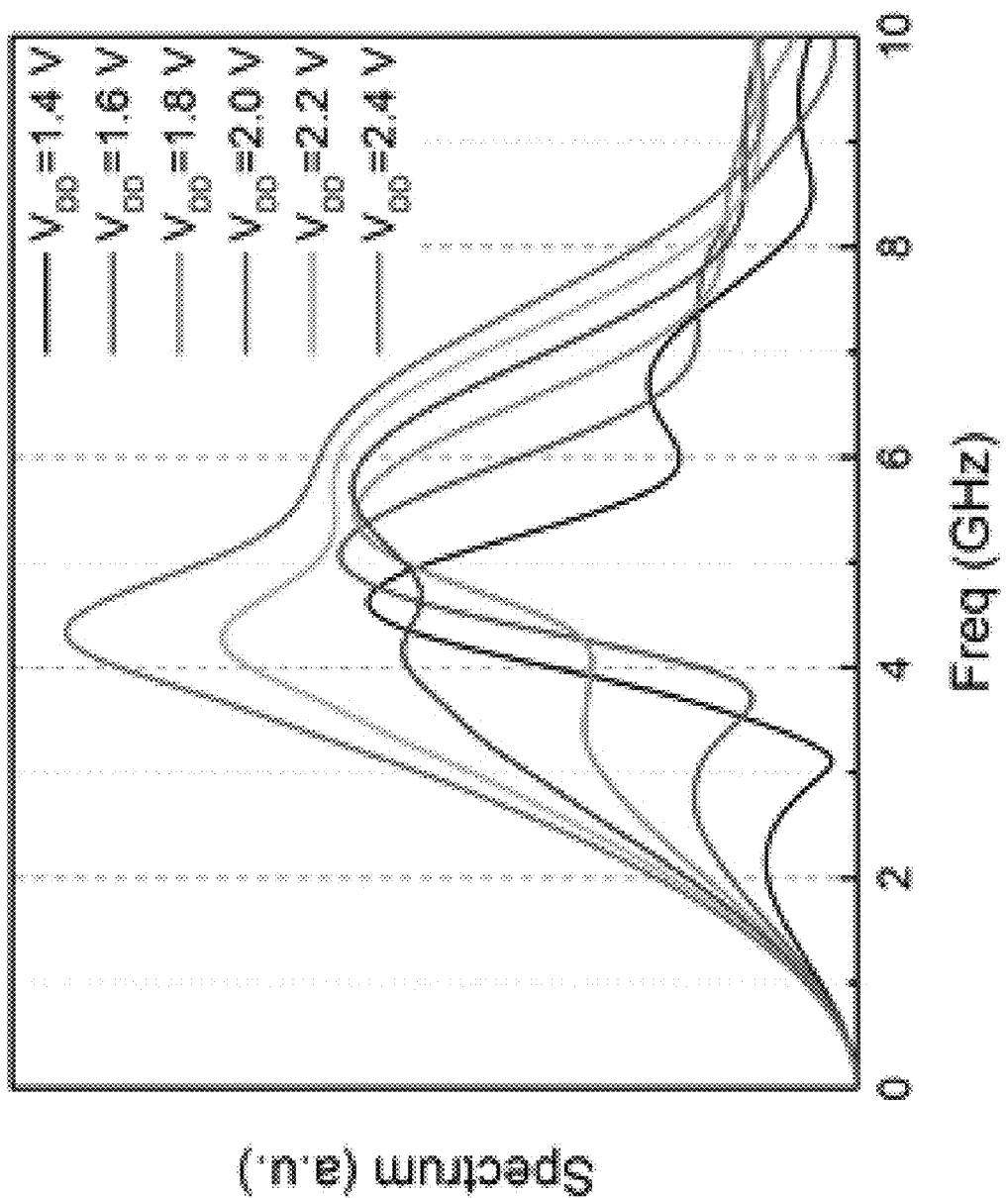
FIG. 10 provides a graph of frequency spectrum of an impulse as a function of $V_{DD}$ in accordance with an embodiment of the invention.

In many embodiments, power consumption of the tag is minimized by eliminating voltage regulators in the design of the chip. As a consequence, the frequency spectrum of the impulse is dependent on $V_{DD}$. Simulations show that the maximum power spectral density of the tag still stays around 4.5 GHz in all possible cases, as is shown in FIG. 10 in accordance with an embodiment of the invention.

While specific circuit diagram of an IR-UWB transmitter are described above with respect to FIGS. 7A and 7B, any of a variety of circuit diagrams of an IR-UWB transmitter can be utilized as appropriate to the requirements of specific applications in accordance with various embodiments of the invention. Rectifier is disclosed further below.

D. Rectifier

Figure 11:
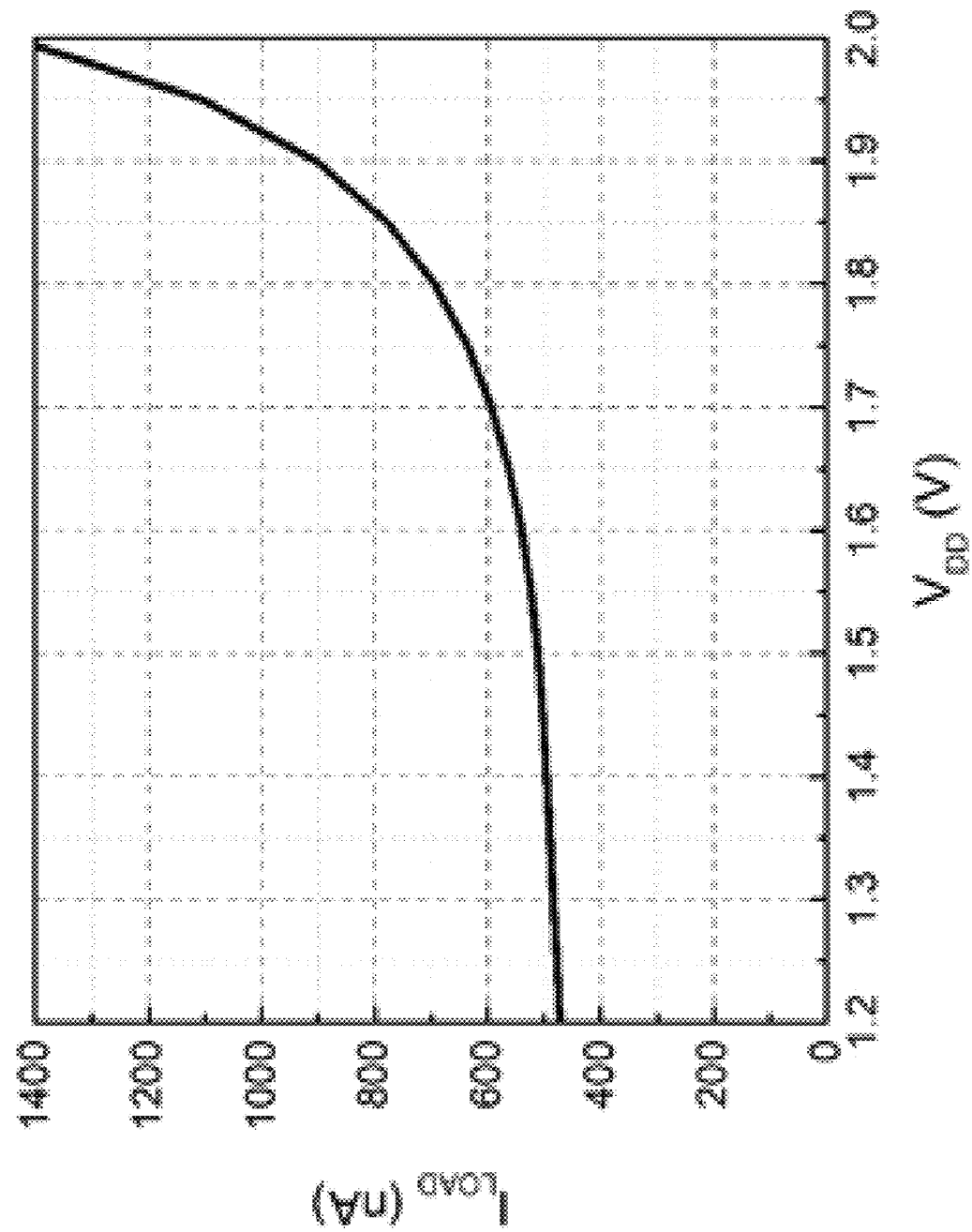
FIG. 11 provides a graph of the current consumption of the IC in FIG. 2 in accordance with an embodiment of the invention.

The overall simulated current dissipation of the IC is shown in FIG. 11 in accordance with an embodiment of the invention. 540 nA@1.6 V is a typical operating point and is used for the subsequent design of the rectifier. Note that the specific numbers for current dissipation and operating voltage can vary. A circuit diagram of the rectifier is shown in FIG. 12A in accordance with an embodiment of the invention. In the illustrated embodiment, the circuit includes zero-threshold-voltage native transistors for the benefit of power conversion efficiency. The number of stages is selected to be three in order to optimize between power conversion efficiency and input voltage swing. Optimizing input voltage swings is important in order to increase the long-time endurance of the chip.

Figure 13:
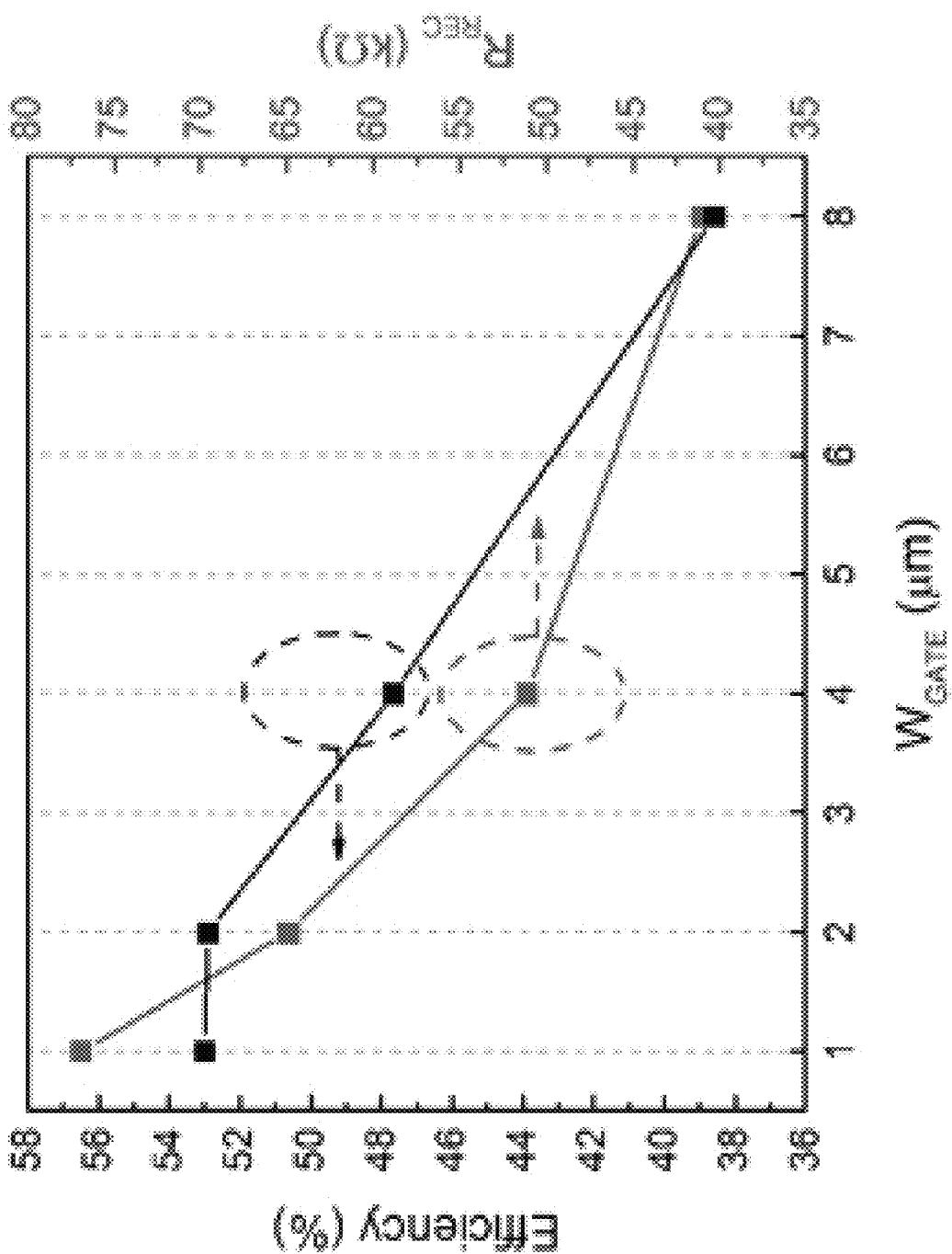
FIG. 13 provides a graph of simulated conversion efficiency and $R_{REC}$ for different $W_{GATE}$ in accordance with an embodiment of the invention.

Input impedance of rectifiers is typically modeled as a resistor, $R_{REC}$, and a capacitor, $C_{REC}$, in parallel as is shown in FIG. 12B in accordance with an embodiment of the invention. A properly designed energy-harvesting antenna can conjugately match such a complex impedance. Given that each transistor can be implemented with a minimum gate length, for example, 0.5 μm for native transistors, the characteristics of the rectifier are primarily dependent on the gate width, $W_{GATE}$. Simulated conversion efficiency is plotted in FIG. 13 in accordance with an embodiment of the invention for $W_{GATE}$ values from 1 μm to 8 μm. The plot in FIG. 13 shows that the efficiency of the rectifier increases to over 50% with smaller $W_{GATE}$, as it reaches a plateau for $W_{GATE}$ of about 1 μm and 2 μm. Meanwhile, $R_{REC}$ inverse proportionally increases with smaller $W_{GATE}$. Compared with the case for $W_{GATE}$ of 2 μm, $W_{GATE}$ of 1 μm poses difficulty for the subsequent conjugate impedance matching with the antenna. Therefore, $W_{GATE}$ of 2 μm is selected in this design.

While specific circuit diagram of a rectifier is described above with respect to FIGS. 12A and 12B, any of a variety of circuit diagrams of a rectifier can be utilized as appropriate to the requirements of specific applications in accordance with various embodiments of the invention. UHF/UWB antennas are disclosed further below.

UHF/UWB Antennas

A. Energy-Harvesting UHF Antenna

In many embodiments, a meander dipole antenna can be used for UHF RFID for its radiation efficiency, compact size, and omnidirectional radiation patterns. An inductive loop can be added to match the imaginary input impedance of on-chip rectifiers, as conjugate impedance matching maximizes the power transfer.

In various embodiments, $R_{REC}$ and $C_{REC}$ of 64 kΩ and 470 fF, respectively, are used for the antenna design, which converts to $Z_{REC}$ of 2.1-368.5 j Ω at 915 MHz. Note that the specific numbers for resistance, capacitance and frequency can vary. In several embodiments, the strong imaginary impedance compared to the real impedance, i.e., high quality factor, can be an indication that a significant amount of power is stored and circulating in the near-field of the antenna. It suggests that such an energy-harvesting frontend can be particularly sensitive to any medium variations at the proximity, which applies to vital-sign monitoring applications.

Given complex impedances, the power reflection coefficient is calculated as $$|S_{11}|^2 = \left| \frac{Z_{REC} - Z_{ANT}^*}{Z_{REC} + Z_{ANT}} \right|^2,$$

where $Z_{ANT}$ represents the antenna input impedance. The corresponding power transmission coefficient, $\eta_{MATCH}$, equals $1-|S_{11}|^2$. The radiation efficiency of the antenna, $\eta_{ANT}$, is the other factor that affects the overall energy-harvesting sensitivity and can be represented as $$\eta_{ANT} = \frac{R_{RAD}}{R_{RAD} + R_{LOSS}}.$$

In many embodiments, the product of $\eta_{MATCH}$ and $\eta_{ANT}$ can be used as the benchmark for the optimal design of far-field energy-harvesting systems.

Figure 14:
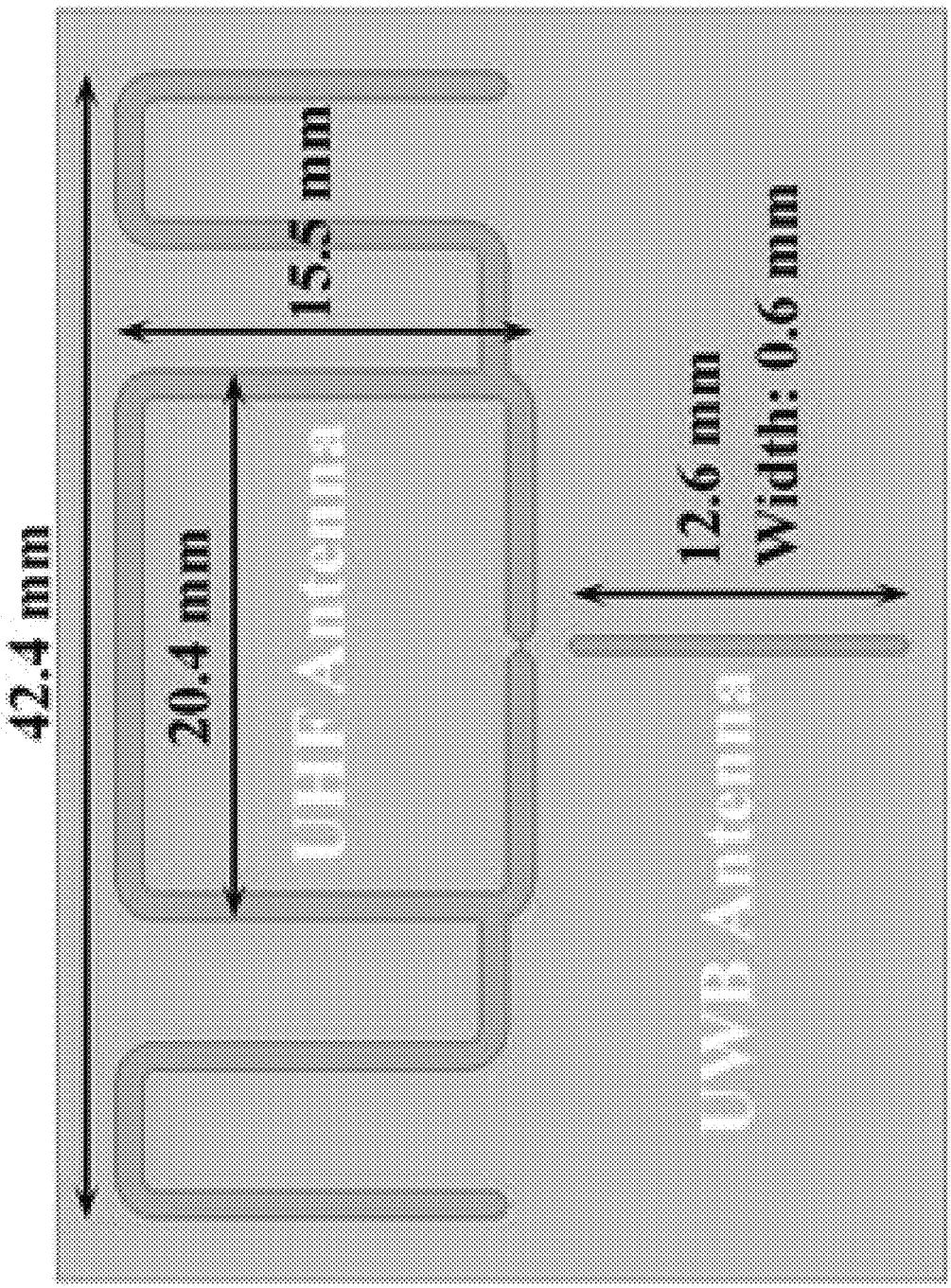
FIG. 14 provides a layout diagram of the UHF and UWB antennas of the RFID tag in accordance with an embodiment of the invention.
Figure 15:
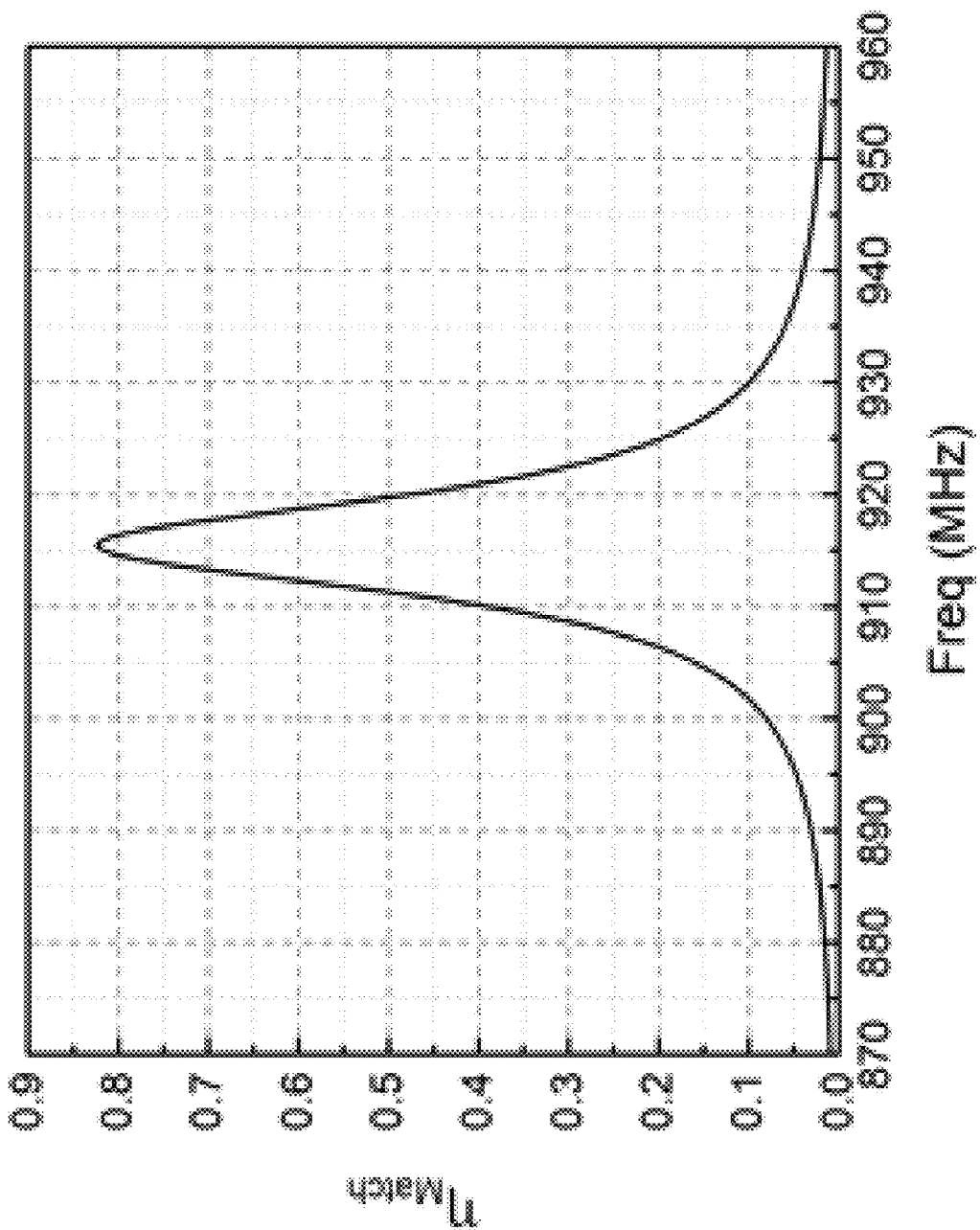
FIG. 15 provides a graph of $\eta_{MATCH}$ between the UHF antenna and the on-chip rectifier in accordance with an embodiment of the invention.
Figure 16:
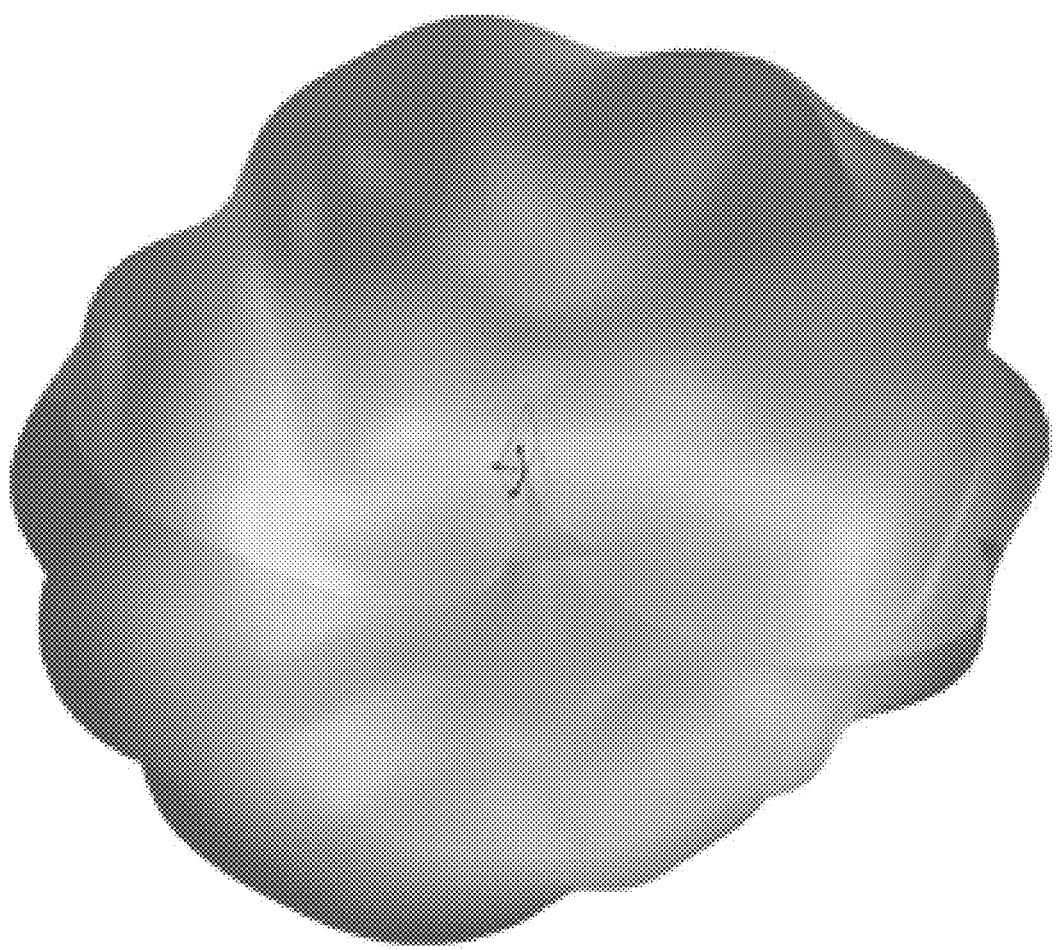
FIG. 16 provides a simulated graph of gain of the UHF antenna in dB in accordance with an embodiment of the invention.
Figure 16:
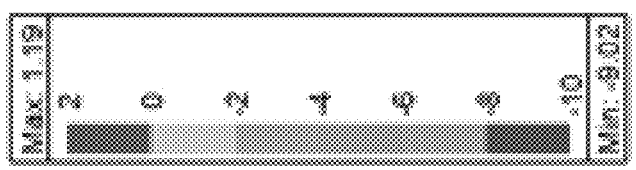

The UHF energy-harvester antenna is shown in the upper part of FIG. 14 in accordance with an embodiment of the invention. The size of the antenna can be adjusted such that optimal matching occurs at 915 MHz. The corresponding $\eta_{MATCH}$ is achieved to be over 80% as plotted in FIG. 15. FIG. 16 in accordance with embodiments of the invention. FIGS. 15 and 16 demonstrates that an omnidirectional radiation pattern of the UHF antenna at 915 MHz. $\eta_{ANT}$ is simulated to be 70%. Note that the specific numbers for the frequency and omnidirectional radiation pattern values can vary.

While specific energy-harvesting UHF antenna is described above with respect to FIG. 14, any of a variety of an energy-harvesting UHF antennae can be utilized as appropriate to the requirements of specific applications in accordance with various embodiments of the invention. UWB Antenna are disclosed further below.

B. UWB Antenna

Figure 17:
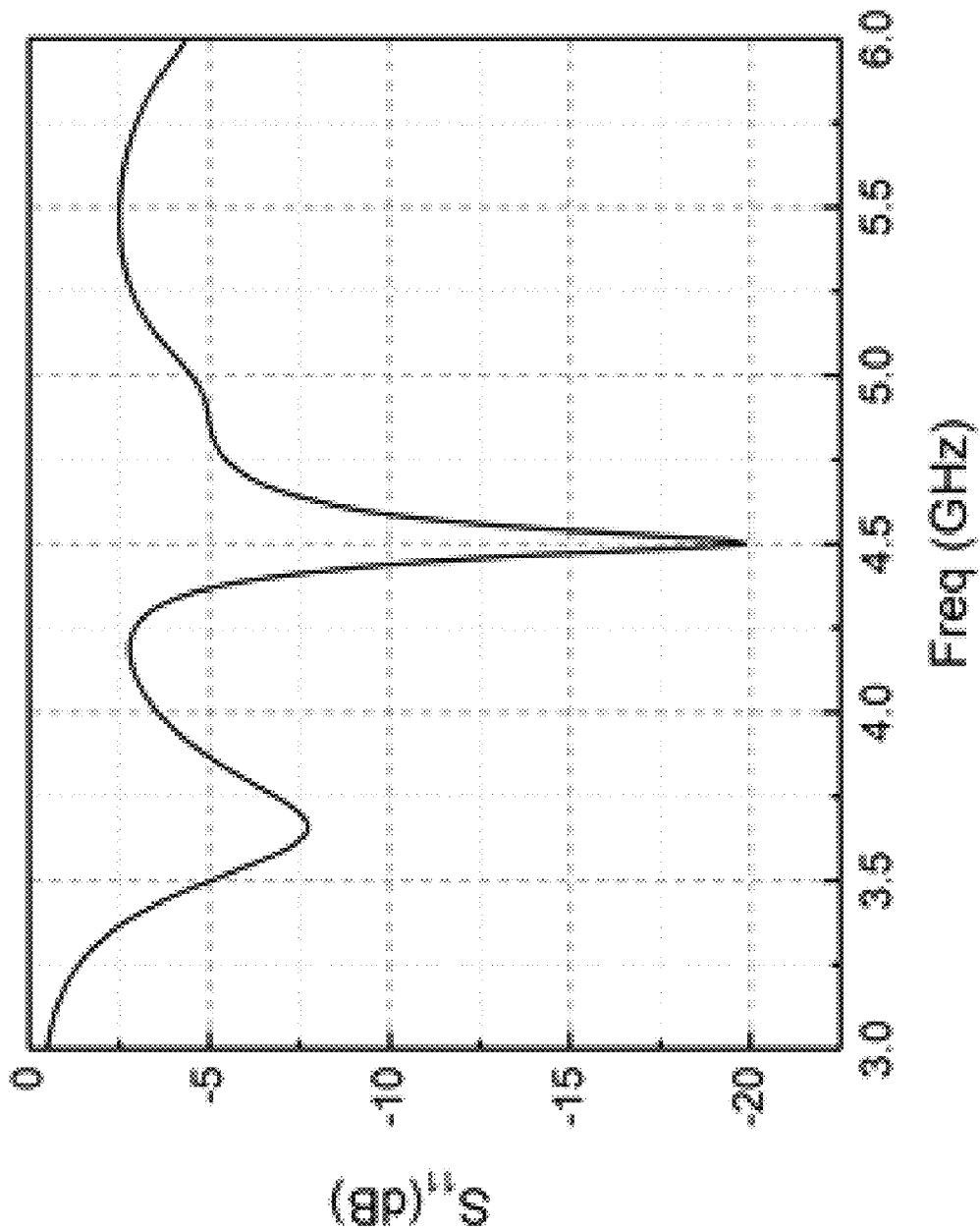
FIG. 17 provides a graph of $S_{11}$ of a monopole antenna in accordance with an embodiment of the invention.
Figure 18:
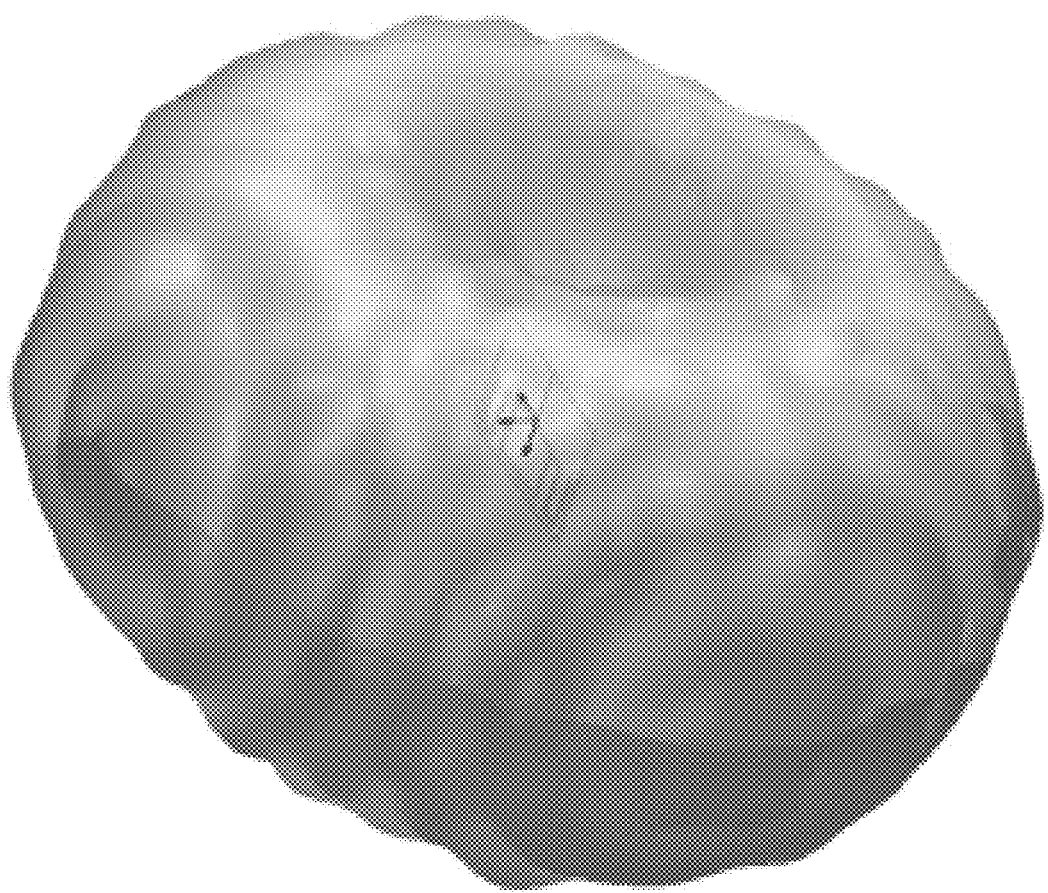
FIG. 18 provides a simulated graph of gain of the UWB antenna in dB at 4 GHz in accordance with an embodiment of the invention.
Figure 18:

In several embodiments, a monopole antenna can be selected for the UWB transmitter for its characteristic wide bandwidth, omni-directivity, and simple structure. In addition, the monopole antenna can provide simple matching to 50Ω impedance of the IC output. By optimizing the length and width of the monopole antenna as shown in the lower part of FIG. 14 in accordance with an embodiment of the invention, acceptable impedance matching can be achieved from 3.5 GHz to 5 GHz as shown in FIG. 17 in accordance with an embodiment of the invention. Note that the specific numbers for the frequency values can vary. The monopole antenna also features an omnidirectional radiation pattern as shown in FIG. 18 in accordance with an embodiment of the invention.

While specific UWB antenna is described above with respect to lower part of FIG. 14, any of a variety of an UWB antennae can be utilized as appropriate to the requirements of specific applications in accordance with various embodiments of the invention. Experimental measurements and IC fabrication and verification are disclosed further below.

Experimental Measurements

A. IC Fabrication and Verification

Figure 19:
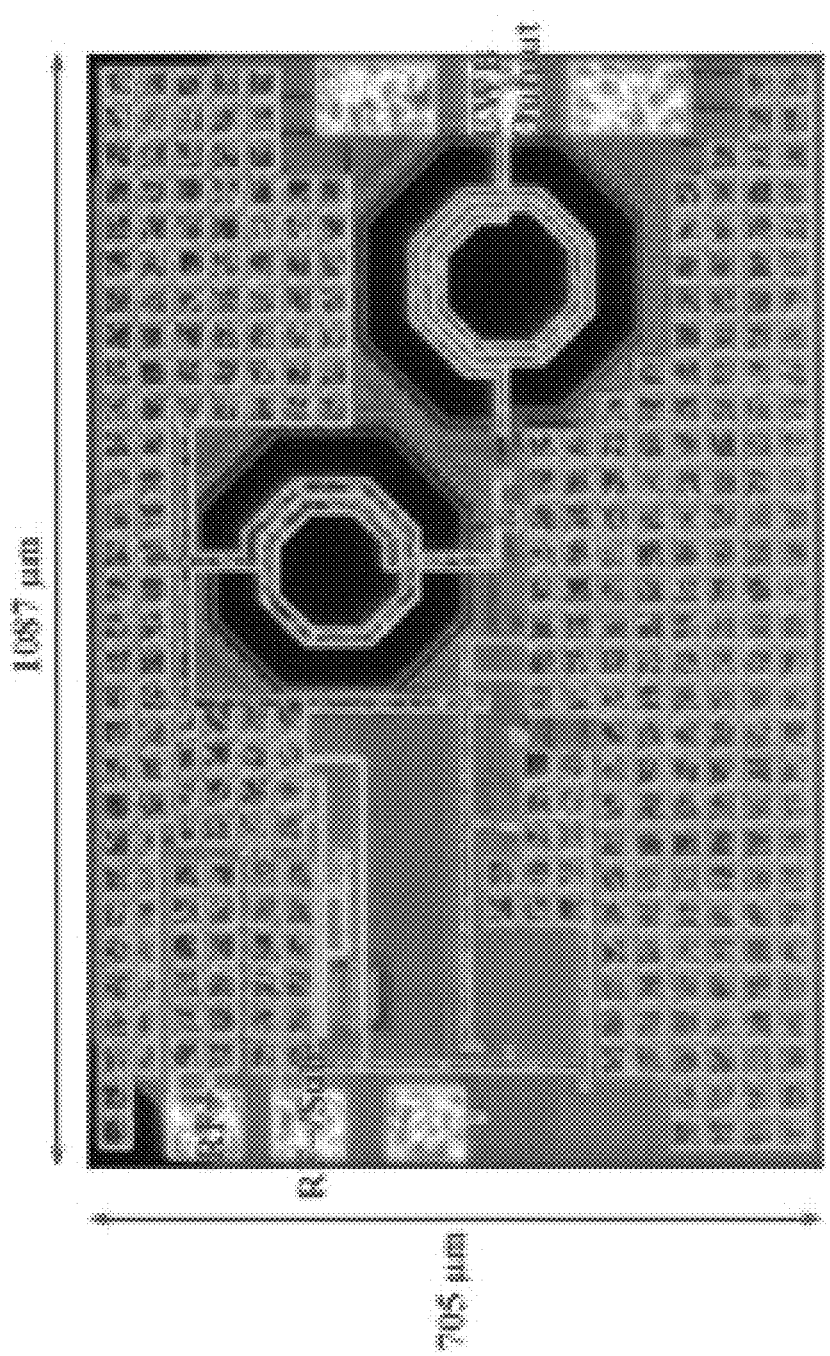
FIG. 19 provides a microscopic photograph of the fabricated RFID IC in accordance with an embodiment of the invention.
Figure 20:
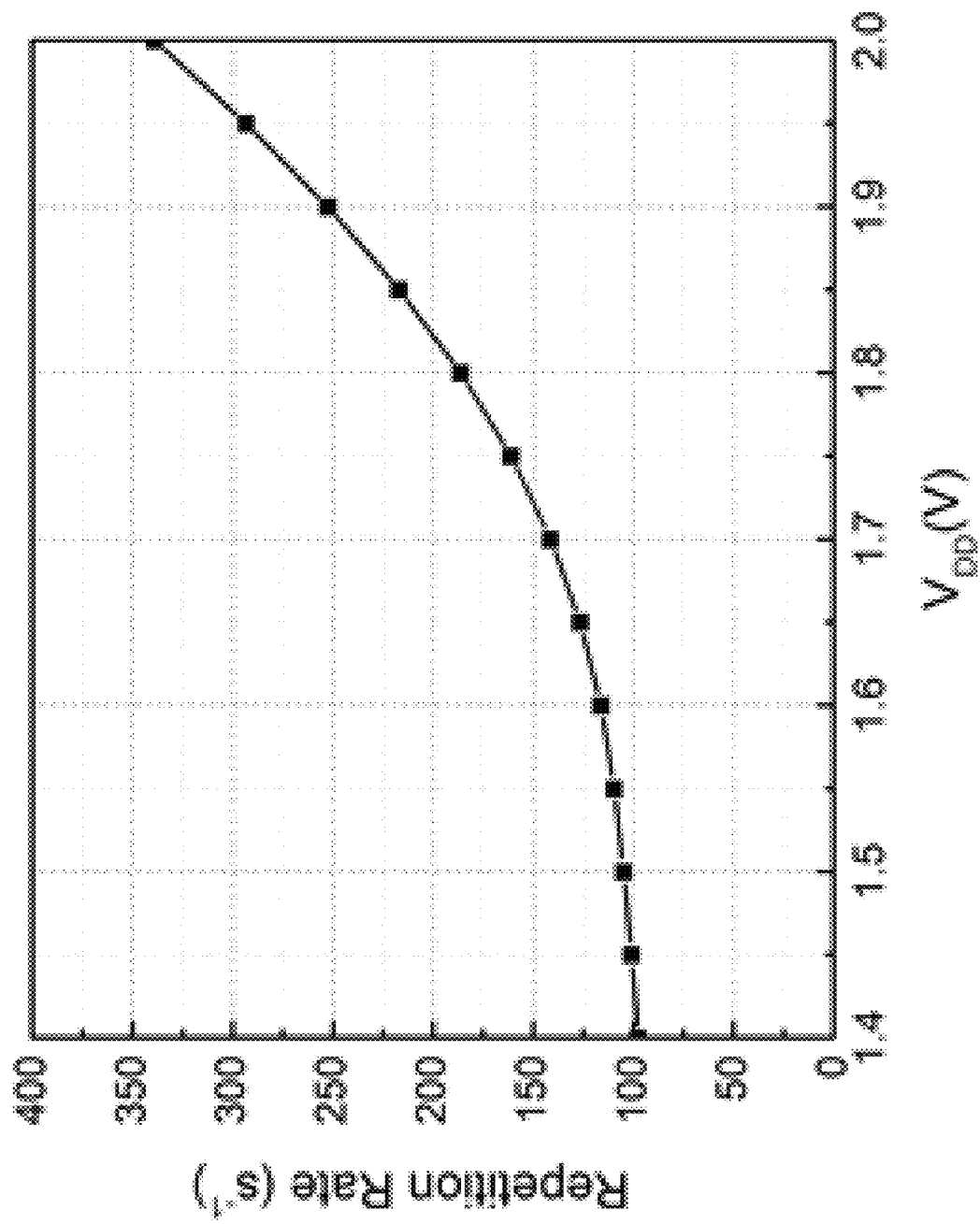
FIG. 20 provides a graph of repetition rate of generated UWB impulses in accordance with an embodiment of the invention.
Figure 21:
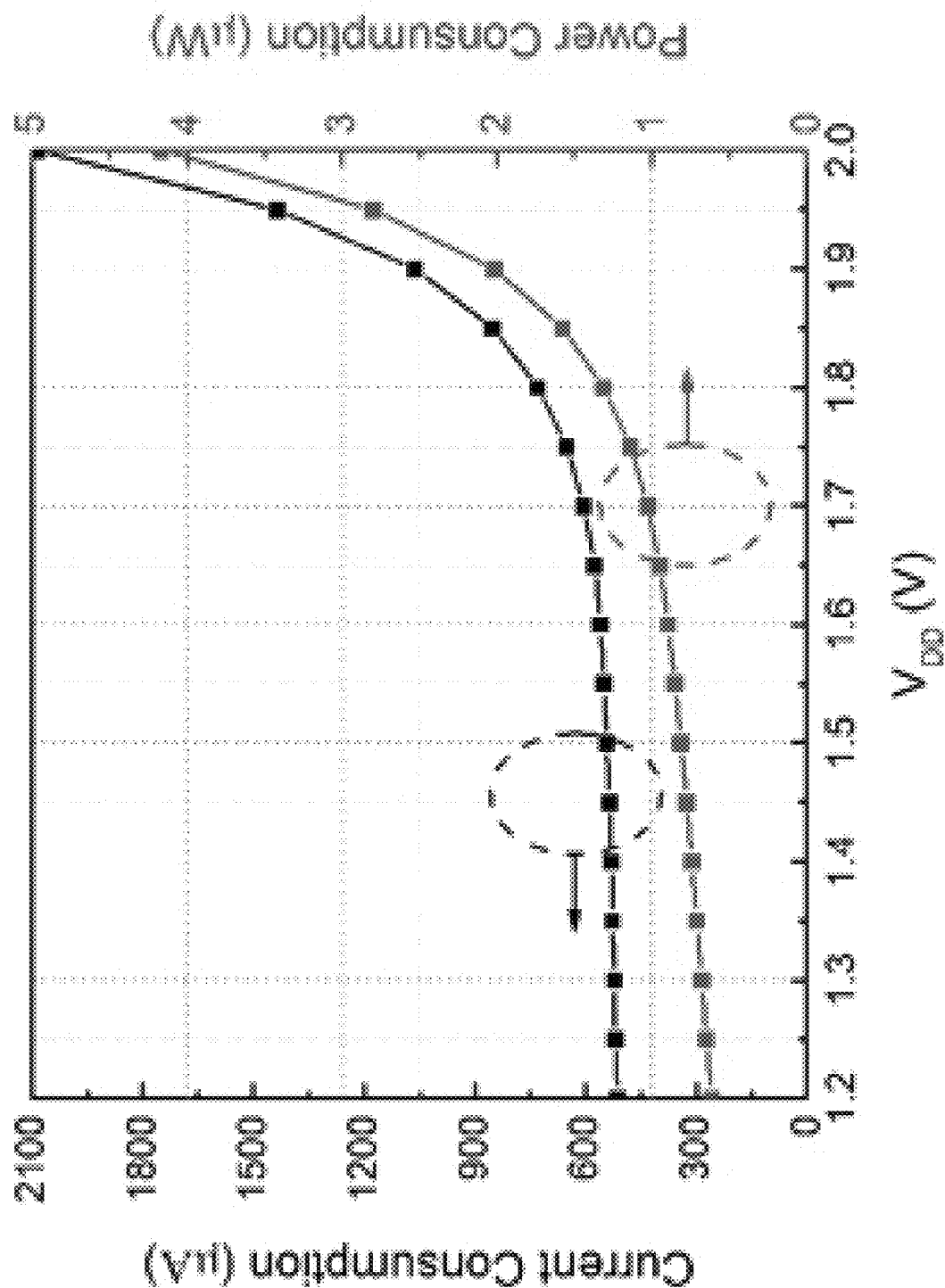
FIG. 21 provides a graph of measured power dissipation of the RFID IC in accordance with an embodiment of the invention.

In accordance with an embodiment of the invention, the IC can be (but not limited to) fabricated in TSMC 180 nm process. A microscopic photograph of the fabricated IC is shown in FIG. 19. The pad-included area is 0.766 mm². The repetition rate of the generated UWB impulses as a function of $V_{DD}$ is measured and shown in FIG. 20 in accordance with an embodiment of the invention. The current consumption of the IC is measured and shown in FIG. 21 in accordance with an embodiment of the invention. The measured results match well with the simulation results of FIG. 11. The calculated power consumption is 1 μW or less for a $V_{DD}$ above 1.7 V. Note that the specific numbers for the chip area, power consumption and operating voltage can vary. RFID tag is disclosed further below.

B. RFID Tag

Figure 22:
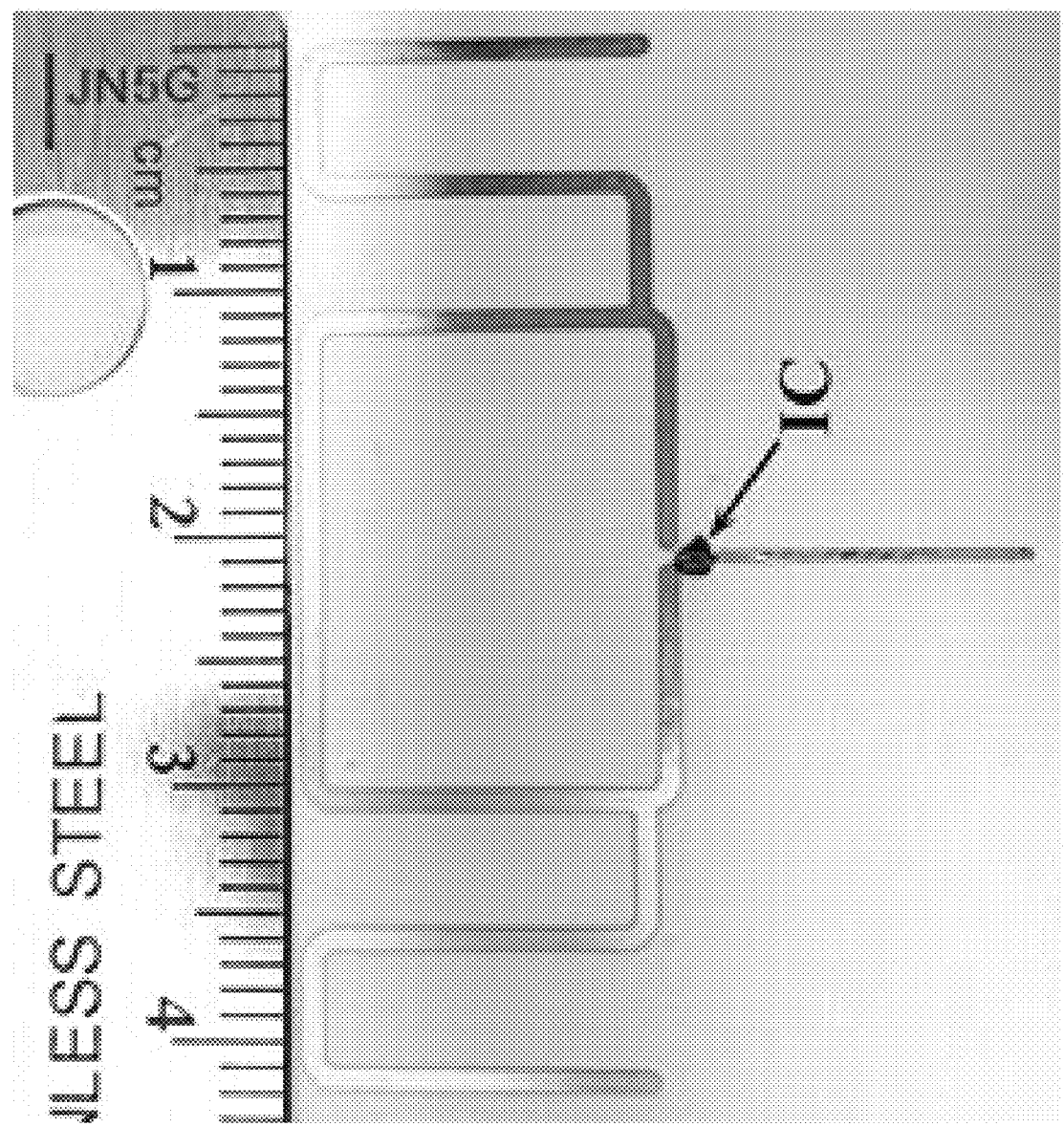
FIG. 22 provides a photograph of a fabricated RFID tag in accordance with an embodiment of the invention.

In accordance with an embodiment of the invention, the UHF and UWB antennas can be fabricated on 0.34 mm thick Rogers 4350B laminate with in-house printed-circuit-board facilities. A photograph of a fabricated RFID tag is shown in FIG. 22 in accordance with an embodiment of the invention.

While specific RFID tag is described above with respect to FIG. 22, any of a variety of an RFID tags can be utilized as appropriate to the requirements of specific applications in accordance with various embodiments of the invention. Far-field energy-harvesting experiment is disclosed further.

C. Far-Field Energy-Harvesting Experiment

Figure 24:
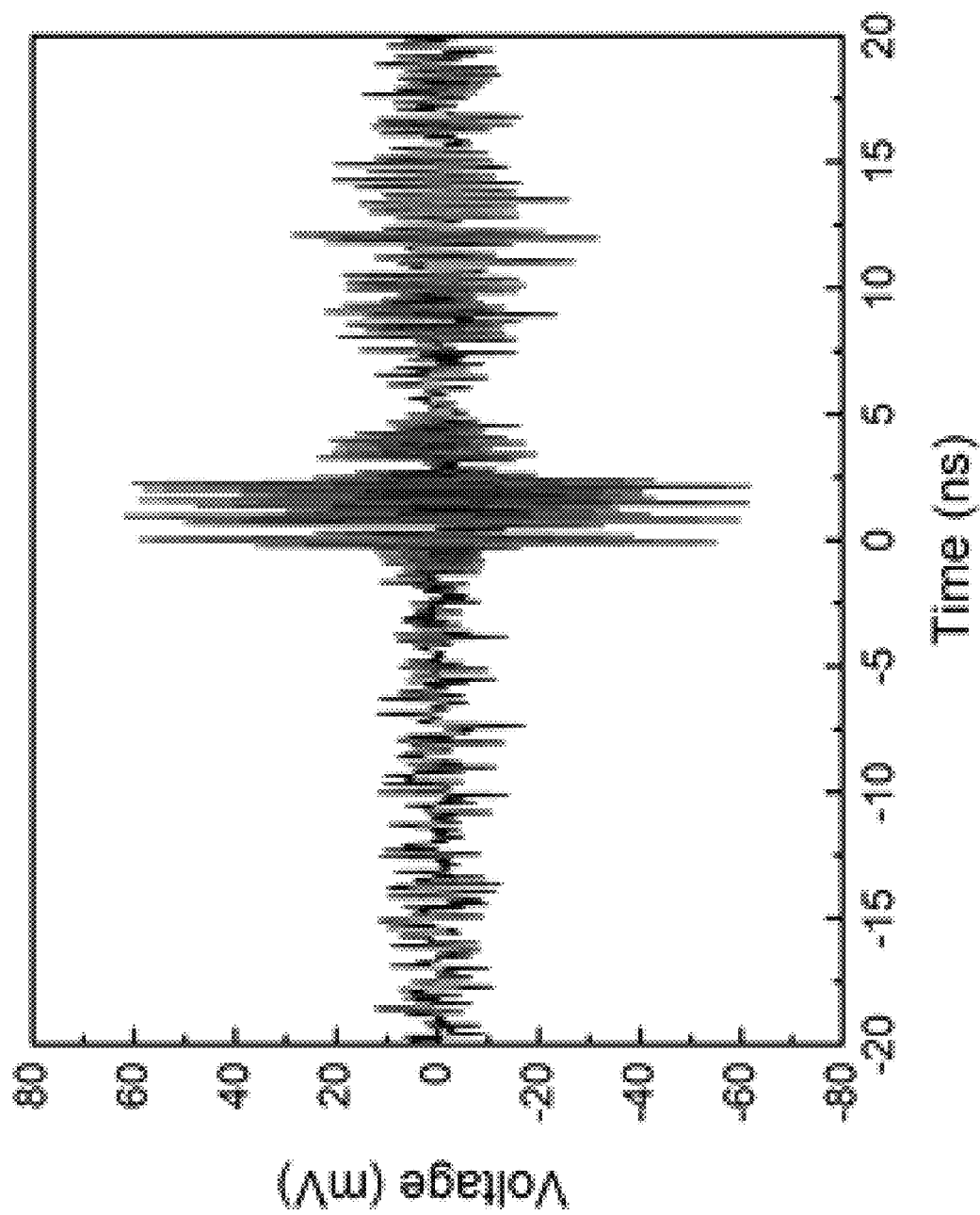
FIG. 24 provides a graph of a measured transient waveform of a typical received UWB impulse in accordance with an embodiment of the invention.

A UHF far-field energy-harvesting is tested along a hallway as shown in FIG. 23 in accordance with an embodiment of the invention. UHF systems are limited to 36 dBm (4 W) effective isotropic radiated power (EIRP) at a designated band from 902 MHz to 928 MHz under FCC regulations. A 36 dBm EIRP power source operating at 909 MHz is placed as far as 51 meters away from the RFID tag to enable its operation. A UWB receiver positioned 13 meters away consists of a 3-to-5 GHz horn antenna and two low-noise amplifiers (Mini-Circuits Inc., ZX60-G63LN-S+), which connects to a 25 G samples/s oscilloscope. A typical received impulse waveform is demonstrated in FIG. 24. A comparison of UHF-band energy-harvesting tags based on antenna-and-rectifier codesign is summarized in Table I. This work achieves by far the longest operating distance with the smallest antenna size.

TABLE I

|  | This work | MWCL 2019 [17] | JSSC 2014 [18] | JSSC 2008 [31] |
|---|---|---|---|---|
| Process | 180 nm | 180 nm | 90 nm | 250 nm |
| Frequency | 909 MHz | 915 MHz | 868 MHz | 906 MHz |
| Antenna Size | 6.6 cm² | 10 cm² | 21.9 cm² | 30 cm² |

TABLE I-continued

|  | This work | MWCL 2019 [17] | JSSC 2014 [18] | JSSC 2008 [31] |
|---|---|---|---|---|
| Output Voltage | >1.3 V | 3.3 V | 1 V | 2 V |
| Measured Sensitivity | 51 m @ 4 W EIRP | 20 m @ 4 W EIRP | 27 m @ 1.78 W EIRP | 15 m @ 4 W EIRP |

Vital-sign-monitoring experiment is disclosed further below.

D. Vital-Sign-Monitoring Experiment

Figure 25:
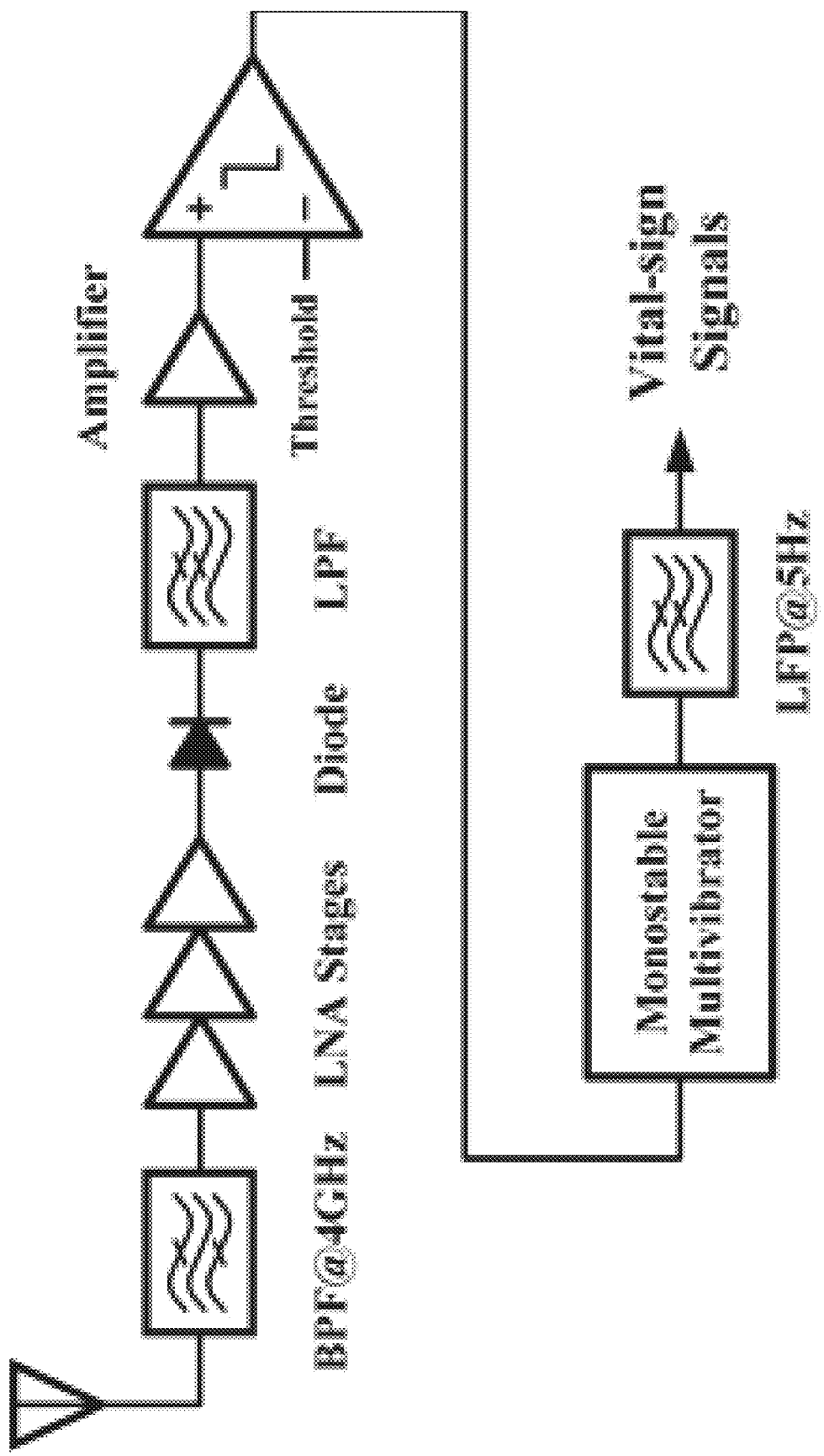
FIG. 25 provides a circuit block diagram of a vital-sign receiver implemented by off-the-shelf components in accordance with an embodiment of the invention.

In accordance with an embodiment of the invention, a vital-sign receiver can be built with off-the-shelf components as shown in circuit block diagram in FIG. 25. The occurrence of a UWB impulse is detected by a high-speed comparator. A subsequent monostable multivibrator cab be used to elongate the pulse duration. As the final stage, a lowpass filter with a bandwidth of approximately 5 Hz can be used to retrieve the vital-sign signals. While specific vital-sign-monitoring experiment is described above with respect to FIG. 25, any of a variety of vital-sign-monitoring experiments can be utilized as appropriate to the requirements of specific applications in accordance with various embodiments of the invention. Note that the specific numbers for the lowpass filter with bandwidth frequency values can vary.

Figure 26:
FIG. 26 provides a photograph with settings of the vital-sign monitoring experiment in accordance with an embodiment of the invention.
Figure 27A:
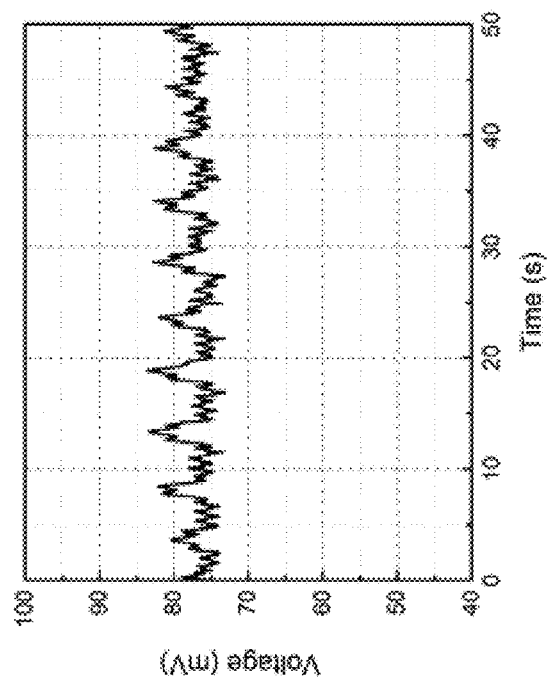
FIG. 27A provides a graph of transient waveform of a remotely retrieved vital-sign signal in accordance with an embodiment of the invention.
Figure 27B:
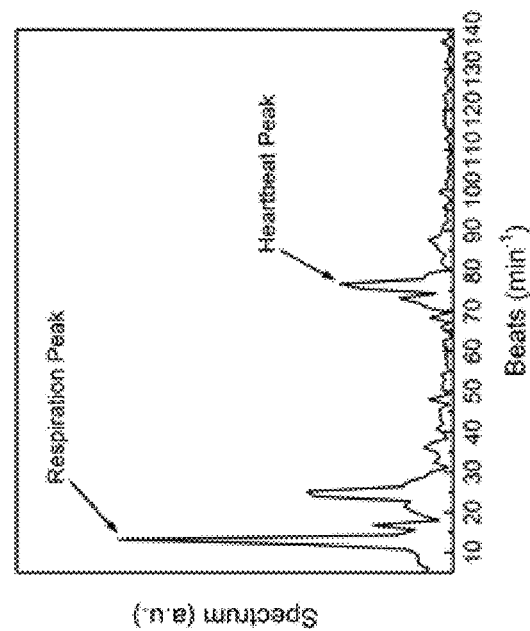
FIG. 27B provides a graph of frequency spectrum of a remotely retrieved vital-sign signal in accordance with an embodiment of the invention.

In accordance with an embodiment of the invention, in this experiment RFID tag weighs only 0.93 g and can be taped on the chest of a human subject, as shown in FIG. 26. A power source is at placed a 1.6-meter distance from the human subject and transmits 15 dBm power or 27 dBm EIRP UHF signal at 909 MHz. Note that the specific numbers for the transmitted power and frequency can vary. The transient vital-sign signal can be retrieved on an oscilloscope as shown in FIG. 27A in accordance with an embodiment of the invention. The transient vital-sign signal shows heartbeats and respirations, and its Fourier-transform frequency spectrum is shown in FIG. 27B in accordance with an embodiment of the invention.

Antenna-Co-Designed UWB Impulse Transmitter For Size-Constraint Applications

Many embodiments provide an antenna co-design for realizing FCC-regulation-compliant IR-UWB transmitters. Many embodiments provide a compact design that significantly reduces energy consumption. In certain embodiments, a Gaussian mono-pulse generator and a folded-dipole antenna may be co-optimized. The Gaussian mon-pulse generator may be optimized to maximize the power transfer efficiency to a folded-dipole antenna with a bandwidth of 7.8-9.5 Ghz. The folded-dipole antenna may have a relatively wide bandwidth and a compact size. In certain embodiments, the energy consumption for each impulse emission is only 2.6 pJ and 100 Mpulse/s operation of the transmitter which may comply with the FCC mask. In many embodiments, the transmitter may be utilized for size-constraint and ultra-low power applications such as medical implants.

Studies have been exploring the use of the unlicensed 3.1-10.6 GHz ultra-wideband impulse (IR-UWB) radio, which has a series of advantages such as compact size, low power consumption, and circuitry simplicity. Accordingly, IR-UWB may be utilized for wearable and implantable devices, among various other applications.

Edge-combining can be used as a method in generating IR-UWB pulses. It may provide a simple circuit structure and can eliminate the otherwise power-hungry local oscillators. In order to satisfy the FCC emission limit, two methods have been used to kill the low-frequency (<3.1 GHz) portion of radiation. First, multiple pules with different delays can be combined to create a short period of ringing with the center frequency amid 3.1-10.6 GHz, e.g., pulse-combining. This may be, however, typically at the expense of higher power consumption. Second, a pulse-shaping filter can be added following the Gaussian mono-pulse generator (filtered edge-combining). The filter can be implemented with either extra passive components or an active differentiator.

Accordingly, many embodiments provide for directly utilizing the Tx antenna bandwidth to confine the spectrum of the radiated power. Many embodiments may eliminate pulse-shaping filters and can reduce power consumption. Accordingly, many embodiments provide for optimizing a Gaussian mono-pulse generator to maximize the power transfer efficiency to a folded-dipole antenna. In certain embodiments, the folded-dipole antenna may have a bandwidth of 7.8-9.5 GHz. In many embodiments, the folded-dipole antenna can have a relatively wide bandwidth and a compact size. In certain embodiments, each impulse emission may only consume 2.6 pJ energy. In several embodiments, operation at the pulse rate of 100 M/s can be demonstrated without violating the FCC mask.

System Overview

Figure 28:
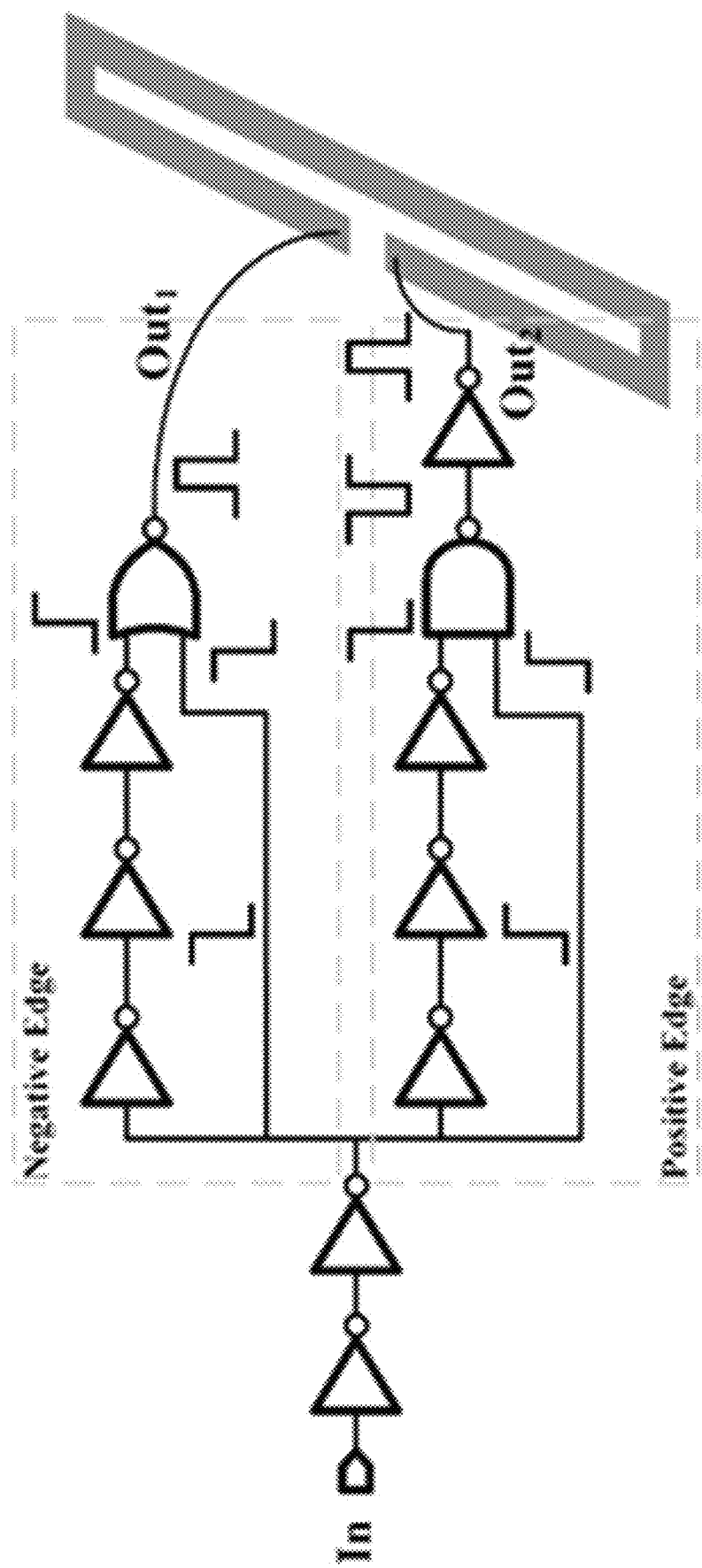
FIG. 28 illustrates a circuit schematic of an IR-UWB transmitter in accordance with an embodiment of the invention.

A circuit schematic of a transmitter in accordance with several embodiments of the invention is illustrated in FIG. 28. In many embodiments, each transition of the input signal can trigger a Gaussian mono-pulse either on $Out_1$ and $Out_2$ nodes, which may subsequently drive a folded-dipole antenna. While either output node may emit a pulse, the other node may be tied to GND. In several embodiments, this transmitter can be used for non-return-to-zero inverted (NRZI) on-off keying (OOK) modulation scheme, in which the receiver may not differentiate $Out_1$-driven and $Out_2$-driven impulses. The folded-dipole antenna can be selected for its compact size, wide bandwidth, and omnidirectivity (e.g., which can be particularly suitable for medical implants in accordance with various embodiments of the invention). Importantly, in certain embodiments, the input impedance of a folded-dipole antenna is approximately 300Ω at the resonant frequency, which may set the starting point of the following circuit design. In several embodiments, the center frequency may be selected to be around 8 GHz to further reduce the antenna dimension. Although FIG. 28 illustrates a particular circuit schematic of an IR-UWB transmitter, any of a variety of designs may be utilized as appropriate to the requirements of specific applications in accordance with embodiments of the invention.

Circuit Design

Figure 29A:
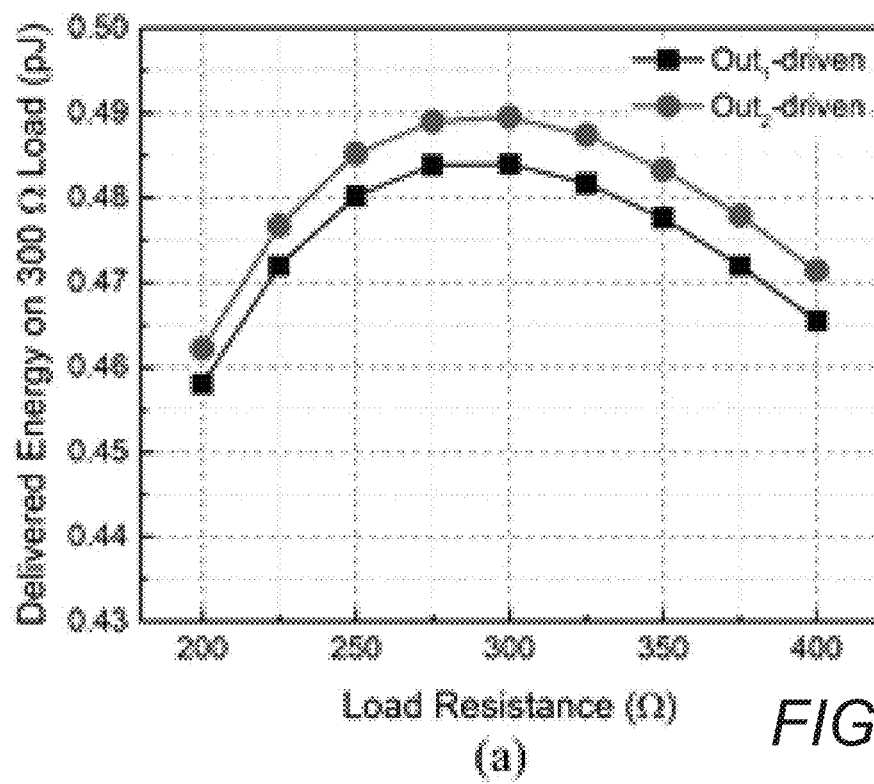
FIG. 29A illustrates performance of a pulse generator that maximizes the power transfer efficiently to a 300Ω load and FIG. 29B illustrates DC energy and the delivered impulse energy in different process corners in accordance with an embodiment of the invention.
Figure 29B:
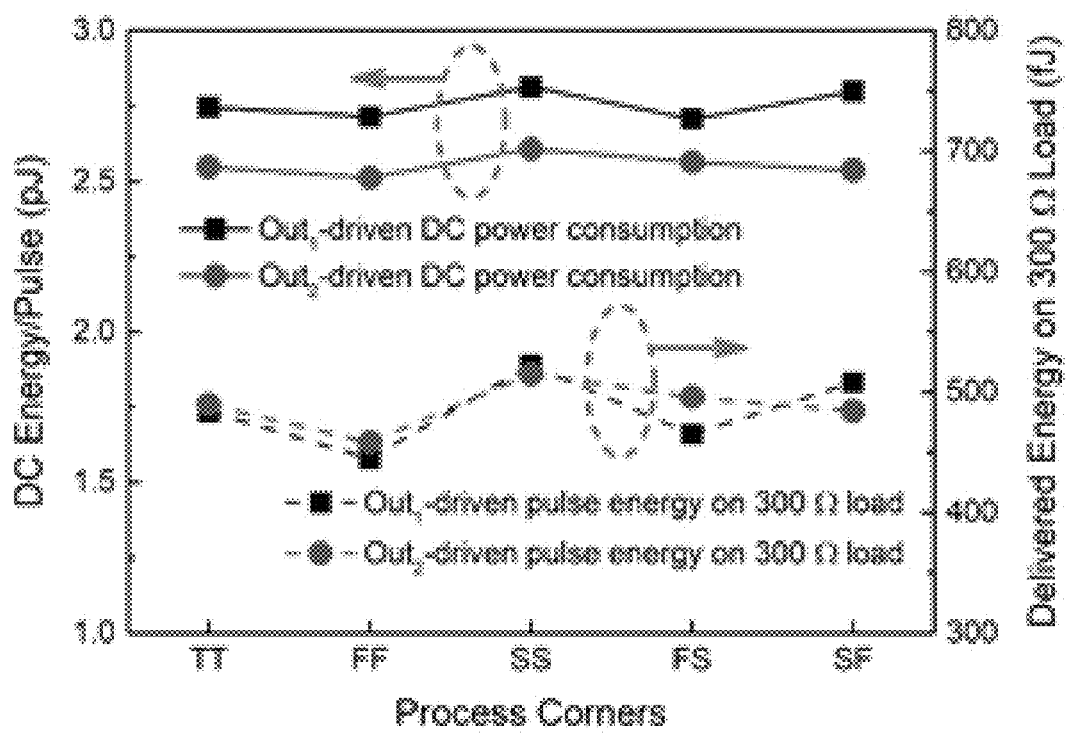

In many embodiments, the gate sizing of the Gaussian mono-pulse generator may be designed to maximize the power transfer efficiency to 300Ω, e.g., the input impedance of the folded-dipole antenna, while the close symmetry between $Out_1$ and $Out_2$ nodes can be guaranteed. In certain embodiments, an optimized design is verified for different load resistances as illustrated in FIG. 29 in accordance with several embodiments of the invention. The pulse generator is further simulated in different process corners with focuses on the DC energy consumption and the delivered impulse energy, as illustrated in FIG. 29 in accordance with several embodiments of the invention. Both metrics can be very stable. In the typical process corner (TT), $Out_1$-driven and $Out_2$-driven pulses may consume only 2.75 pJ and 2.55 pJ energy, respectively.

Figure 30A:
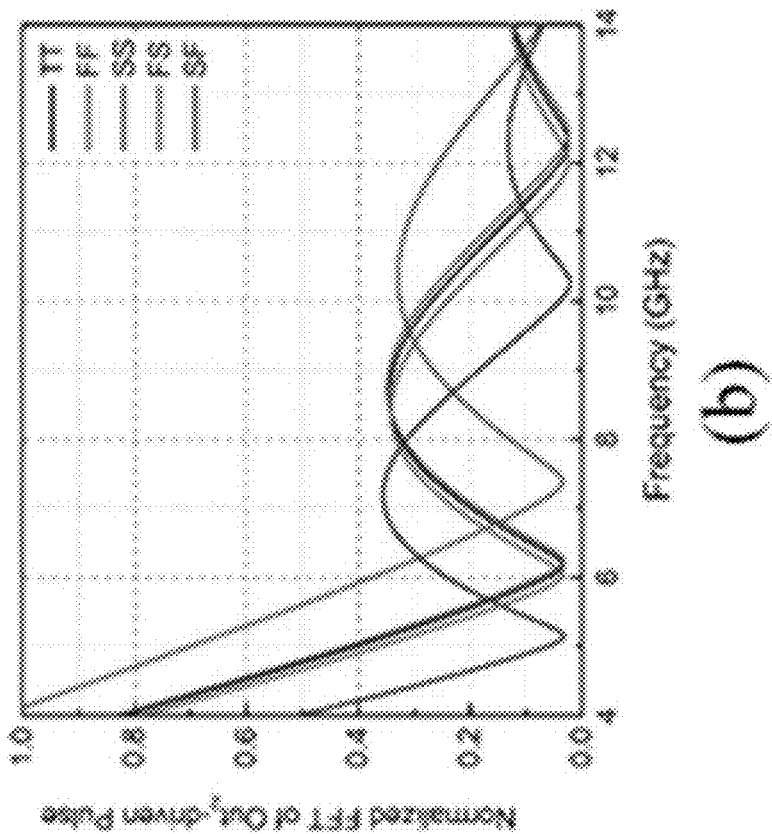
FIG. 30A illustrates normalized FFT of $Out_1$-driven and FIG. 30B illustrates normalized FFT of $Out_2$-driven pulses on 300Ω load in accordance with an embodiment of the invention.
Figure 30B:
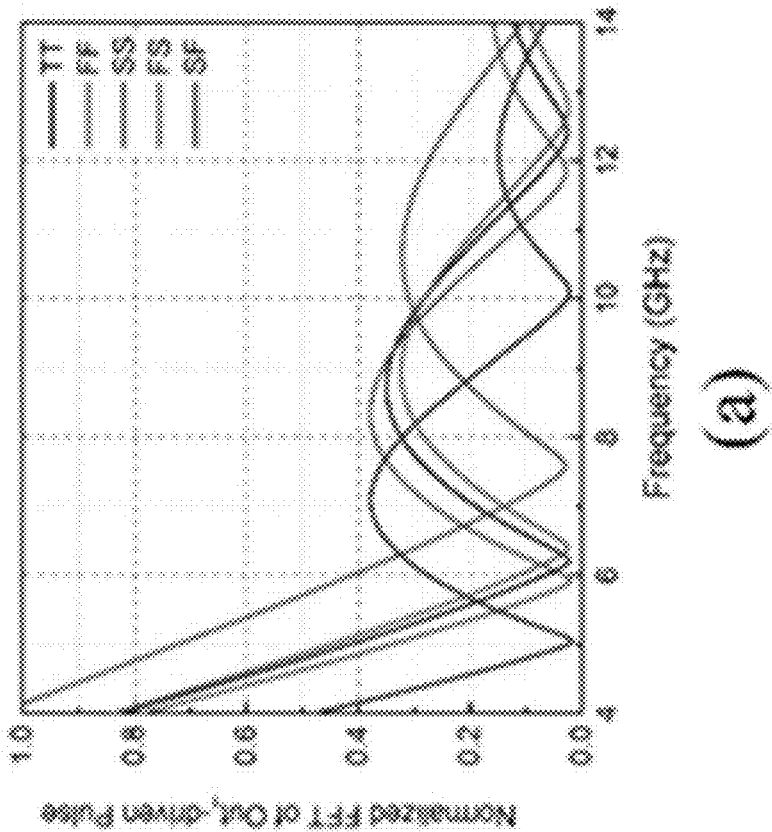

FIG. 30A illustrates a normalized fast Fourier transform (FFT) of the $Out_1$-driven and FIG. 30B illustrates $Out_2$- driven pulses in different process corners in accordance with several embodiments of the invention. In certain embodiments, to accommodate many process variations, the antenna bandwidth should cover 8-9 GHz.

Antenna Design

Figure 31:
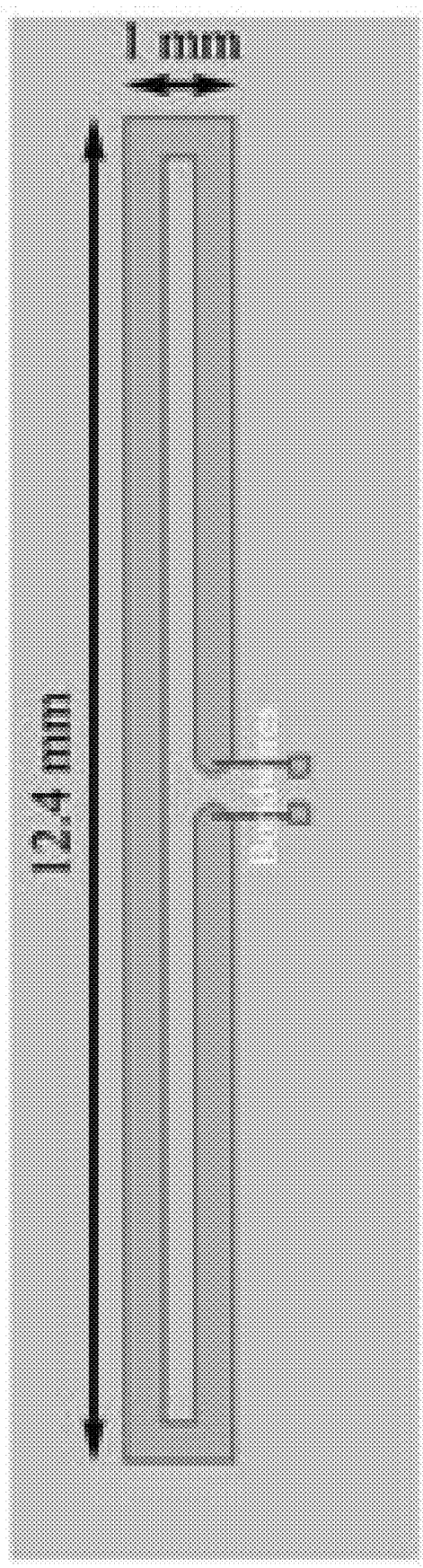
FIG. 31 illustrates a top-down view of a folded-dipole antenna in accordance with an embodiment of the invention.

FIG. 31 illustrates a planar geometry of a folded-dipole antenna in accordance with several embodiments of the invention. The model may include the parasitics of the bond wires. Although FIG. 31 illustrates a particular planar geometry of a folded-dipole antenna, any of a variety of geometries may be utilized as appropriate to the requirements of specific applications in accordance with embodiments of the invention.

Figure 32B:
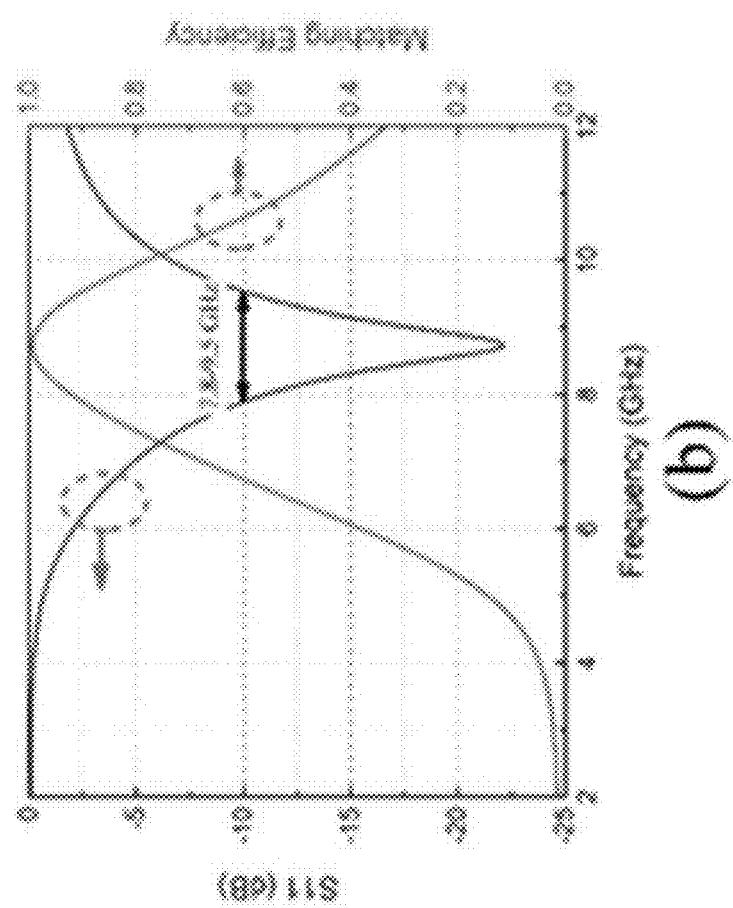
FIG. 32B illustrates $S_{11}$ and matching efficiency of the antenna with respect to 300Ω in accordance with an embodiment of the invention.
Figure 32A:
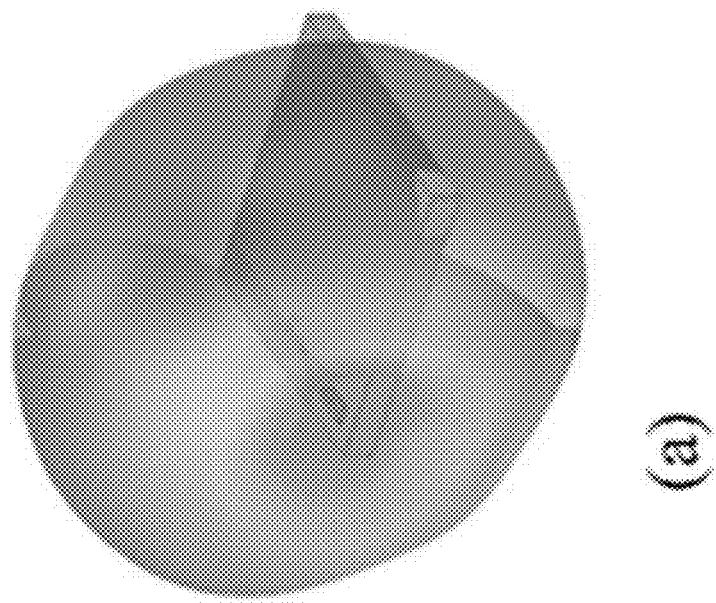
FIG. 32A illustrates radiation patter of a folded-dipole antenna at 8 GHz (unit: dB)
Figure 32A:
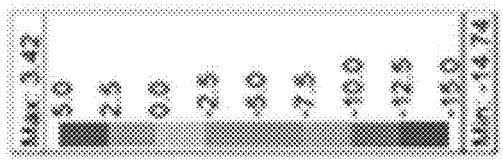

FIG. 32($a$) illustrates a radiation pattern of an antenna at 8 GHz in accordance with an embodiment of the invention with a maximum gain of 3.4 dB. $S_{11}$ may be defined with regard to 300Ω and plotted in FIG. 32($b$) in accordance with an embodiment of the invention. The corresponding matching efficiency, i.e., 1-mag(S11)2, is also plotted in the FIG. 32($b$). As illustrated, −10 dB bandwidth of the antenna is 7.8-9.5 GHz.

Experiment Results

In several embodiments, the IC may be fabricated in TSMC 180 nm CMOS process and the antenna may be fabricated on Rogers 4350 substrate. FIG. 33($a$) illustrates a photo of the overall transmitter in accordance with an embodiment of the invention. The IC may only occupies an area of 52 μm×42 μm. FIG. 33($b$) illustrates the IC layout in accordance with an embodiment of the invention.

Figures 34A, 34B, 34C:
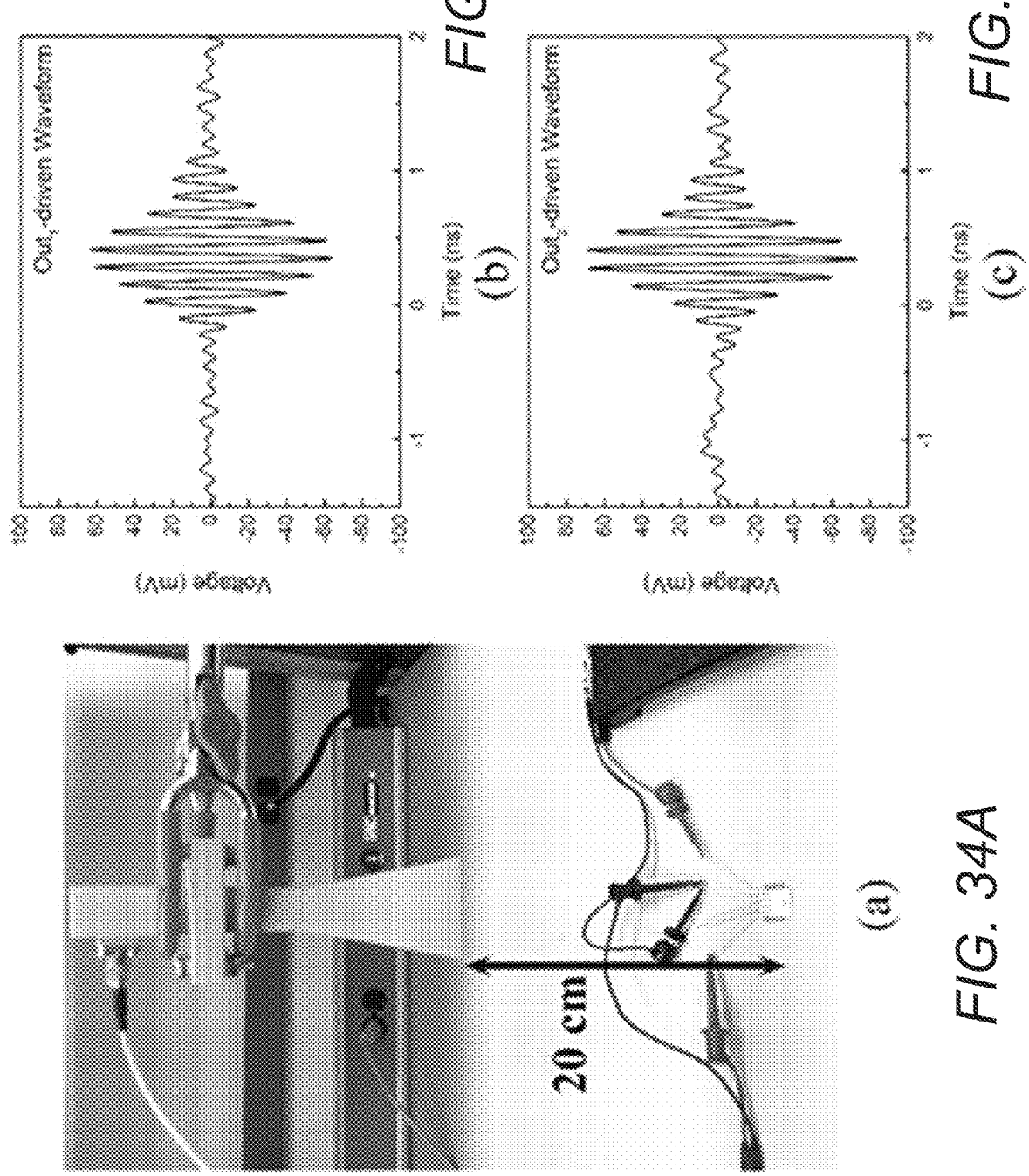
FIG. 34A illustrates a setup of a wireless measurement of an IR-UWB transmitter and FIG. 34B illustrates $Out_1$-driven and FIG. 34C illustrates $Out_2$-driven pulse waveforms in accordance with an embodiment of the invention.

In several embodiments, the transmitter can be wirelessly tested with a 6-12 GHz horn antenna (e.g., LB-OH-112-10, AINFO Inc.) that features a directivity of 10 dBi. The horn antenna may be positioned 20 cm above the transmitter and in the same polarization direction, as illustrated in FIG. 34($a$) in accordance with an embodiment of the invention. It may be followed by a three-stage cascaded LNA (e.g., two ZX60-14012L+, one ZX60-153LN-S+, Mini-Circuits, Inc.) with a total gain of 36 dB (including cable loss). FIG. 34($b$) and (c) illustrate oscilloscope measurement of the waveforms of $Out_1$-driven and $Out_2$-driven pulses in accordance with an embodiment of the invention.

In certain embodiments, with the transmitter operating at 100 Mpulse/s, the power spectral density measured on a spectrum analyzer (resolution bandwidth 1 MHz) is illustrated in FIG. 35($a$) in accordance with an embodiment of the invention. The emission limit of UWB protocol can be defined in the equivalent isotropically radiated power (EIRP). The EIRP in the measurement can then be derived according to the Friis transmission equation, $$EIRT_{TX} = P_{Rx} - D_{Rx} - 20 \log_{10}(\lambda/4\pi d) \quad (1)$$

where $P_{Rx}$ is the received power density, $D_{Rx}$ is the directivity of the Rx antenna, λ is the frequency-specific wavelength, d is the Tx-Rx distance. The EIRP result is illustrated in FIG. 35($b$) in accordance with an embodiment of the invention verifying that 100 Mpulse/s emission complies with the FCC mask.

A performance comparison with state-of-the-art edge-combing based IR-UWB transmitters is shown in FIG. 36 in accordance with an embodiment of the invention. Accordingly, many embodiments of the invention may significantly reduce the power consumption and achieve a very small IC footprint. Furthermore, many embodiments, may not use any additional passive components either on-chip or off-chip.

While the above descriptions and associated figures have depicted systems and methods for long-distance remote sensing with sub-wavelength resolution using a wirelessly-powered sensor tag array, it should be clear that any of a variety of configurations for systems and methods for long-distance remote sensing with sub-wavelength resolution using a wirelessly-powered sensor tag array can be implemented in accordance with embodiments of the invention. More generally, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A remote sensing apparatus, comprising:
   a radio frequency identification (RFID) tag;
   an ultra-high frequency (UHF) electromagnetic transmitter configured to emit electromagnetic waves that are in the UHF band;
   an ultra-wideband (UWB) receiver;
   a computer system;
   wherein:
   the RFID tag is configured to be operated without a battery, and to be powered by the electromagnetic waves emitted by the electromagnetic transmitter; wherein
   the RFID tag is configured to generate and transmit UWB impulses back to the UWB receiver based on an amount of electromagnetic power received from the UHF electromagnetic transmitter, such that a repetition rate of the UWB impulses varies with the amount of electromagnetic power received from the UHF electromagnetic transmitter and wherein the repetition rate of the UWB impulses increases with increases in the amount of electromagnetic power received from the UHF electromagnetic transmitter.

2. The remote sensing apparatus of claim 1, wherein the computer system is configured to receive and process signals from the UWB receiver and to track movements of the RFID tag and/or to track changes in a communication channel between the electromagnetic transmitter and the RFID tag.

3. The remote sensing apparatus of claim 1, wherein the RFID tag is further configured to monitor a transmit channel between the electromagnetic transmitter and the RFID tag.

4. The remote sensing apparatus of claim 1, wherein the electromagnetic transmitter is configured to use at least one of continuous wave and pulse electromagnetic signals to provide power to the RFID tag.

5. The remote sensing apparatus of claim 1, wherein the RFID tag is further configured to use at least one of continuous wave and pulse electromagnetic signals to communicate with the UWB receiver.

6. The remote sensing apparatus of claim 1, further comprising an array of RFID tags, wherein each of the tags in the array of RFID tags is configured to monitor changes in an environment around each of the tags, and to produce an image of the environment around each RFID tag.

7. The remote sensing apparatus of claim 6, further comprising an analyzer, wherein the analyzer is configured to analyze initial signals from the array of RFID tags and to identify a location of each of the tags by utilizing unique signals radiated by each of the tags.

8. The remote sensing apparatus of claim 1, wherein the RFID tag comprises a receiver antenna.

9. The remote sensing apparatus of claim 8, wherein the receiver antenna is at least one of on-chip and off-chip.

10. The remote sensing apparatus of claim 1, wherein the RFID tag comprises a transmitter antenna.

11. The remote sensing apparatus of claim 1, wherein the RFID tag is further configured to measure vibration of the RFID tag.

12. The remote sensing apparatus of claim 1, wherein the RFID tag is further configured to monitor changes in an environment around the RFID tag.

13. The remote sensing apparatus of claim 1, wherein the RFID tag is further configured to send UWB signals based on movements caused by heart rate and respiration rate to the UWB receiver.

14. The remote sensing apparatus of claim 1, wherein the RFID tag is fabricated in a silicon technology including as CMOS or BiCMOS.

* * * * *